United States Patent [19]

Michihira et al.

[11] Patent Number: 5,094,115
[45] Date of Patent: Mar. 10, 1992

[54] OPERATION APPARATUS FOR VEHICLE AUTOMATIC TRANSMISSION MECHANISM

[75] Inventors: Osamu Michihira, Hiroshima; Kiyoshi Sakamoto, Hatsukaichi; Yasuhiro Takabe, Higashihiroshima; Koki Makino, Hiroshima, all of Japan

[73] Assignee: Mazda Motor Corporation, Hiroshima, Japan

[21] Appl. No.: 661,236

[22] Filed: Feb. 27, 1991

[30] Foreign Application Priority Data

Mar. 1, 1990 [JP] Japan .................. 2-47354

[51] Int. Cl.⁵ .............................. F16H 61/12
[52] U.S. Cl. .................. 74/335; 74/336 R; 475/7
[58] Field of Search ............... 74/335, 336 R; 475/3, 475/5, 7

[56] References Cited

U.S. PATENT DOCUMENTS

| | | | |
|---|---|---|---|
| 1,793,228 | 2/1931 | Hackethal | 475/7 X |
| 2,151,176 | 3/1939 | Acker | 475/7 |
| 4,346,728 | 8/1982 | Sulzer | 475/7 X |
| 4,484,496 | 11/1984 | Weis | 475/7 X |
| 4,841,793 | 6/1989 | Leigh-Monstevens et al. | 74/336 R X |
| 4,938,088 | 7/1990 | Langley et al. | 74/335 |

FOREIGN PATENT DOCUMENTS 557249 11/1943 United Kingdom .................. 475/7
610746 10/1948 United Kingdom .................. 475/3

Primary Examiner—Dwight Diehl

[57] ABSTRACT

An operation apparatus for a vehicle automatic transmission mechanism includes first and second actuators, connected in parallel with a hydraulic valve, for driving the hydraulic valve to switch a travel range of an automatic transmission mechanism, a control unit for controlling the first and second actuators, and a transmission operation unit for outputting a range signal indicating a presently set travel range to the control unit. The transmission operation unit includes a stroke contact type operation switch on which travel ranges to be set are sequentially aligned along a predetermined path. The control unit includes a first CPU, connected to the first actuator, for controlling a driving operation of the first actuator, a second CPU, connected to the second actuator, for controlling a driving operation of the second actuator, and a third CPU, connected to the first and second CPUs, for setting, in a driving state, one of the first and second actuators connected to one of the first and second CPUs, which CPU serves as a main unit, for monitoring system failed states of the first and second CPUs, for, when the third CPU determines that a system failed state occurs, inhibiting the driving operation of the actuator connected to the system-failed CPU, and for permitting the driving operation of the actuator connected to the CPU which does not suffer from the system failed state.

10 Claims, 42 Drawing Sheets

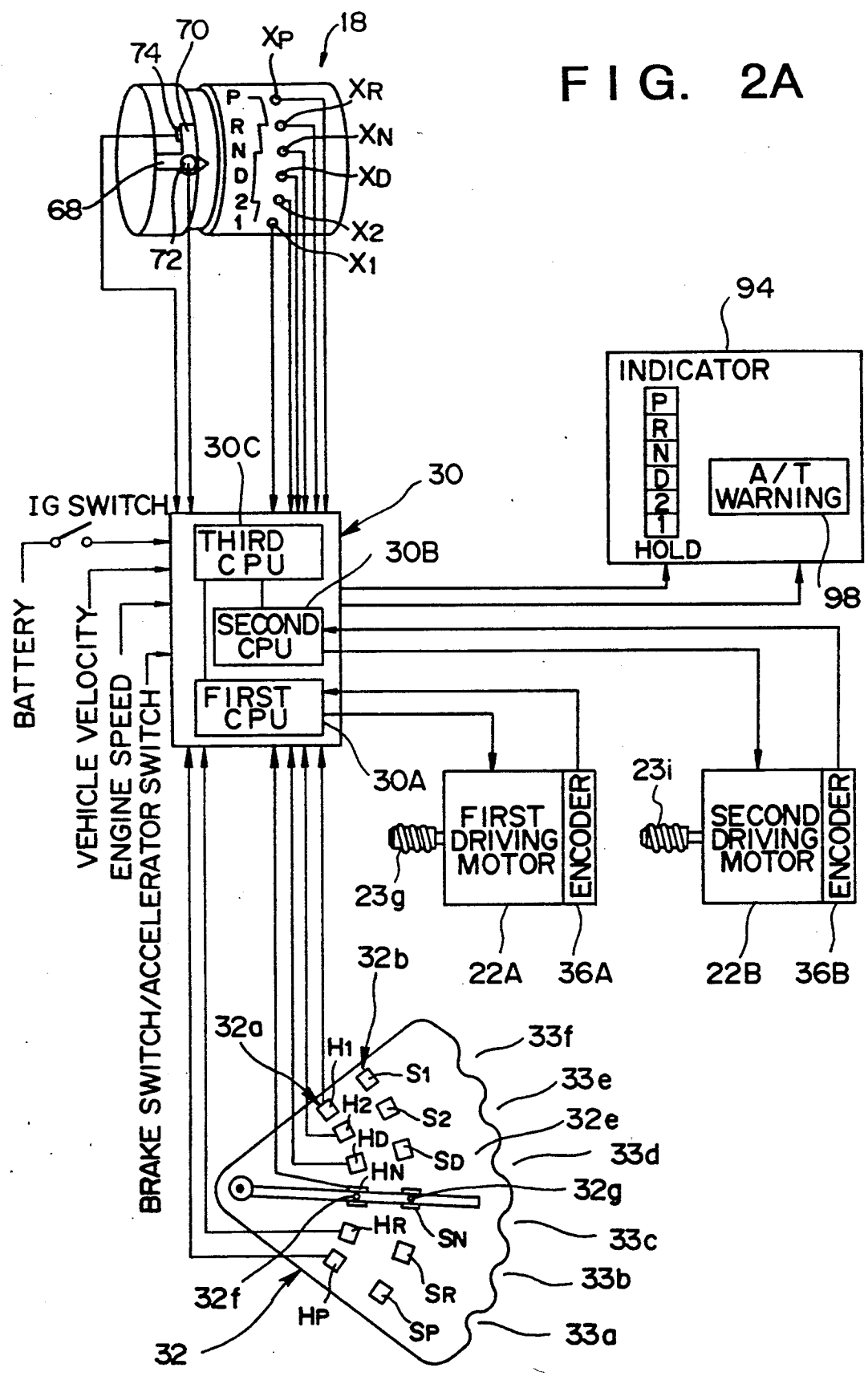

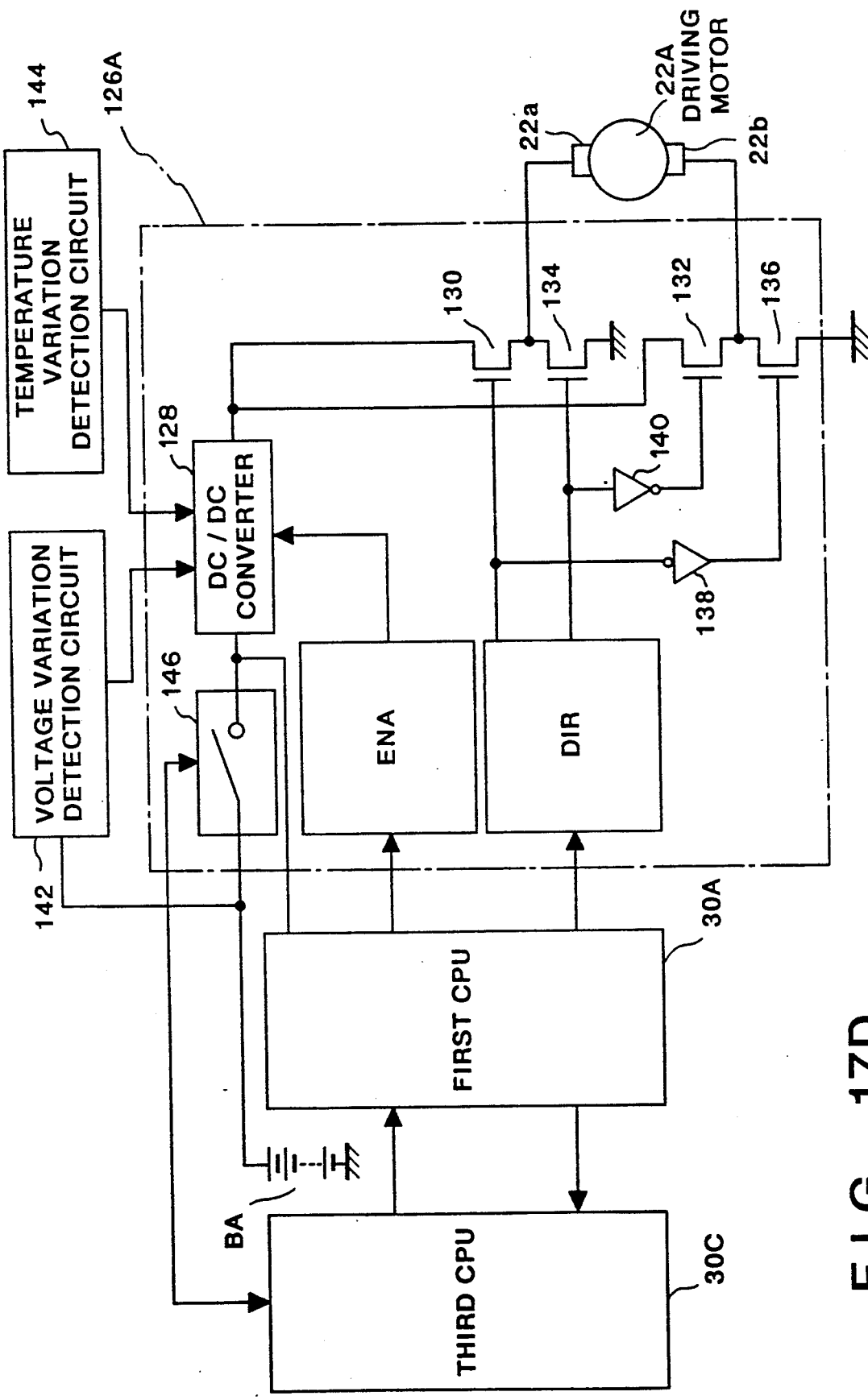
F I G. 17D

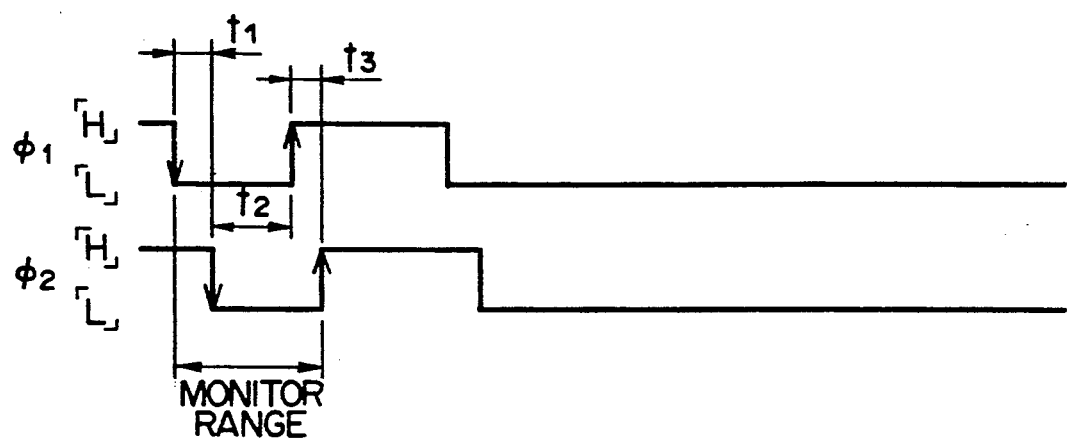
F I G. 18A
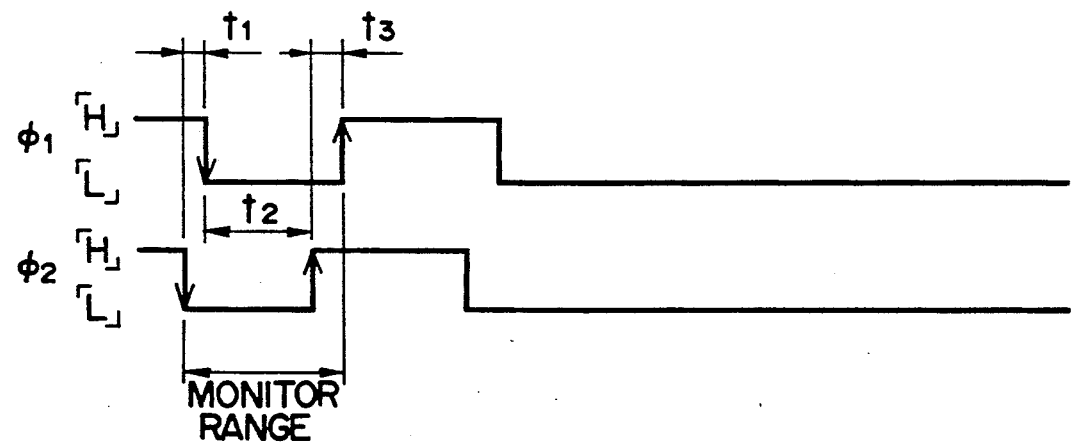
F I G. 18B

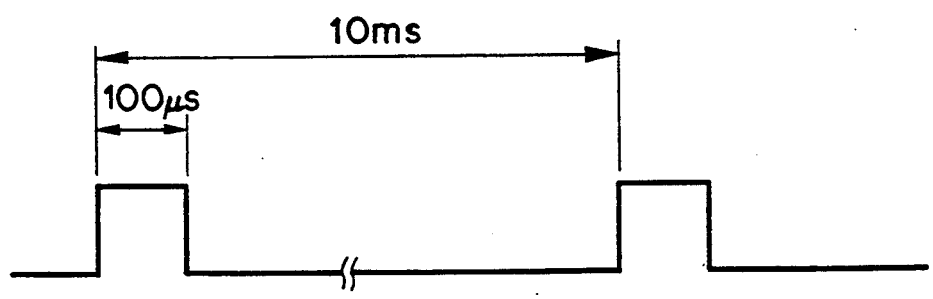
F I G. 22B

OPERATION APPARATUS FOR VEHICLE AUTOMATIC TRANSMISSION MECHANISM

BACKGROUND OF THE INVENTION

The present invention relates to an operation apparatus for a vehicle automatic transmission mechanism, which apparatus comprises an actuator for driving a hydraulic valve for switching a travel range of the automatic transmission mechanism, a control means for controlling the actuator, and a transmission operation means for outputting a transmission switching command to the control means.

In general, an operation apparatus for a vehicle automatic transmission mechanism comprises a select lever as a transmission operation means, which is directly mechanically connected to a hydraulic valve for switching a travel range of the automatic transmission mechanism, and is moved by a hand of a driver. The driver moves this select lever to a desired travel range position to switch a valve position of the hydraulic valve, thereby selecting a desired travel range.

In a manual operation apparatus of this type, since the select lever and the hydraulic valve are directly mechanically connected via an arm, a link, and the like, a strong operation force is required to move the select lever. Therefore, demand has arisen for an operation apparatus which requires only a light operation force.

In order to meet this demand, in recent years, as described in, e.g., Japanese Patent Publication No. 63-37729, in a vehicle automatic transmission mechanism for controlling a hydraulic valve in a transmission by a wire coupled to the hydraulic valve to switch a travel range, a motorized range switching apparatus, which drives the wire using a driving motor, and operates this driving motor upon operation of an electrical switch, has been proposed. According to the motorized range switching apparatus, a driver need only operate the electrical switch to switch a travel range via the driving motor. Thus, the driver can operate the electrical switch with a light operation force to instruct to switch a travel range.

A conventional motorized range switching apparatus of this type, however, is controlled to cause a travel range position instructed by the electrical switch to precisely coincide with a travel range in the automatic transmission mechanism. For this reason, even when a malfunction or a system failed state wherein a control sequence runs away occurs in a control unit for making this control operation, a fail-safe mechanism capable of safely traveling a vehicle is required to reliably operate.

SUMMARY OF THE INVENTION

The present invention has been made in consideration of the above situation, and has as its object to provide an operation apparatus for a vehicle automatic transmission mechanism, which can safely travel a vehicle even when a system failed state occurs in a control unit.

In order to achieve the above object, an operation apparatus for a vehicle automatic transmission mechanism according to the present invention comprises first and second actuators, connected in parallel with a hydraulic valve, for driving the hydraulic valve to switch a travel range of an automatic transmission mechanism, control means for controlling the first and second actuators, and transmission operation means for outputting a range signal indicating a presently set travel range to the control means, and wherein the transmission operation means includes a stroke contact type operation switch on which travel ranges to be set are sequentially aligned along a predetermined path, and the control means includes a first control unit, connected to the first actuator, for controlling a driving operation of the first actuator, a second control unit, connected to the second actuator, for controlling a driving operation of the second actuator, and a third control unit, connected to the first and second control units, for setting, in a driving state, one of the first and second actuators connected to one of the first and second control units, which unit serves as a main unit, for monitoring system failed states of the first and second control units, for, when the third control unit determines that a system failed state occurs, inhibiting the driving operation of the actuator connected to the system-failed control unit, and for permitting the driving operation of the actuator connected to the control unit which does not suffer from the system failed state.

In the operation apparatus for the automatic transmission mechanism according to the present invention, the first and second control units have the same control sequence.

In the operation apparatus for the automatic transmission mechanism according to the present invention, the first and second control units monitor a system failed state of the third control unit, and inhibits a control operation of the third control unit when it is determined that the third control unit system-fails.

In the operation apparatus for the automatic transmission mechanism according to the present invention, the control operation of the third control unit is inhibited only when both the first and second control units determine that the third control unit system-fails.

In the operation apparatus for the automatic transmission mechanism according to the present invention, when each of the first to third control units determines that the other control unit system-fails, the control unit which detects the system failed state informs to a driver that the system failed state occurs.

In the operation apparatus for the automatic transmission mechanism according to the present invention, the third control unit sets both the first and second actuators in a driving state when it determines that a travel range set in the automatic transmission mechanism is a parking range.

In the operation apparatus for the automatic transmission mechanism according to the present invention, the first and second actuators are connected to the hydraulic valve via a planetary gear mechanism.

In the operation apparatus for the automatic transmission mechanism according to the present invention, the first actuator is connected to a planet carrier of the planetary gear mechanism to rotate the planet carrier, the second actuator is connected to a sun gear of the planetary gear mechanism to rotate the sun gear, and an internal gear of the planetary gear mechanism is connected to the hydraulic valve.

In the operation apparatus for the automatic transmission mechanism according to the present invention, the first actuator is connected to the planet carrier via a rack & pinion mechanism, and the second actuator is connected to the sun gear via another rack & pinion mechanism.

An operation apparatus for a vehicle automatic transmission mechanism according to the present invention, comprises a pair of actuators, connected in parallel with a hydraulic valve, for driving the hydraulic valve to switch a travel range of an automatic transmission mechanism, control means for controlling the pair of actuators, and transmission operation means for outputting a range signal indicating a presently set travel range to the control means, wherein the transmission operation means includes a stroke contact type operation switch on which travel ranges to be set are sequentially aligned along a predetermined path, and the control means includes a pair of control units, one control unit controlling a driving operation of the hydraulic valve via the corresponding actuator, each control unit monitoring a system failed state of the other control unit, and when one control unit determines that the other control unit system-fails, the one control unit inhibiting the driving operation of the actuator connected to the system-failed control unit, and executing a control operation.

An operation apparatus for a vehicle automatic transmission mechanism according to the present invention, comprises an actuator for driving a hydraulic valve to switch a travel range of an automatic transmission mechanism, control means for controlling the actuator, and transmission operation means for outputting a range signal indicating a presently set travel range to the control means, and wherein the transmission operation means includes a stroke contact type operation switch on which travel ranges to be set are sequentially aligned along a predetermined path, and the control means comprises at least three control units, the control units executing the same control sequence, and when an output from one control unit is different from outputs from the remaining control units, the actuator being driven by the outputs from the remaining actuators.

Since the operation apparatus for the vehicle automatic transmission mechanism according to the present invention is arranged as described above, if it is determined that one of a plurality of control units system-fails, a driving operation of an actuator connected to the system-failed control unit is inhibited, and an actuator connected to a control unit which does not suffer from a system failed state is driven. In this manner, a fail-safe mechanism against a system failed state can be reliably attained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2A is a diagram showing connection states among an operation switch, an inhibitor switch, and a control unit shown in FIG. 1;

FIG. 17D is a circuit diagram showing an arrangement of a motor driver;

FIG. 18A is a timing chart showing an order of changes in output levels from first and second output terminals when the operation switch is rotated in a forward direction;

FIG. 18B is a timing chart showing an order of changes in output levels from first and second output terminals when the operation switch is rotated in a reverse direction;

FIG. 22B is a timing chart showing a signal waveform of a system fail judgment signal;

DETAILED DESCRIPTION OF THE PREFERRED EMBODIMENT

Figure 1:
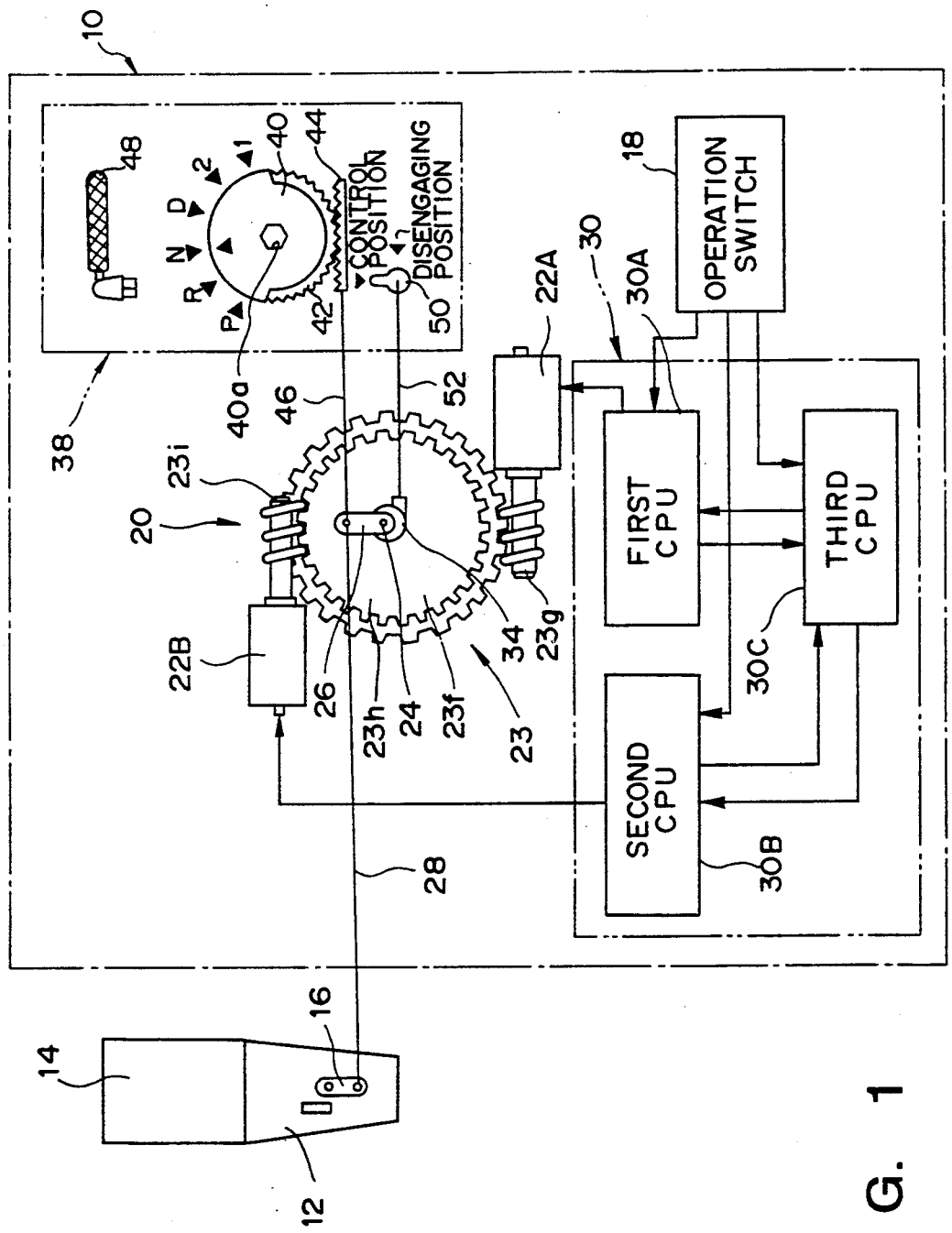
FIG. 1 is a schematic diagram showing an arrangement of a motorized travel range switching apparatus to which an embodiment of an operation apparatus for a vehicle automatic transmission mechanism according to the present invention is applied.

An arrangement of an embodiment of an operation apparatus for a vehicle automatic transmission mechanism according to the present invention will be described in detail below with reference to the accompanying drawings.

An operation apparatus 10 of this embodiment is arranged so that a travel range of an automatic transmission mechanism 12 can be switched with a light operation force by utilizing an electric motor. The automatic transmission mechanism 12 transmits a driving force of an engine 14 to driving wheels (front wheels (not shown) in this embodiment). Since the automatic transmission mechanism 12 is of a conventional type which comprises a hydraulic valve 16 for switching a travel range, and its arrangement is known to those who are skilled in the art, a description thereof will be omitted herein.

The operation apparatus 10 of this embodiment comprises a motorized travel range switching apparatus (to be simply referred to as a range switching apparatus hereinafter) 20 for driving the above-mentioned hydraulic valve 16 by an electric motor in accordance with an operation of an operation switch (its detailed arrangement and mounting state will be described in detail later) 18 as the characteristic feature of the present invention, thereby switching a travel range. The range switching apparatus 20 comprises driving motors 22A and 22B as two reversible DC motors, a planetary gear mechanism 23 (its arrangement will be described in detail later) for simultaneously receiving driving forces from the two driving motors 22A and 22B or independently receiving a driving force from the driving motor 22A or 22B, a rotational arm 26 fixed to an output shaft 24 of the planetary gear mechanism 23, and having a predetermined radius, a coupling rod 28 for coupling the distal end of the rotational arm 26 and the distal end of a switching rod 16a of the hydraulic valve 16, and a control unit 30 for controlling driving states of the driving motors 22A and 22B in accordance with a range switching command output from the operation switch 18. The above-mentioned coupling rod 28 is connected to the distal end of the switching rod 16a which is pivotally and axially supported on the hydraulic valve 16, and switches a travel range in accordance with its pivot position.

The above-mentioned control unit 30 comprises three, i.e., first to third CPUs 30A, 30B, and 30C, as shown in FIG. 1. More specifically, this control unit 30 has so-called triple control systems. Control sequences of these CPUs 30A, 30B, and 30C will be described in detail later. The first CPU 30A is arranged to drive the first driving motor 22A. The second CPU 30B is arranged to drive the second driving motor 22B. The third CPU 30C is arranged to regulate the mutual relationship between the control operations of the first and second CPUs 30A and 30B, and define the first CPU 30A as a main CPU and the second CPU 30B as a sub CPU, so that when the control operation of the first CPU 30A as the main CPU fails, e.g., runs away, the third CPU 30C stops the driving operation of the first driving motor 22A by the first CPU, and switches the control operation to that of the second CPU 30B as the sub CPU, thereby attaining a fail-safe operation.

The above-mentioned automatic transmission mechanism 12 comprises a select switch 32 which is switched by a driving force output from the output shaft 24 of the planetary gear mechanism 23, as shown in FIG. 2A. The select switch 32 is constituted by an indication inhibitor switch 32 for indicating a switched travel range state in accordance with a travel range switching state by the hydraulic valve 16, and a control inhibitor switch 32b for instructing drive/stop periods of the corresponding driving motors 22A and 22B.

In other words, the select switch 32 comprises a switch main body 32d, and a sectorial-shaped switching member 32e mounted to be rotated integrally with the switching rod 16a of the above-mentioned hydraulic valve 16. Contacts $H_P$, $H_R$, $H_N$, $H_D$, $H_2$, and $H_1$ corresponding to travel ranges of the above-mentioned indication inhibitor switch 32a, and contacts $S_P$, $S_R$, $S_N$, $S_D$, $S_2$, and $S_1$ corresponding to travel ranges of the control inhibitor switch 32b are arranged on the surface of the switch main body 32d.

Upon a pivotal movement of the switching member 32e which is switched in accordance with an output from the planetary gear mechanism 23, the switch main body 32d is brought into selective contact with the contacts corresponding to the selected travel range on the indication and control inhibitor switches 32a and 32b.

The structure of the select switch 32 in the automatic transmission mechanism 12 will be described below with reference to FIGS. 2B to 2D.

Figure 2B:
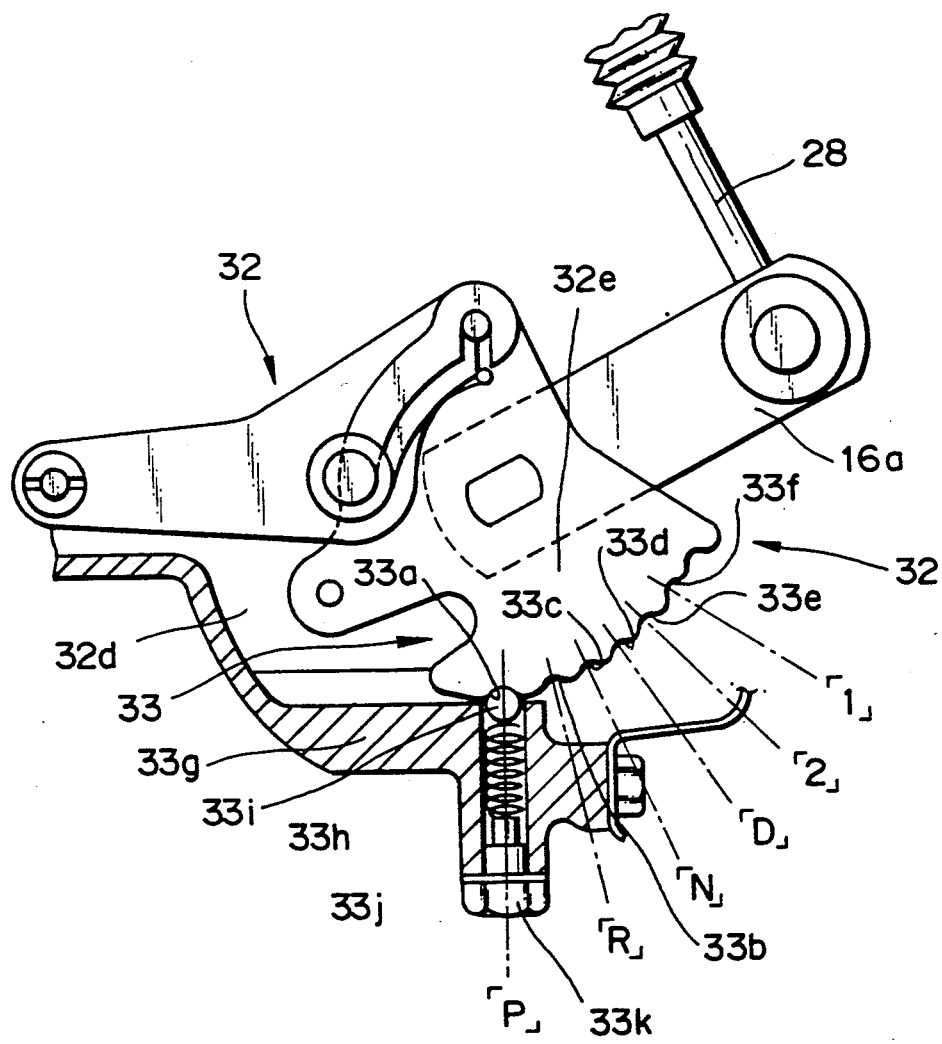
FIG. 2B is a plan view showing a structure of a select switch.

The select switch 32 comprises a detent mechanism 33 for precisely and mechanically defining stop positions by the driving motors 22A and 22B in the automatic transmission mechanism 12 at a corresponding travel range position, as shown in FIG. 2B. The detent mechanism 33 comprises six recess portions 33a, 33b, 33c, 33d, 33e, and 33f continuously formed in an arcuated end face of the sectorial-shaped switching member 32e. These recess portions 33a, 33b, 33c, 33d, 33e, and 33f are formed at equal angular intervals along the arcuated surface, and are set in correspondence with six travel ranges, i.e., a parking range "P", a reverse range "R", a neutral range "N", a forward drive range "D", a forward 2nd-speed range "2", and a forward 1st-speed range "1", respectively. Although not shown, separation angles for defining intervals of these recess portions 33a, 33b, 33c, 33d, 33e, and 33f are set in the same manner as separation angles for defining intervals of six travel range positions defined in the hydraulic valve 16.

A thick portion 33g is integrally formed on the upper surface of the above-mentioned switch main body 32d to oppose the arcuated end face of the switching member 32e. A through hole 33h is formed at a position of the thick portion 33g, which can oppose one of the above-mentioned six recess portions 33a, 33b, 33c, 33d, 33e, and 33f, along an axis passing the center of rotation of the switching member 32e. A ball 33i which can be fitted in one of the recess portions 33a, 33b, 33c, 33d, 33e, and 33f, which is pivoted to a position opposing the hole, a coil spring 33j for biasing the ball 33i to project outwardly, and a plug 33k for closing an end portion of the through hole 33h opposite to the side of the ball 33i are arranged in the through hole 33h.

Since the detent mechanism 33 is arranged in this manner, the switching member 32e, and the switching rod 16a of the hydraulic valve 16 coaxially mounted on the member 32e are stopped at each travel range position in a mechanically restrained state. In other words, since the detent mechanism 33 is arranged in this manner, the switching member 32e, and the switching rod 16a of the hydraulic valve 16 coaxially mounted on the member 32e comprise a predetermined receiving zone E before and after a position for defining each travel range. More specifically, as shown in (e) in FIG. 2C, the above-mentioned receiving zones E are formed about the most recessed portions of the corresponding recess portions 33a, 33b, 33c, 33d, 33e, and 33f at the respective travel range positions.

Figure 2C:
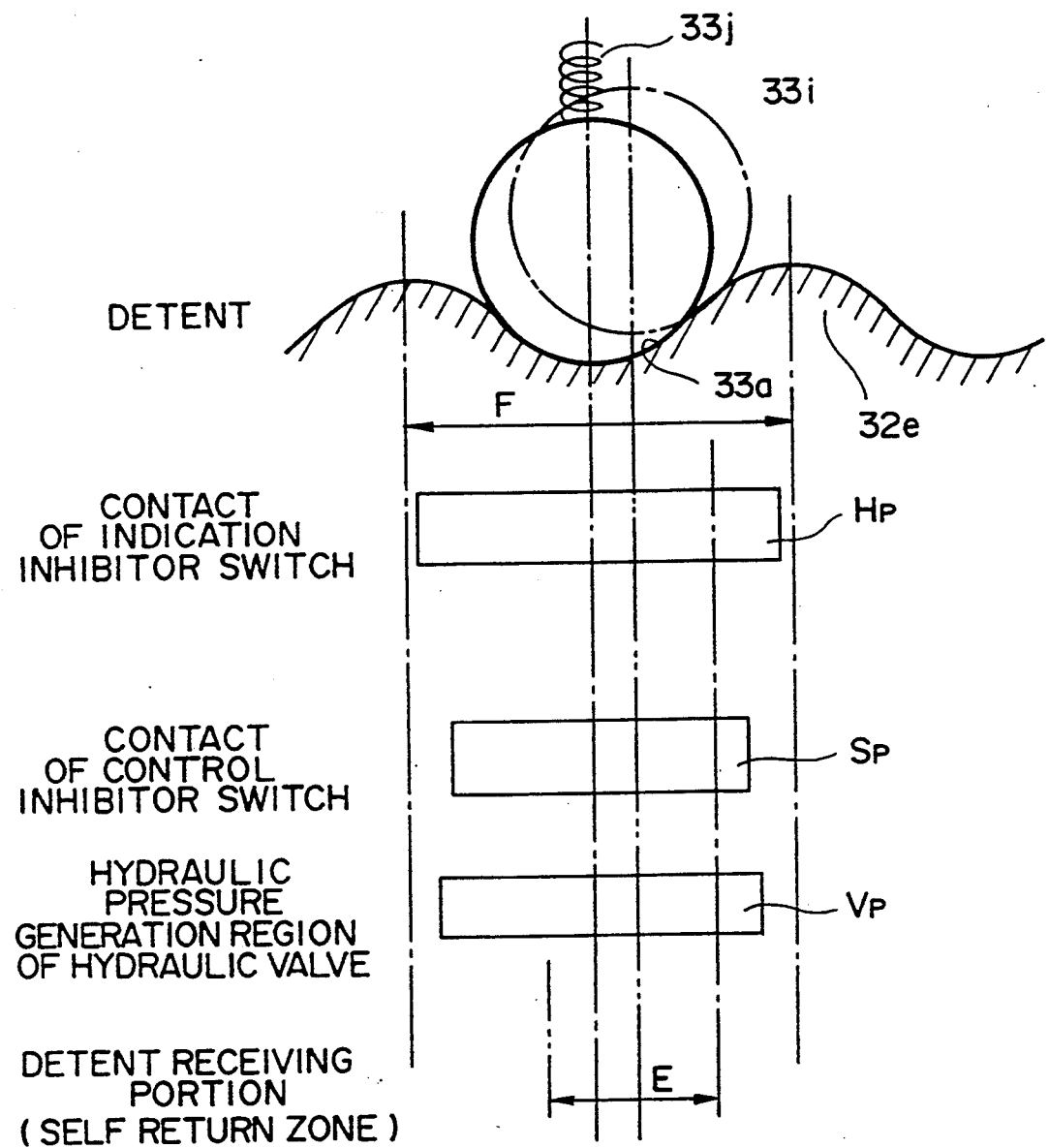
FIG. 2C is a view showing formation ranges of contacts of an indication inhibitor switch, a control inhibitor switch, and a hydraulic switch in the select switch, and a receiving zone in a detent recess portion.

On the other hand, in the above-mentioned select switch 32, two slidable brushes 32f and 32g are mounted on the rear surface of the switching member 32e to be able to be in contact with the contacts of the two switches, i.e., the indication and control inhibitor switches 32a and 32b formed on the surface of the switch main body 32d, as shown in (b) and (c) in FIG. 2C. Note that each travel range position is defined as a zone between two adjacent peak portions (projecting portions) for defining the corresponding recess portion, as indicated by symbol F in (a) of FIG. 2C.

Each of the contacts of these indication and control inhibitor switches 32a and 32b is formed to extend over a predetermined zone along a pivot direction of the switching member 32e, and its central position is set to coincide with a central point CP of the corresponding travel range position. Each of the contacts $H_P$, $H_R$, $H_N$, $H_D$, $H_2$, and $H_1$ of the indication inhibitor switch 32a is formed to extend over substantially the entire zone of each travel range indicated by symbol E. Each of the contacts $S_P$, $S_R$, $S_N$, $S_D$, $S_2$, and $S_1$ of the control inhibitor switch 32b is formed to have a narrowest zone.

As shown below the contact of the control inhibitor switch 32b in FIG. 2C, hydraulic pressure generation regions $Y_P$, $Y_R$, $Y_N$, $Y_D$, $Y_2$, and $Y_1$ are defined on the hydraulic valve 16 in correspondence with the contacts $H_P$, $H_R$, $H_N$, $H_D$, $H_2$, and $H_1$ of the indication inhibitor switch 32a, and the contacts $S_P$, $S_R$, $S_N$, $S_D$, $S_2$, and $S_1$ of the control inhibitor switch 32b. Each of these hydraulic pressure generation regions $Y_P$, $Y_R$, $Y_N$, $Y_D$, $Y_2$, and $Y_1$ is formed to have a zone larger than the arranging zone of each contact of the control inhibitor switch 32b, and smaller than the arranging zone of each contact of the indication inhibitor switch 32a.

Each contact of the control inhibitor switch 32a, which has the narrowest arranging zone, is formed to be larger than the above-mentioned receiving zone E, as can be seen from (e) in FIG. 2C. In other words, when the ball 33i is fitted in this receiving zone E, the corresponding travel range can be reliably defined in a mechanically restrained state. When the travel range is defined in the mechanically restrained state, an indication inhibitor signal can be output from the indication inhibitor switch 32a, a control inhibitor signal can be output from the control inhibitor switch 32b, and a predetermined hydraulic pressure can be generated in the hydraulic valve 16. In this manner, predetermined signals can be reliably output from the select switch 32 to the control unit 30.

As shown in FIG. 1, in the above-mentioned planetary gear mechanism 23, a clutch mechanism 34 is coupled to the output shaft 24. The clutch mechanism 34 is engaged/disengaged under the control of the above-mentioned control unit 30. More specifically, in a normal state, the control unit 30 maintains an engaging state of the clutch mechanism 34, so that the automatic transmission mechanism 12 is driven by the driving motors 22A and 22B. As will be described later, when it is determined that a switching control operation in the control unit 30 fails, the control unit 30 disengages the clutch mechanism 34 as a fail-safe operation, so that the automatic transmission mechanism 12 cannot be driven by the driving motors 22A and 22B.

As shown in FIG. 2A, rotary encoders 36A and 36B are respectively connected to the driving motors 22A and 22B, thereby always detecting driving amounts of the corresponding motors 22A and 22B. These rotary encoders 36A and 36B are respectively connected to the first and second CPUs 30A and 30B of the control unit 30, and output detection results thereto. Upon reception of output results from the corresponding rotary encoders 36A and 36B, the CPUs 30A and 30B recognize the driving amounts of the corresponding driving motors 22A and 22B, in other words, a pivot position of the rotational arm 26 via the planetary gear mechanism 23.

As shown in FIG. 1, a manual driving mechanism 38 for manually switching the automatic transmission mechanism 12 when, for example, both the first and second CPUs 30A and 30B in the control unit 30 suffer from a system failed state, or when a control operation can no longer be executed due to a battery failure, is connected to the above-mentioned range switching apparatus 20. The manual driving mechanism 38 comprises a pivot disc 40 which is rotatable about a pivot axis parallel to the output shaft 24 described above, a pinion gear 42 formed on the outer circumferential surface of the pivot disc 40, a rack member 44 meshing with the pinion gear 42, and a first auxiliary coupling wire 46 for coupling the rack member 44 and the distal end of the rotational arm 26. Note that the first auxiliary coupling wire 46 extends along an extending direction of the coupling wire 28, and switches the hydraulic valve 16 when the pivot disc 40 is pivoted.

A fitting hole 40a for receiving a wrench 48 as a slidable pivot member is formed in the central portion of the pivot disc 40. The pivot disc 40 can be manually pivoted to an arbitrary position via the wrench 48. Upon manual pivotal movement of the pivot disc 40, if the clutch mechanism 34 is in an engaging state, since the driving motors 22A and 22B are connected to the planetary gear mechanism 23 via worm gears, as will be described later, the output shaft 24 is locked, and can no longer be rotated. For this reason, a switching lever 50 for mechanically disengaging the clutch mechanism 34 is arranged, and is connected to the clutch mechanism 34 via a second auxiliary wire 52. More specifically, when the switching lever 50 is at a control position, the clutch mechanism 34 is under the control of the control unit 30; when it is at a disengaging position, the clutch mechanism 34 is mechanically disengaged.

Figure 3:
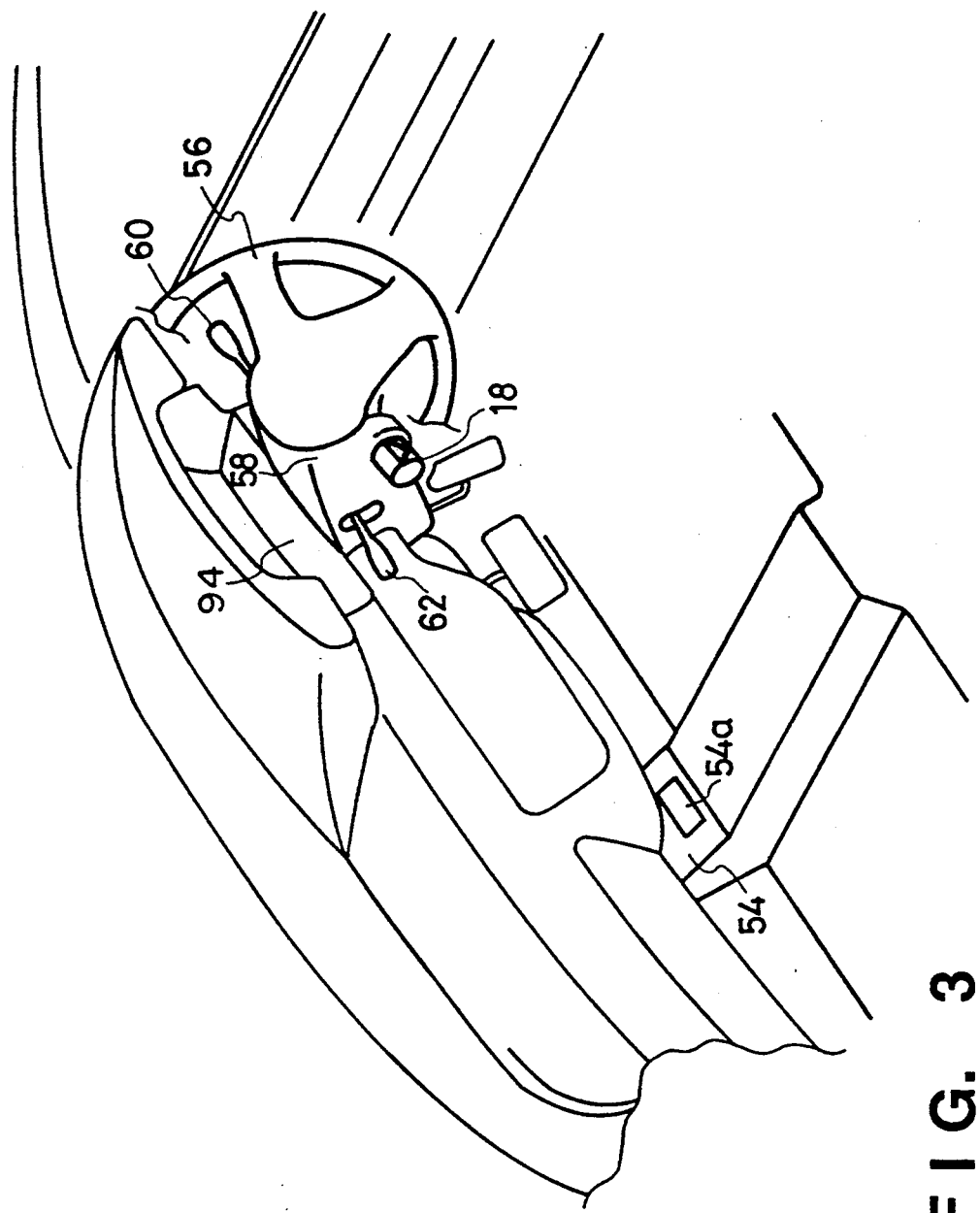
FIG. 3 is a perspective view showing arranging positions of an operation switch and a manual driving mechanism in a passenger room.

As shown in FIG. 3, the manual driving mechanism 38 is arranged to be located just inside a central lower portion of a cowl panel lower portion 54 for partitioning between a passenger room and an engine room. When a lid member 54a mounted on this portion is detached, the pivot disc 40 can be exposed.

In this manner, in a system failed state of the control unit 30 or in a battery failure state, a driver detaches this lid member 54a to access the manual driving mechanism 38. After the driver switches the switching lever 50 to the disengaging position, he or she pivots the pivot disc 40 using the wrench 48, thereby directly and manually switching the automatic transmission mechanism 12.

The structure of the planetary gear mechanism 23 will be described below with reference to FIGS. 2E and 2F.

Figure 2D:
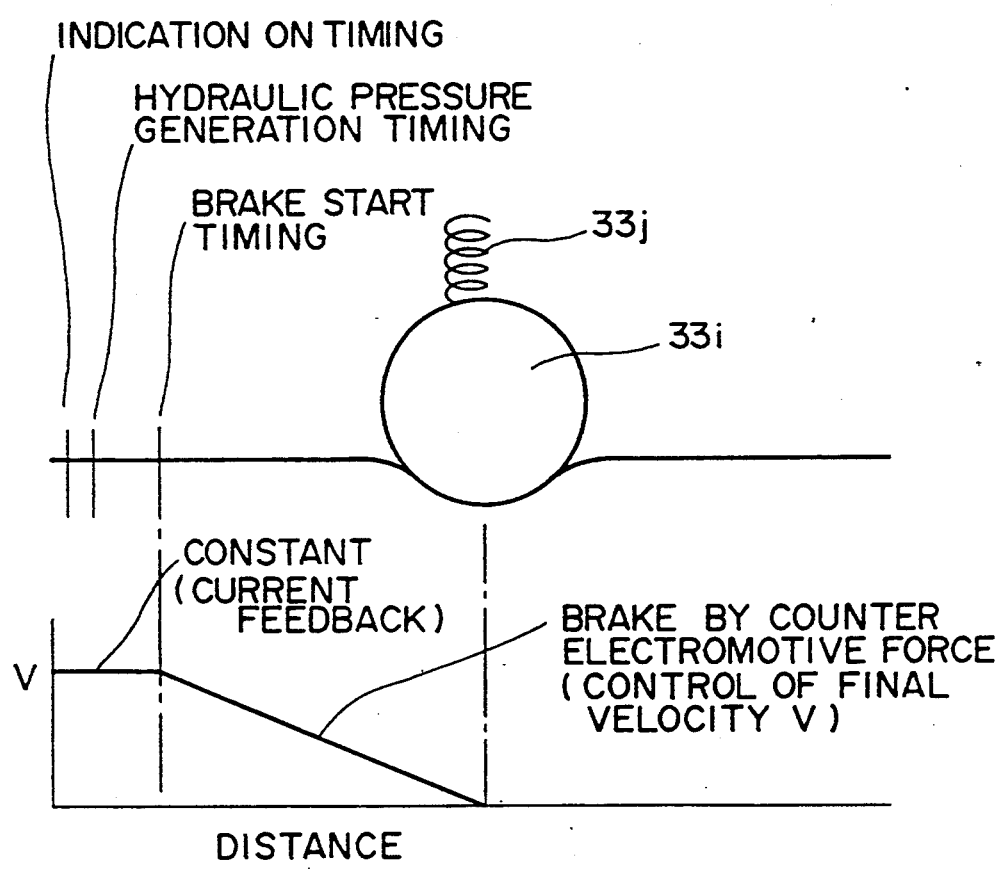
FIG. 2D is a view for explaining a pivot state of a switching member, and a fitting state of a ball into a corresponding detent recess portion according to the pivot state.
Figure 2E:
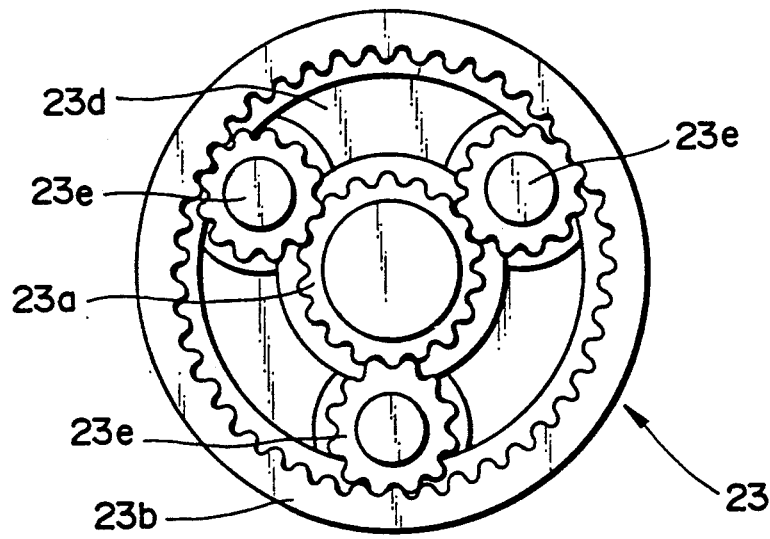
FIG. 2E is a side view showing a structure of a planetary gear mechanism from which first and second worm wheels are removed.

As shown in FIG. 2E, the planetary gear mechanism 23 comprises a sun gear 23a on an outer circumferential surface at one end of which external teeth are formed, an internal gear 23b which is coaxially and rotatably supported around the sun gear 23a, and on an inner circumferential surface of which internal teeth are formed, a doughnut-like planet carrier 23d which is rotatably supported around an intermediate portion of the sun gear 23a via a bearing 23c (FIG. 2F), so as to be rotated coaxially with the sun gear 23a and the internal gear 23b, and three planet gears 23e which are rotatably supported on the planet carrier 23d, and are simultaneously meshed with the sun gear 23a and the internal gear 23b.

Figure 2F:
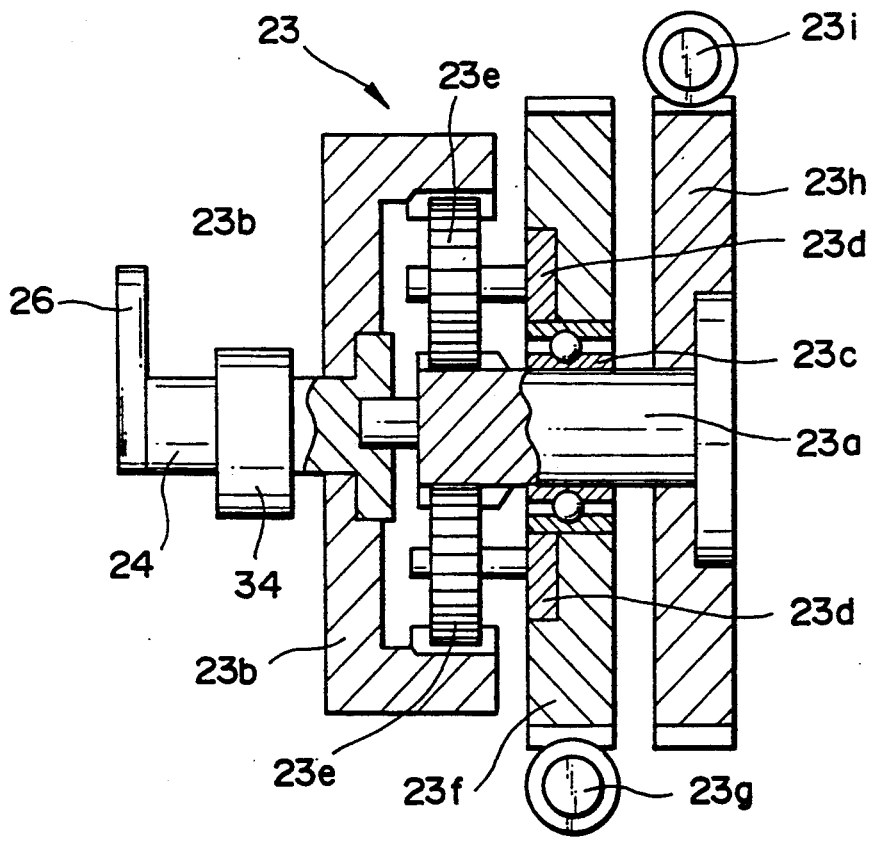
FIG. 2F is a partially cutaway front view of the structure of the planetary gear mechanism.

As shown in FIG. 2F, a first worm wheel 23f is coaxially fixed to the planet carrier 23d. A first worm gear 23g fixed to the driving shaft of the first driving motor 22A is meshed with the first worm wheel 23f, so that their axes of rotation are perpendicular to each other. On the other hand, a second worm wheel 23h is coaxially fixed to the sun gear 23a. A second worm gear 23i fixed to the driving shaft of the second driving motor 22B is meshed with the second worm wheel 23h, so that their axes of rotation are perpendicular to each other. The above-mentioned output shaft 24 is coaxially joined to the internal gear 23b.

Since the planetary gear mechanism 23 is arranged as described above, the planet carrier 23d and the sun gear 23a serve as two driving force input elements, and the internal gear 23b serves as one driving force output element.

More specifically, when the first driving motor 22A is set in a driving state, and the second driving motor 22B is set in a stop state, the sun gear 23a is kept in a fixed state via threadable engagement between the second worm wheel 23h and the second worm gear 23i. In this manner, a driving force from the first driving motor 22A is transmitted to the output shaft 24 via the planet gears 23e and the internal gear 23b in turn. On the other hand, when the first driving motor 22A is set in a stop state, and the second driving motor 22B is set in a driving state, the planet carrier 23d is kept in a fixed state via threadable engagement between the first worm wheel 23f and the first worm gear 23g. In this manner, a driving force from the second driving motor 22B is transmitted to the output shaft 24 via the sun gear 23a, the planet gears 23e, and the internal gear 23b in turn.

When both the first and second driving motors 22A and 22B are set in a driving state, as can be seen from the above description, the output shaft 24 is rotated at a rotational speed about twice a speed in a case wherein it is driven by one of the driving motors 22A and 22B. In this case, the rotational directions of the first and second driving motors 22A and 22B are opposite to each other.

In this manner, since the planetary gear mechanism 23 is used, one output shaft 24 can be rotated by one of the first and second driving motors 22A and 22B, and can be simultaneously rotated by the driving motors 22A and 22B.

The operation switch 18 as a transmission operation means as the characteristic feature of the present invention for outputting a range switching command to the control unit 30 of the range switching apparatus 20 with the above-mentioned arrangement will be described below with reference to FIG. 3 and subsequent drawings.

As shown in FIG. 3, the operation switch 18 is disposed on a left side surface of a steering column 58 to which a steering wheel 56 is pivotally mounted in a passenger room, i.e., on a side opposite to a side of a direction indication lever 60 and on the same side as a wiper operation lever 62. The operation switch 18 comprises a so-called stroke contact type switch. More specifically, the operation switch 18 comprises a rotary switch which is mounted to be pivotal about a pivot shaft extending along a widthwise direction of a vehicle.

Figure 4:
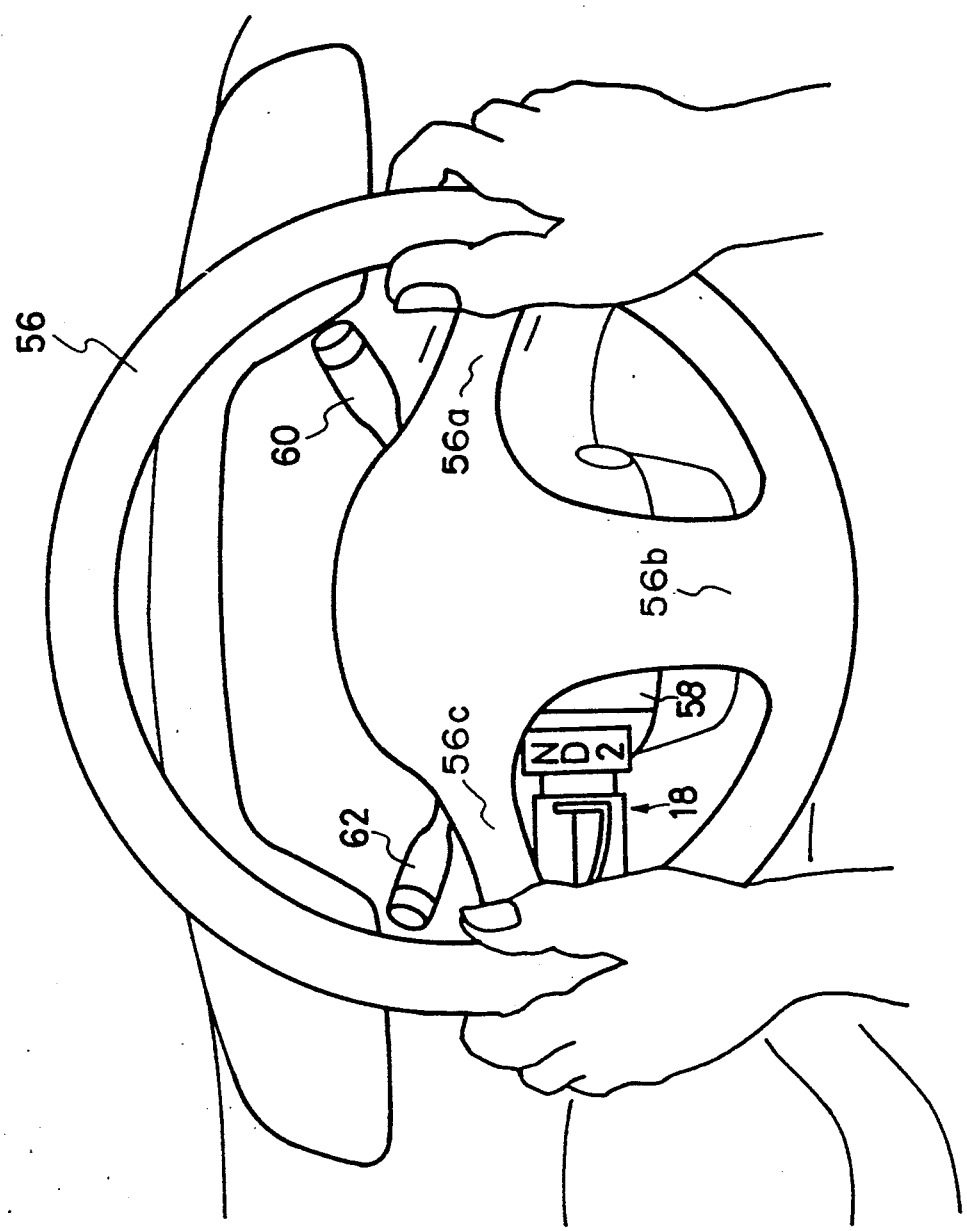
FIG. 4 is a front view of an arranging state of the operation switch when viewed from a driver who seats at a driver's seat.

An arranging position of the operation switch 18 on the left side surface of the steering column 58 is set so that when a driver who sits at the driver's seat sees a front side while gripping two side portions corresponding to so-called 8 o'clock 20 minute positions of the steering wheel 56 at a substantially neutral position (i.e., a position where a rotational angle=0°) with his or her two hands, he or she can visually confirm the operation switch 18 through a gap portion of the steering wheel 56, as shown in FIG. 4. The steering wheel 56 adopts a 3-spoke type to guarantee good visual confirmation. More specifically, the steering wheel 56 comprises three spokes 56a, 56b, and 56c extending along 3, 6, and 9 o'clock directions, respectively.

Figure 5:
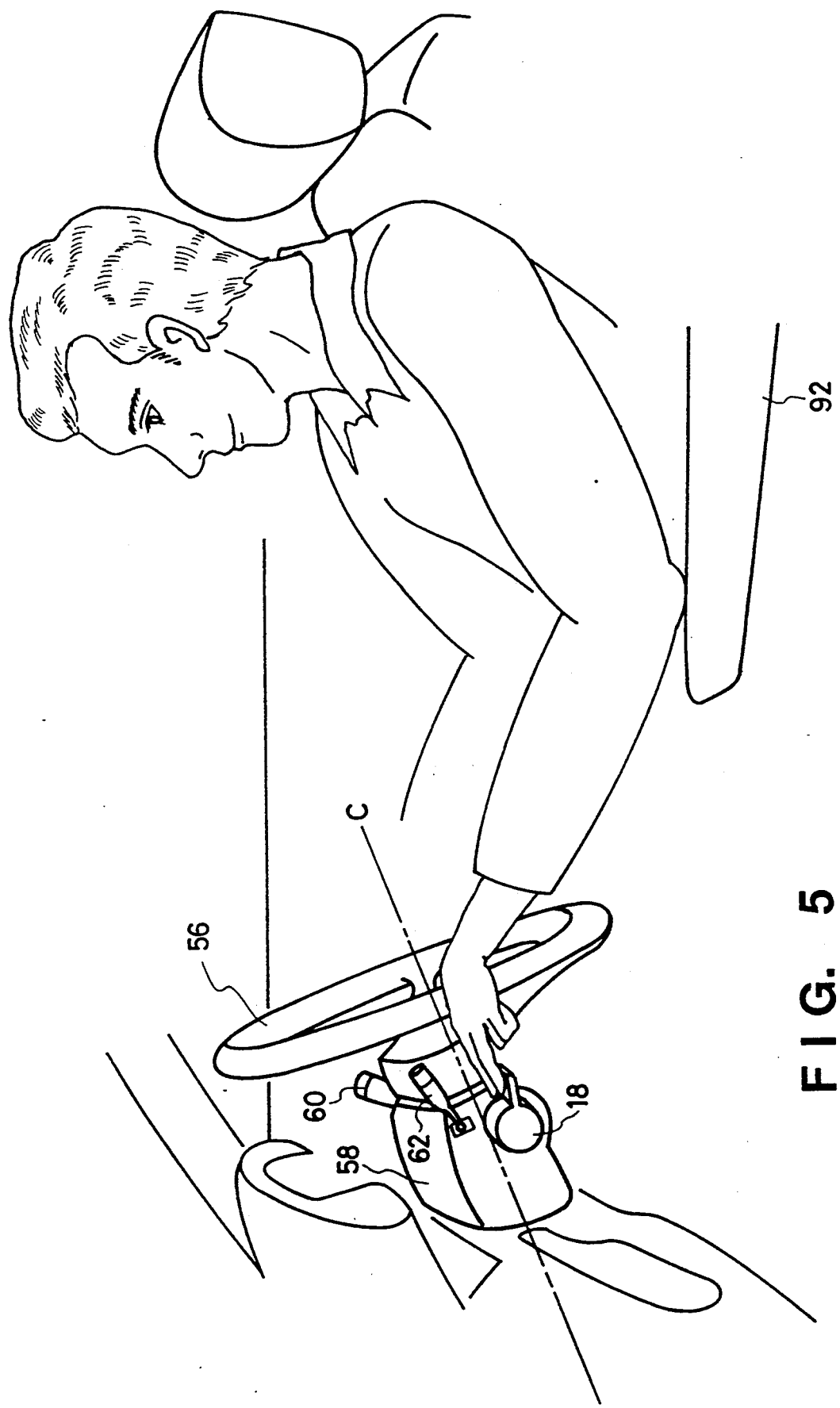
FIG. 5 is a side view showing an arranging state of the operation switch when viewed from a left side position.

The positional relationship between the operation switch 18 and the wiper operation lever 62 is set as shown in FIG. 5. That is, the operation switch 18 is arranged on a driver-side lower portion of the left side surface of the steering column 58, while the wiper operation lever 62 is arranged on a driver-side upper portion of the left side surface of the steering column 58. In other words, the wiper operation lever 62 and the operation switch 18 are disposed to be vertically separated from each other to have a central line C in a direction of height of the steering column 58 as a boundary.

Figure 6:
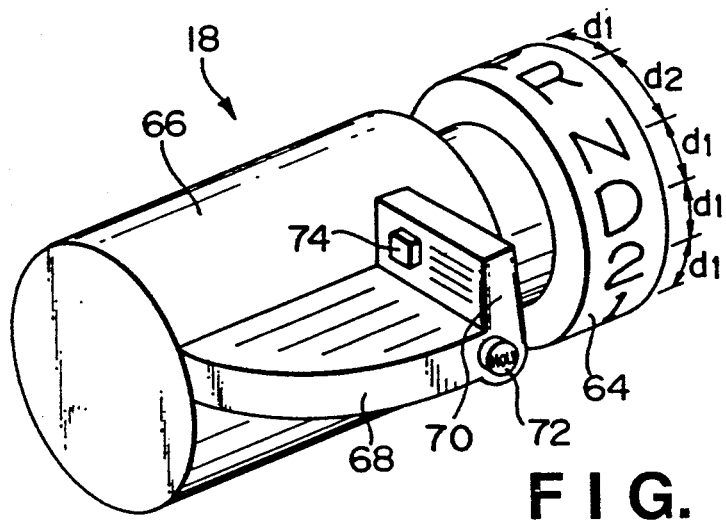
FIG. 6 is a perspective view showing an outer appearance of the operation switch.

As shown in FIG. 6, the operation switch 18 comprises an annular mounting ring 64 integrally fixed to the left side surface of the steering column 58, a switch main body 66 which is axially supported on the mounting ring 64 to be rotatable about an axis extending along the widthwise direction of the vehicle, and is supported to be able to be pushed in along its axial direction, a finger operation portion 68 which is integrally formed to project radially outwardly from an outer circumferential surface of the switch main body 66 and to extend along the axial direction of the main body 66, and a push-in section 70 which is integrally formed to stand upright on an edge portion of the finger operation portion 68 on the steering column 58 side (i.e., to extend along the circumferential direction of the main body 66).

As can be seen from FIG. 6, a hold button 72 is disposed on the right edge (FIG. 6) of the front end face of the finger operation portion 68, and a mode switching button 74 for switching a switching mode of a travel range of the automatic transmission mechanism 12 is disposed on a deepest portion of the side surface of the push-in section 70.

When the hold button 72 is not depressed, a normal shift change state is defined, and when the hold button 72 is depressed, the automatic transmission mechanism is fixed at the 3rd speed in the forward drive range, and is fixed at the 2nd speed in the forward 2nd-speed range. When the mode switching button 74 is not depressed, a travel range switching mode in the automatic transmission mechanism 12 is set in a power mode (suitable for mountain path travel) which places an importance on tough travel feeling, and when it is depressed, the switching mode is set in an economy mode (suitable for street travel) which places an importance on economy.

On the other hand, alphanumeric letters "P" indicating the parking range, "R" indicating the reverse range, "N" indicating the neutral range, "D" indicating the forward drive range, "2" indicating the forward 2nd-speed range, and "1" indicating the forward 1st-speed range are sequentially drawn clockwise on the outer circumferential surface of the above-mentioned mounting ring 64. The operation switch 18 outputs a range switching command for defining a travel range set according to a pivot position of the switch main body 66. More specifically, the range switching command is output to achieve a travel range expressed by the alphanumeric letter located just aside the finger operation portion 68. That is, the finger operation portion 68 also serves as an index for indicating the presently set travel range.

As shown in FIG. 6, the alphanumeric letters "N", "D", "2", and "1" are sequentially aligned in a series state at equal small intervals $d_1$. However, the letter "R" is aligned to be separated from the letter "N" by an interval $d_2$ larger than the interval $d_1$, and the letter "P" is aligned to be separated from the letter "R" by the above-mentioned small interval $d_1$. The alphanumeric letters "N", "D", and "2" are arranged at positions where a driver who sits at the driver's seat can directly look at these letters to have the letter "D" at the center when he or she sees forward, as shown in FIG. 4. In this manner, when a driver executes an operation for switching the travel range position among the neutral range "N", the forward drive range "D", and the forward 2nd-speed range "2", he or she can read the alphanumeric letter "N", "D", or "2" indicated by the finger operation portion 68 to instantaneously recognize which travel range is presently set. Thus, a driver can switch the travel range without anxiety.

As can be seen from FIG. 4, a driver cannot directly look at the letters "R" and "P". As will be described in detail later, when the switch main body 66 is merely pivoted, the travel range position cannot be shifted from the neutral range "N" to the reverse range "R", and the switch main body 66 must be axially pushed in to attain this shift operation. As a result, in a state wherein the switch main body 66 is pivoted to desirably switch the travel range position among the neutral range "N", the drive range "D", and the forward 2nd-speed range "2", the reverse range "R" can never be set due to its mechanism. Since the driver cannot directly look at the letters "R" and "P", he or she can also receive as a mental security the fact that the travel range position will never be shifted from the neutral range "N" to the reverse range "R". Thus, the driver can desirably switch the travel range position among the neutral range "N", the drive range "D", and the forward 2nd-speed range "2" without anxiety.

The internal structure of the operation switch 18 will be described in detail below with reference to FIGS. 7 to 10.

Figure 7:
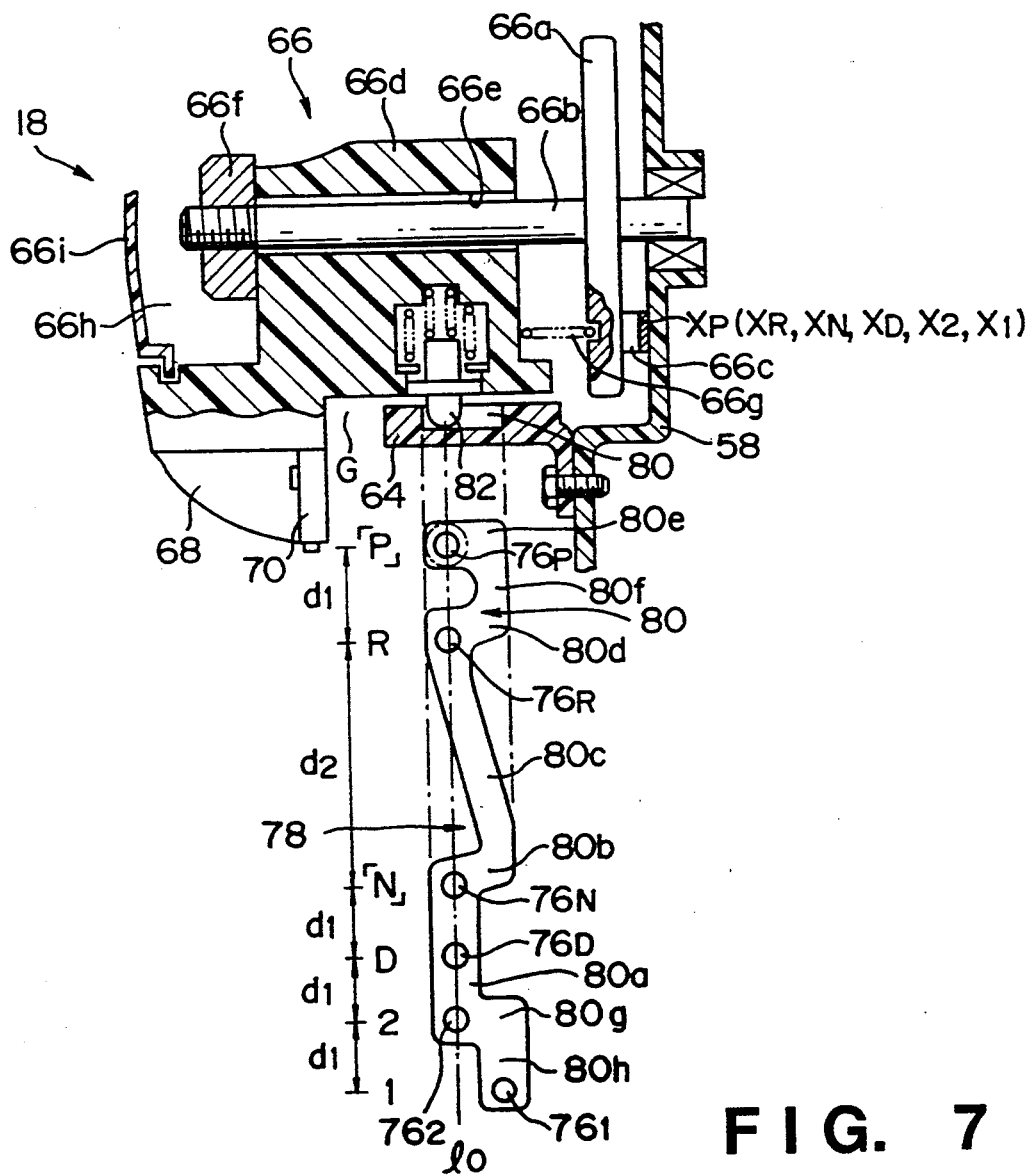
FIG. 7 is a sectional view showing an internal structure of the operation switch together with a formation pattern of a guide groove.

As shown in FIG. 7, the switch main body 66 of the operation switch 18 comprises a shaft portion 66b on which an outward flange portion 66a is integrally formed and which extends along the widthwise direction of the vehicle body. The shaft portion 66b is rotatably supported about its own central axis, and is inhibited from being axially moved. A contact rod 66c is mounted on the outer peripheral portion of the inward surface portion of the outward flange portion 66a to extend axially, i.e., to extend toward the surface of the steering column 58.

Contacts $X_P$, $X_R$, $X_N$, $X_D$, $X_2$, and $X_1$ corresponding to the parking range "P", the reverse range "R", the neutral range "N", the forward drive range "D", the forward 2nd-speed range "2", and the forward 1st-speed range "1" are mounted on the surface portion facing the outer flange portion 66a of the steering column along a rotational path of the contact rod 66c to be able to be in contact with the contact rod 66c in the same manner as the select switch 32 described above. These contacts $X_P$, $X_R$, $X_N$, $X_D$, $X_2$, and $X_1$ are disposed at positions according to the indication positions of the alphanumeric letters for respectively indicating the travel ranges drawn on the outer circumferential surface of the mounting ring 64.

The contacts $X_P$, $X_R$, $X_N$, $X_D$, $X_2$, and $X_1$ are connected to the control unit 30. In this manner, the operation switch 18 outputs a corresponding range switching command, to the control unit 30, from one of the contacts $X_P$, $X_R$, $X_N$, $X_D$, $X_2$, and $X_1$, which is in contact with the contact rod 66c.

The switch main body 66 also comprises a movable portion 66d which is axially movably arranged on the shaft portion 66b. More specifically, an axial through hole 66e is formed in the movable portion 66d, and the shaft portion 66b extends outwardly through this through hole 66e, so that the movable portion 66d is movably supported along the extending direction of the shaft portion 66b. The above-mentioned finger operation portion 68 is integrally formed on the outer circumferential surface of the movable portion 66d. The inward edge portion of the movable portion 66d is formed to have a smaller diameter than that of its outward edge portion, and is stored in the above-mentioned ring-like mounting ring 64.

A locking nut 66f for inhibiting outward movement of the movable portion 66d is threadably engaged with the outward edge portion of the shaft portion 66b. A coil spring 66g is interposed between the movable portion 66d and the outward flange portion 66a, and the movable portion 66d is always biased outwardly by the biasing force of the coil spring 66g. Thus, the movable portion 66d is in contact with the above-mentioned locking nut 66f and is elastically held in position unless an external force is applied thereto. In this manner, the switch main body 66 is normally biased outwardly, and when the above-mentioned push-in section 70 is pushed axially inwardly, the switch main body 66 can be pushed axially inwardly against the biasing force of the coil spring.

A recess portion 66h for receiving the locking nut 66f described above is formed in the outer side surface of the movable portion 66d, and a blindfold plate 66i for closing the recess portion 66h to conceal the locking nut 66f is mounted.

The operation switch 18 comprises a detent mechanism 76 for, when the travel range is switched by pivoting the switch main body 66, precisely locking the pivot position at a corresponding travel range position, and also comprises a regulation mechanism 78 for regulating switching operations from the neutral range "N" to the reverse range "R" and between the reverse range "R" and the parking range "P" so that these switching operations cannot be attained by merely rotating the switch main body 66 unless the switch main body 66 is pushed in axially inwardly.

For the detent mechanism 76 and the regulation mechanism 78, the outward edge of the above-mentioned mounting ring 64 extends to substantially the middle of the small-diameter portion of the movable portion 66d. For this reason, this outward edge forms a gap G with an end face of a stepped portion for defining the large-diameter portion of the movable portion 66d. The axial length of the gap G is set to be slightly larger than an axial push-in amount of the movable portion 66d, as will be described later. The regulation mechanism 78 comprises a guide groove 80 formed in the inner circumferential surface of the mounting ring 64, and one guide pin 82 which is elastically reciprocally mounted on the movable portion 66d so that its outward edge portion is fitted in and guided along the guide groove 80.

Figure 8:
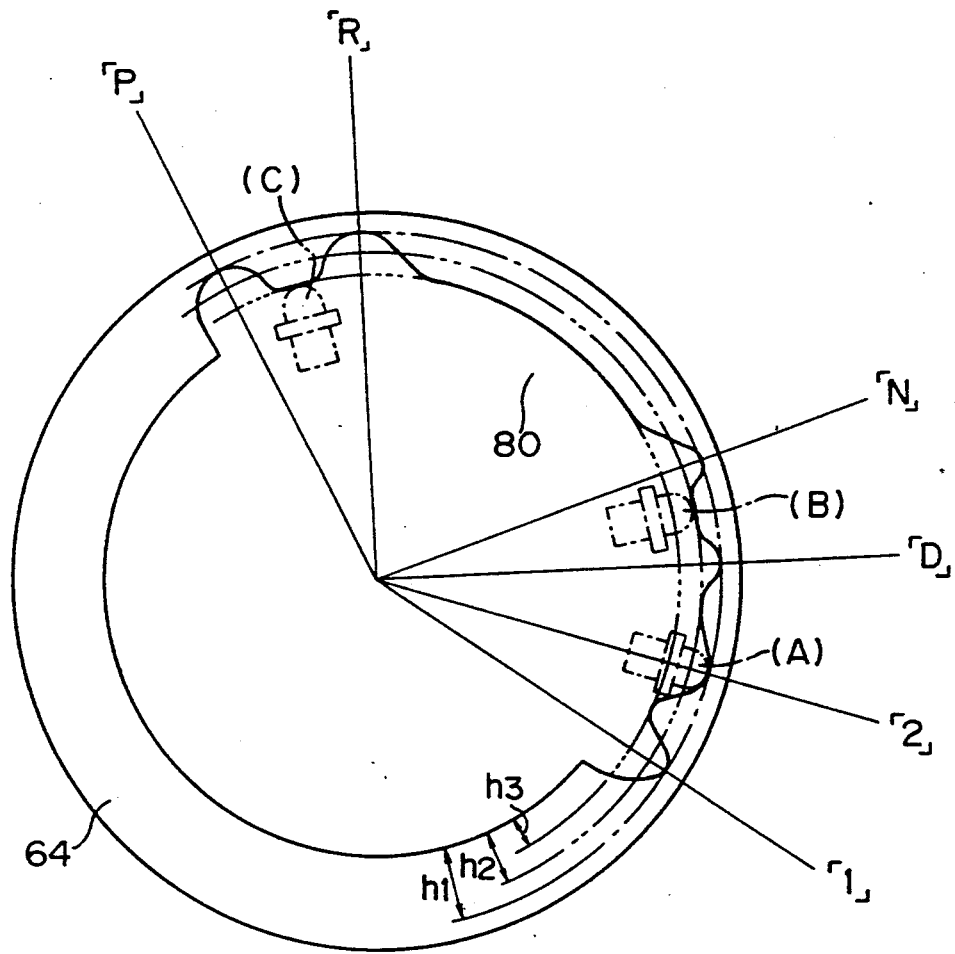
FIG. 8 is a sectional view showing a shape in a direction of depth of the guide groove formed in a mounting ring.

The guide groove 80 is formed to extend between the forward 1st-speed range "1" and the parking range "P", as shown in FIG. 8. When the guide pin 82 is fitted in the guide groove 80, the switch main body 66 is inhibited from being pivoted beyond the forward 1st-speed range "1" and the parking range "P". The above-mentioned detent mechanism 76 has detent holes $76_P$, $76_R$, $76_N$, $76_D$, $76_2$, and $76_1$ respectively corresponding to the parking range "P", the reverse range "R", the neutral range "N", the forward drive range "D", the forward 2nd-speed range "2", and the forward 1st-speed range "1" on the bottom surface of the guide groove 80 on the basis of the above-mentioned arranging relationship, as shown in FIG. 7. These detent holes $76_P$, $76_R$, $76_N$, $76_D$, $76_2$, and $76_1$ are set to be located on one axis $l_0$ extending along the circumferential direction of the mounting ring 64. The bottom surface of each of the detent holes $76_P$, $76_R$, $76_N$, $76_D$, $76_2$, and $76_1$ is set at a position entering radially outwardly from the inner circumferential surface of the mounting ring 64 by a first depth $h_1$, as shown in FIG. 8.

As shown in a lower portion of FIG. 7 in a state wherein a circumferential pattern is developed on a plane, the guide groove 80 is constituted in a continuous state by a linear groove portion 80a which is linearly formed to extend between the forward 2nd-speed range "2" and the neutral range "N" along the circumferential direction $l_0$, a first lateral groove portion 80b extending axially inwardly from the neutral range "N" at the upper end of the linear groove portion 80a (i.e., perpendicular to the linear groove portion 80a), an oblique groove portion 80c obliquely extending from the inward end of the first lateral groove portion 80b to the reverse range "R" with respect to the circumferential direction $l_0$, a second lateral groove portion 80d extending axially inwardly from the reverse range "R", a third lateral groove portion 80e extending axially inwardly from the parking range "P", a first coupling groove portion 80f extending along the circumferential direction $l_0$ to couple the inward ends of the second and third lateral groove portions 80d and 80e, a fourth lateral groove portion 80g extending axially inwardly from the forward 2nd-speed range "2" at the lower end of the above-mentioned linear groove portion 80a, and a second coupling groove portion 80h extending from the inward end of the fourth lateral groove portion 80g to the forward 1st-speed range "1" along the circumferential direction $l_0$.

The extending lengths of the first to third lateral groove portions 80b, 80d, and 80e are respectively defined as an axial push-in amount of the above-mentioned switch main body 66, and are set to be equal to each other. Since the guide groove 80 is constituted as described above, the travel range switching operation from the forward 1st-speed range "1" to the neutral range "N" and the travel range switching operation from the reverse range "R" toward the forward 2nd-speed range "2" can be executed by only one-step operation, i.e., pivoting the switch main body 66. However, the travel range switching operation from the neutral range "N" to the parking range "P", the travel range switching operation between the parking range "P" and the reverse range "R", and the travel range switching operation from the forward 2nd-speed range "2" to the forward 1st-speed range "1" require two-step operations, i.e., must be executed by pivoting the switch main body 66 while the switch main body 66 is kept axially pushed in.

As a result, the travel range switching operations from the neutral range "N" to the reverse range "R" and between the reverse range "R" and the parking range "P" cannot be performed by only a pivot operation of the switch main body 66, and these switching operations can be reliably prevented from being accidentally performed, thus assuring a safety travel state.

As shown in FIG. 8, the depth of the guide groove 80 from the inner circumferential surface of the mounting ring 64 between the forward 2nd-speed range "2" and the neutral range "N" is set to have a second depth $h_2$ slightly smaller than the first depth $h_1$ for defining the depths of the above-mentioned detent holes $76_P$, $76_R$, $76_N$, $76_D$, $76_2$, and $76_1$ from the inner circumferential surface of the mounting ring 64. On the other hand, the depth of the guide groove 80 between the forward 2nd-speed range "2" and the forward 1st-speed range "1" and the depth of the guide groove 80 between the neutral range "N" and the parking range "P" are set to have a third depth $h_3$ smaller than the above-mentioned second depth $h_2$.

As a result, as can be seen from FIG. 8, the substantial depth $(=h_1-h_3)$ of each of the detent holes $76_1$, $76_P$, and $76_R$ corresponding to the forward 1st-speed range "1", the reverse range "R", and the parking range "P" is larger than the substantial depth $(=h_1-h_2)$ of each of the detent holes $76_N$, $76_D$, and $76_2$ corresponding to the neutral range "N", the forward drive range "D", and the forward 2nd-speed range "2".

In this manner, according to this embodiment, since the guide pin 82 is fitted in the corresponding detent hole 76 at each travel range set position, an operation stop position can be determined, and a driver can recognize a stop state of the switch main body 66 operated by himself or herself by a touch based on detent feeling.

According to this embodiment, a rotation starting force necessary for starting pivotal movement of the switch main body 66 from a state wherein the forward 1st-speed range "1", the reverse range "R", or the parking range "P" is set is larger than a rotation starting force necessary for starting pivotal movement of the switch main body 66 from a state wherein the neutral range "N", the forward drive range "D", or the forward 2nd-speed range is set. In other words, a driver can perform the travel range switching operation among the neutral range "N", the forward drive range "D", and the forward 2nd-speed range "2" with a light pivot starting force. Meanwhile, when the driver switches the set state of the forward 1st-speed range "1", the reverse range "R", or the parking range "P" to another travel range, a strong pivot starting force is required to escape from the corresponding deep detent hole $76_1$, $76_N$, or $76_P$, thereby calling a driver's attention to whether or not this switching operation need be performed really. As a result, an erroneous operation can be prevented.

The guide pin 82 to be fitted in the guide groove 80 is integrally formed by a pin main body 82a whose projecting end portion has a round distal end, and an outward flange portion 82b formed at substantially the central portion in its axial direction, as shown in FIG. 7. The guide pin 82 is mounted in such a manner that its portion inwardly from the outward flange portion 82b is fitted in a recess portion 84 formed in the outer circumferential surface of the movable portion 66d. The recess portion 84 is defined by a recess main body 84a having a larger diameter than that of the outward flange portion 82b in its opening portion, and a small-diameter inward flange portion 84b which is formed at the opening portion of the recess main body 84a to just receive the outward flange portion 82b. More specifically, the recess portion 84 comprises a stepped hole having a small-diameter opening portion.

The recess portion 84 stores a locking ring 86 which is in contact with the above-mentioned stepped portion (i.e., an inner end face of the inward flange portion 84b), and has a central opening for receiving a portion of the pin main body 82a inwardly from the outward flange portion 82b. On the other hand, the recess portion 84 stores a first coil spring 88 which is in contact with the inner end face of the guide pin 82 and biases it in a direction to project from the recess portion 84, and a second coil spring 90 which is in contact with the inner surface of the locking ring 86 and biases it against the stepped portion of the inward flange portion 84b in an independent state.

Figure 9:
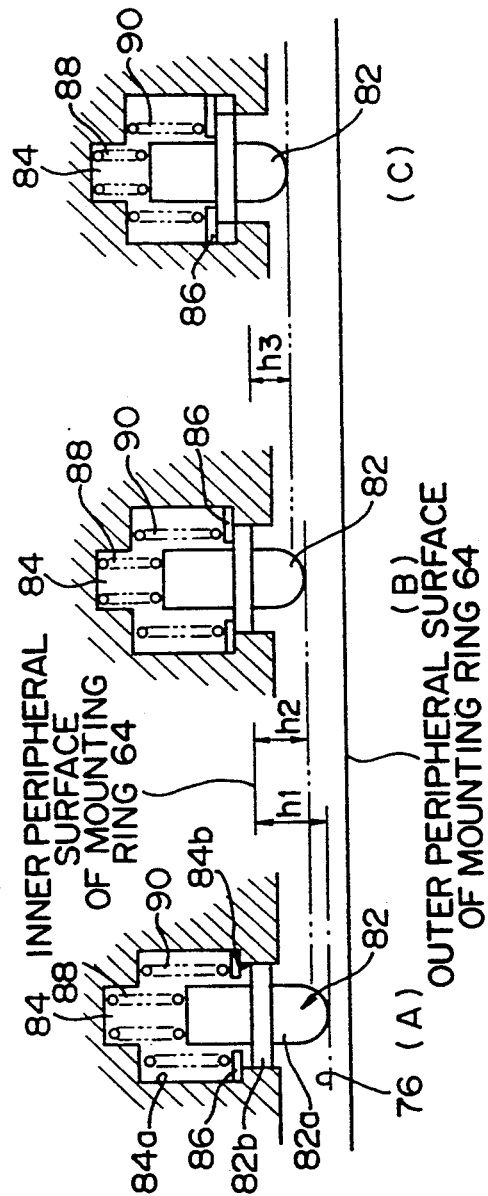
FIG. 9 is a sectional view showing push-in states of a guide pin.

As shown in (A) of FIG. 9, in a state wherein the guide pin 82 is fitted in the detent hole $76_1$, $76_2$, $76_D$, $76_N$, $76_R$, or $76_P$ and its position is locked, in other words, in a state wherein the distal end of the guide pin 82 is brought into contact with a surface having the depth $h_1$ from the inner circumferential surface of the mounting ring 64, the outward flange portion 82a of the guide pin 82 is set to be separated from the locking ring 86 contacting the stepped portion by a distance $(h_1-h_2)$. As a result, as shown in (B) of FIG. 9, in a state wherein the distal end of the guide pin 82 is in contact with the bottom surface of the guide groove 80 between the forward 2nd-speed range "2" and the neutral range "N", the guide pin 82 is pushed inwardly from a state wherein it is fitted in the detent hole $76_1$, $76_2$, $76_D$, $76_N$, $76_R$, or $76_P$ in the radial direction of the switch main body 66 by a distance $(h_1-h_2)$.

In this push-in operation, the outward flange portion 82b is merely in contact with the locking ring 86, and does not push it inwardly. As a result, a push-in force required for this push-in operation need only be a force against the biasing force of the first coil spring 88 which is engaged with only the guide pin 82.

As shown in (C) of FIG. 9, in a state wherein the distal end of the guide pin 82 is in contact with the bottom surface of the guide groove 80 between the neutral range "N" and the parking range "P" and between the forward 2nd-speed range "2" and the forward 1st-speed range "1", the guide pin 82 is pushed inwardly from a state wherein it is fitted in the detent hole $76_1$, $76_2$, $76_D$, $76_N$, $76_R$, or $76_P$ in the radial direction of the switch main body 66 by a distance $(h_1-h_3)$. As can be seen from the above description, since $(h_1-h_3) > (h_1-h_2)$, the outward flange portion 82b is in contact with the locking ring 86 to further push it inwardly in the push-in operation.

As a result, a push-in force required for this push-in operation must be a force against a total of the biasing force of the first coil spring 88 which is engaged with the guide pin 82, and the biasing force of the second coil spring 90 which is engaged with the locking ring 86.

In this manner, according to this embodiment, when the switch main body 66 is pivoted to switch the travel range between the forward 2nd-speed range "2" and the neutral range "N" (the guide pin 82 is slid along the guide groove 80), a contact force between the guide pin 82 and the guide groove 80 (i.e., a frictional engagement force) is defined by only a force against the biasing force of the first coil spring 88, and a pivot operation force can be relatively weak.

Figure 10:
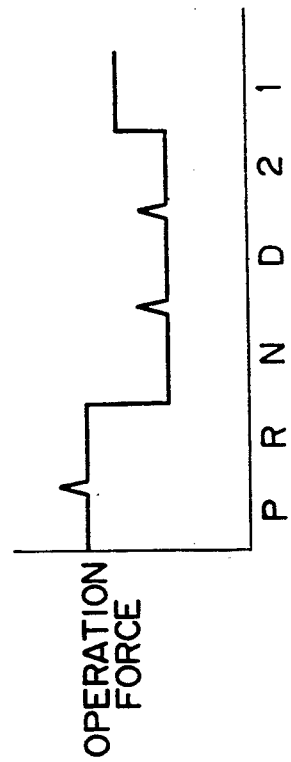
FIG. 10 is a graph showing a difference in operation force of the operation switch when a travel range is switched.

However, when the travel range is switched between the neutral range "N" and the parking range "P" and between the forward 2nd-speed range "2" and the forward 1st-speed range "1", a contact force between the guide pin 82 and the guide groove 80 is defined by a force against the total biasing force of the first and second coil springs 88 and 90, and a large pivot operation force is required. As a result, as shown in FIG. 10, a pivot operation force can have different strength levels, and these different strength levels and a difference in pivot starting forces from the stop positions of the switch main body 66 on the basis of a difference in depths of the above-mentioned detent holes can call a driver's attention to whether or not this switching operation need be performed really. As a result, an erroneous operation can be reliably prevented.

Figure 11:
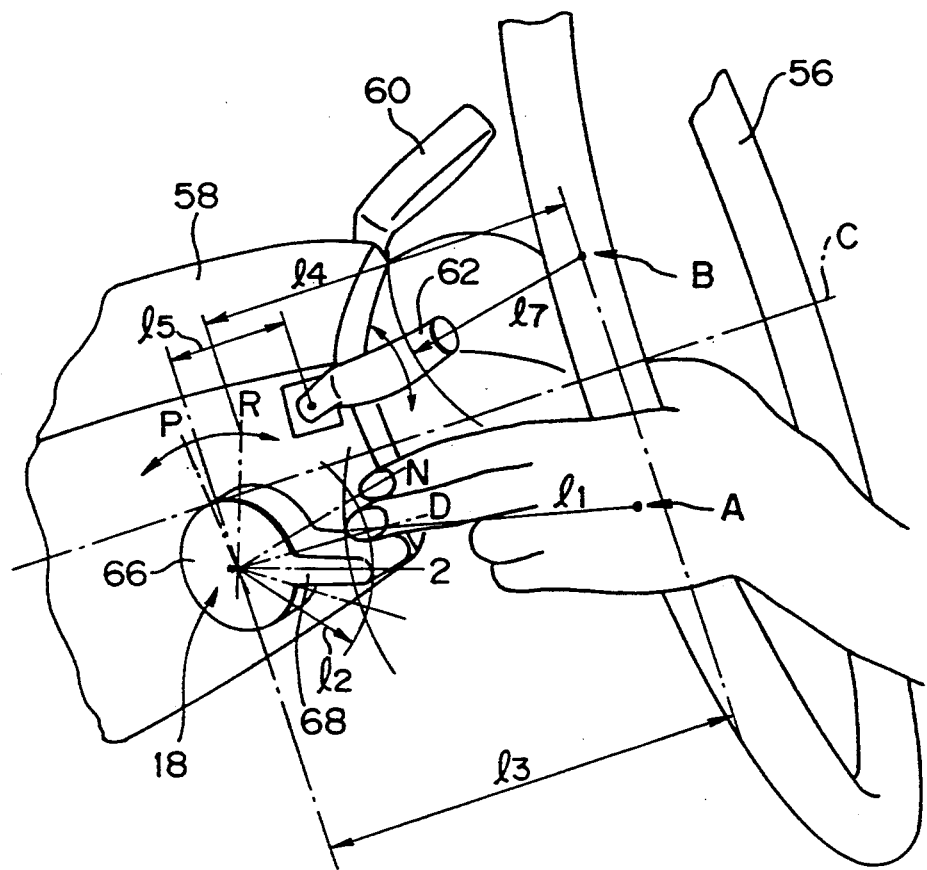
FIGS. 11 and 12 are respectively a perspective view and a side view showing an arranging state of the operation switch.

The operation switch 18 with the above structure is mounted on the left side surface of the steering column 58, as described above. More specifically, the finger operation portion 68 located within a range of the forward 1st-speed range "1" to the neutral range "N" is arranged at a position where a driver can access it with his or her left middle finger, as shown in FIG. 11, in a driving state shown in FIG. 5, i.e., in a state wherein a driver rests his or her both elbows on fixed armrests 92 (an armrest for the right elbow is not shown for the sake of illustrative convenience) and holds the so-called 8 o'clock 20 minute positions of the steering wheel 56 with both hands at ease to drive the vehicle.

In other words, in the above-mentioned state (position), if the pivot radius of the left middle finger is represented by $l_1$ (e.g., 130 mm) and the pivot radius of the finger operation portion 68 is represented by $l_2$, a distance $l_3$ between the pivot center of the operation switch 18 and the grip position of the left hand on the steering wheel 56 is defined so that a pivot path of the tip of the middle finger overlaps a pivot path of the distal end of the finger operation portion 68 located within a range between the forward 1st-speed range "1" and the neutral range "N". That is, the distance $l_3$ is defined to fall within a range wherein the following inequality (1) is satisfied:

$$l_3 < l_1 + l_2 \tag{1}$$

Since inequality (1) is defined as described above, in this embodiment, as shown in FIG. 12, a distance $l_6$ between the distal end of the finger operation portion 68 located at the forward drive range position "D" and the steering wheel 56 is set to be 110 mm.

Figure 12:
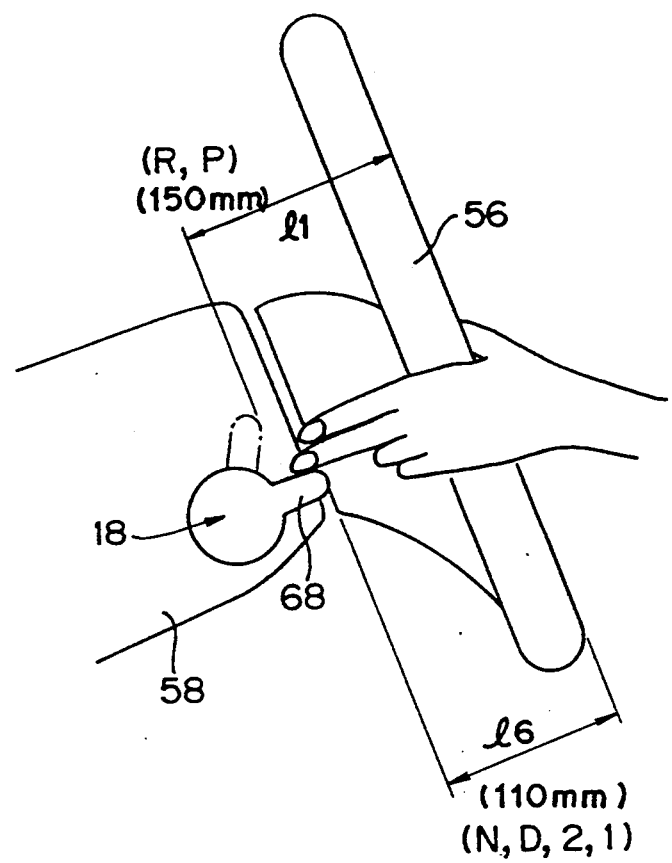

As shown in FIG. 12, if a distance between the distal end of the finger operation portion 68 located at the reverse range position "R" and the steering wheel 56 is represented by $l_4$, the distance $l_4$ is defined to fall within a range wherein the following inequality (2) is satisfied, and is set to be 130 mm in this embodiment:

$$l_4 \geq l_1 \tag{2}$$

The interval $d_2$ between the neutral range "N" and the reverse range "R" is defined to also satisfy the above-mentioned inequality (2).

In this embodiment, since the arranging position of the operation switch 18 is defined in this manner, the driver stretches the middle finger of his or her left hand while holding the steering wheel 56 with both hands, and taps the finger operation portion 68 of the operation switch 18 downward or upward, thereby desirably and instantaneously switching the switch main body 66 between the forward 1st-speed range "1" and the neutral range "N". As a result, the driver can switch the travel range position during travel while holding the steering wheel 56 with both hands, thus guaranteeing a safety drive state.

In this embodiment, since the reverse range position "R" is located outside an operation enable range of the finger operation portion 68 even if the driver stretches his or her middle finger while holding the steering wheel 56 with the left hand, he or she cannot switch the travel range position from the neutral range "N" to the reverse range "R". As a result, while the driver desirably switches the travel range position between the forward 1st-speed range "1" and the neutral range "N" by tapping the finger operation portion 68 with his or her middle finger during forward travel, he or she can reliably avoid an erroneous operation for setting the reverse range "R". Thus, safety in the travel range switching operation can be guaranteed together with the above-mentioned requirement of the two-step operations.

In order to switch the travel range position to the reverse range "R" or the parking range "P", the driver must release his or her left hand from the steering wheel 56. Therefore, the switching operation to the reverse range "R" or the parking range "P" is mentally controlled, and an erroneous operation upon the switching operation to the reverse range "R" or the parking range "P" can be prevented, thus also guaranteeing safety travel from this point of view.

As shown in FIG. 11, the wiper operation lever 62 is arranged above the operation switch 18 and is located behind it by a distance $l_5$. Therefore, when the driver operates the wiper operation lever 62, he or she must change the grip position of the left hand on the steering wheel 56 from the so-called 8 o'clock direction position (indicated by symbol A in FIG. 11) to a so-called 10 o'clock direction position (indicated by symbol B in FIG. 11). That is, an operation pivot range with the pivot radius $l_1$ of the operation switch 18 is different from an operation pivot range with the pivot radius $l_7$ of the wiper operation lever 62.

As a result, in this embodiment, when the driver taps the finger operation portion 68 upward from below to switch the travel range position from the forward 2nd-speed range "2" to the forward drive range "D", even if the middle finger is swung up vigorously, the middle finger will never operate the wiper operation lever 62, and reliability of an operation can be assured. When the wiper operation lever 62 is pushed down from above to set, e.g., an intermittent wiper mode, even if this push-down operation undesirably drives the finger downward, the finger will not touch the finger operation portion 68 of the operation switch 18. Thus, the driver can operate the wiper operation lever 62 without anxiety.

Figure 13:
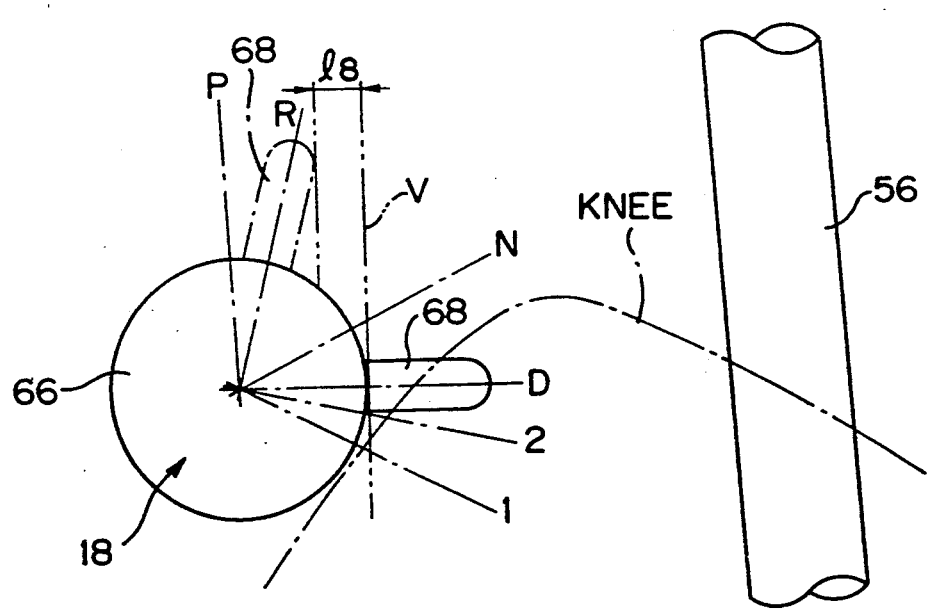
FIG. 13 is a side view for explaining a set position of a reverse range.

In this embodiment, the reverse range position "R" is set to be defined by the finger operation portion 68 located in front of a vertical line V contacting the outer circumferential surface of the switch main body 66 to be separated from it by a distance $l_8$, as shown in FIG. 13. In other words, the reverse range position "R" is defined by pivoting the switch main body 66 via the finger operation portion 68 to a position which can never be accessed by a knee which enters between the operation switch 18 and the steering wheel 56 in an up state (i.e., bent at an acute angle). That is, the reverse range "R" is arranged at a position which satisfies both the condition given by the above-mentioned inequality (2) and a condition for setting a position which cannot be accessed by the knee described above.

Figure 14:
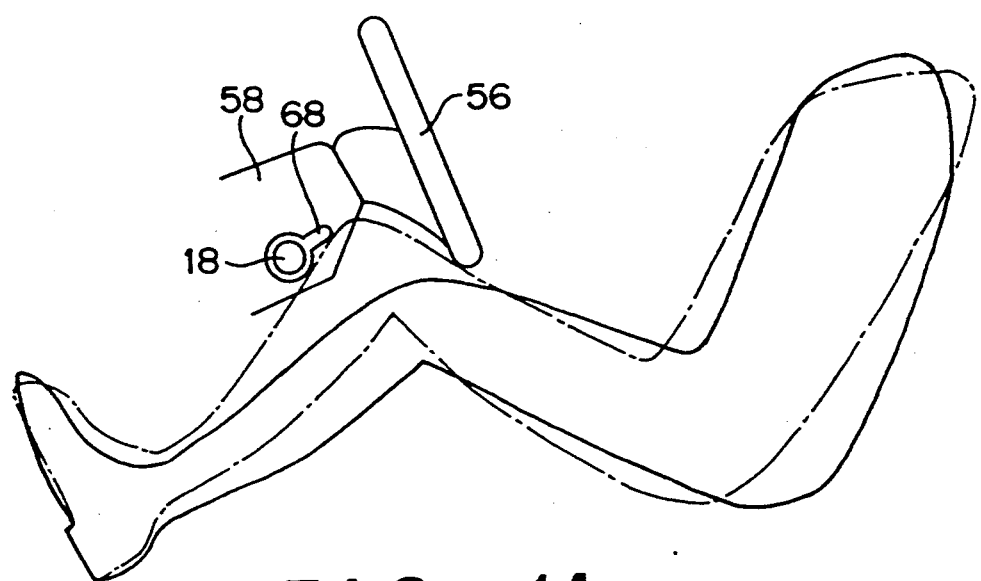
FIG. 14 is a side view for explaining a state wherein an operator draws up his or her left knee.

In a normal drive position, as indicated by a solid line in FIG. 14, the knee of the left leg will never access the operation switch 18. However, if the driver does not wear a seat belt in a head-on collision state or an abrupt braking state, his or her body is pushed forward by an immediate acceleration acting on him, and he or she may be forced to draw up his or her knee of the left leg between the operation switch 18 and the steering wheel 56, as indicated by an alternate long and short dashed line in FIG. 14. With this knee, the finger operation portion 68 of the operation switch 18 may be pushed upward, and the switch main body 66 may be forcibly pivoted from, e.g., the forward drive range "D" to the reverse range "R".

In this case, as described above, although the travel range position can be switched from the forward drive range "D" to the neutral range "N" by only a pivot operation of the switch main body 66, the switching operation from the neutral range "N" to the reverse range "R" cannot be attained by merely pivoting the switch main body 66. That is, two-step operations are required, i.e., the switch main body 66 must be pivoted while being pushed axially inwardly. For this reason, in a normal knee up state, the guide pin 82 is in contact with only the end wall for defining the first lateral groove portion 80b of the guide groove 80, and the switch main body 66 is held in position for defining the neutral range "N" but cannot be switched to the reverse range "R".

However, in the above-mentioned head-on collision state or the abrupt braking state, since the above knee up state is attained with a strong force, in some cases, the guide pin 82 may clear the above-mentioned end wall by the strong force and the switch main body 66 may be pivoted to accidentally set the reverse range "R".

As a result, when the abrupt braking is made, if the operation switch 18 is forcibly pivoted by the up knee from the neutral range "N" to the reverse range "R" by only the pivot operation, the vehicle is temporarily stopped by braking, and subsequently begins to move backward based on setting of the reverse range "R", resulting in danger.

However, in this embodiment, since the reverse range "R" is set at the position which cannot be accessed by the up knee, as described above, even if an immediate acceleration acts on the driver to force him or her to draw up a knee, the neutral range "N" is set in the worst case, and the reverse range will never be set. Thus, a safety travel state can be assured.

Figure 15:
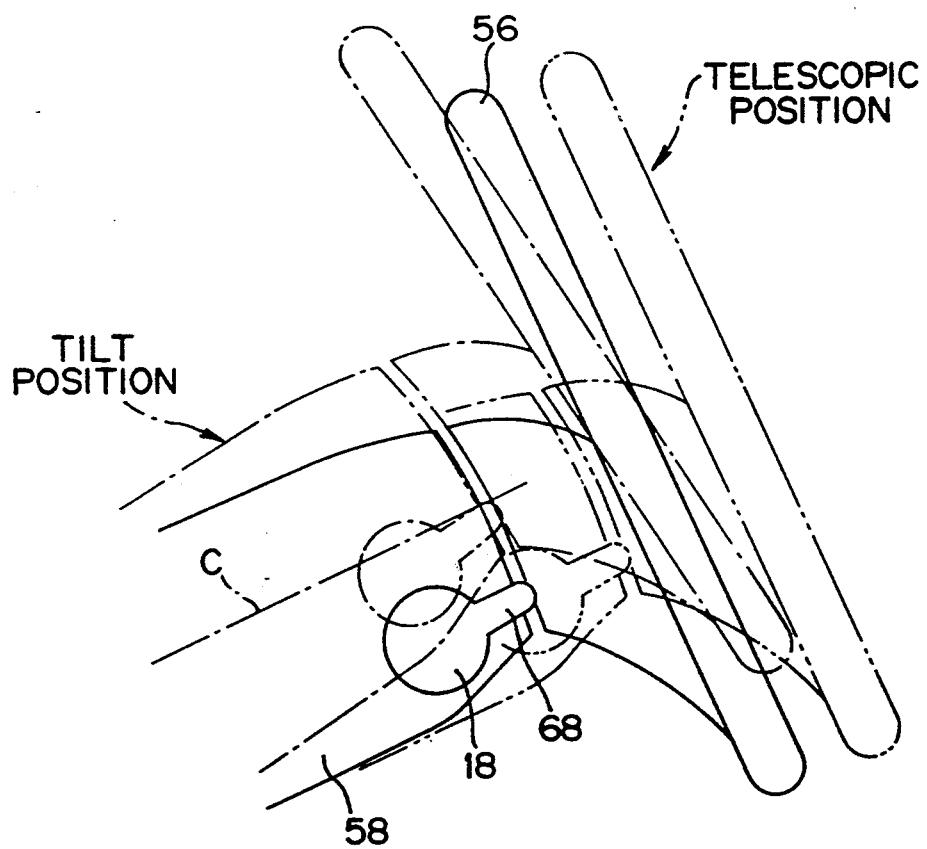
FIG. 15 is a side view showing a positional relationship between a steering wheel and the operation switch when a telescopic mechanism or a tilt mechanism works.

Note that as shown in FIG. 15, in order to allow a driver to take an optimal steering wheel holding position, a so-called telescopic mechanism which allows the steering wheel to be axially slidable, as indicated by an alternate long and two short dashed line, and a so-called tilt mechanism which allows the steering wheel to be vertically movable, as indicated by an alternate long and short dashed line, are provided to the steering wheel 56 although their details are not illustrated. In this embodiment, when the telescopic mechanism or the tilt mechanism works, not only the steering wheel 56 axially reciprocates or is vertically moved from the steering wheel 56, but the steering column 58 and the steering wheel 56 are moved together.

As a result, according to this embodiment, the relative positional relationship between the operation switch 18 and the steering wheel 56 can be kept constant. Even when the steering wheel 56 is subjected to a telescopic operation or is tilted, the travel range switching operation can be reliably executed while a driver keeps holding the steering wheel 56 with both hands.

Referring again to FIG. 2, a travel range indicator 96 for indicating the presently set travel range based on the travel range set by the operation switch 18 is arranged on a portion of an instrument panel 94 on which a speedometer, a tachometer, and the like are arranged. In this travel range indicator 96, an alphanumeric letter corresponding to the presently set travel range is illuminated. Near the travel range indicator 96, there is arranged an A/T warning lamp 98 for informing a failed state to the driver when the control unit 30 determines that control fails since the travel range instructed by the operation switch 18 is different from that set by the select switch 32.

The travel range switching operation by operating the operation switch 18 by the driver in the operation apparatus 10 with the above arrangement will be described below.

In a state wherein the parking range "P" is set by the operation switch 18, and the vehicle stands still, a driver opens a door (not shown), enters the passenger room, slowly sits on a driver's seat, as shown in FIG. 5, and turns an ignition switch (not shown) with his or her right hand to start the engine 14 while depressing a brake pedal (not shown). Thereafter, the driver holds the switch main body 66 of the operation switch 18 with his or her left hand without gripping the steering wheel 56, and pushes it axially inwardly against the biasing force of the coil spring 66g, so that the guide pin 82 is disengaged from the detent hole 76$_P$ corresponding to the parking range "P", slides along the third lateral groove portion 80e, and then reaches the inner end portion of the coupling groove portion 80f, thus stopping the push-in operation. Thereafter, the driver pivots the switch main body 66 downward, so that the guide pin 82 slides along the first coupling groove portion 80f, and reaches the inner end portion of the second lateral groove portion 80d, thus stopping the pivot operation.

Thereafter, when the driver releases the push-in force of the switch main body 66, the switch main body 66 is displaced axially outwardly as a whole by the biasing force of the coil spring 66g, so that the guide pin 82 slides along the second lateral groove portion 80d, and is fitted in and stopped at the detent hole 76$_R$ corresponding to the reverse range "R". In this manner, the travel range position is switched to the reverse range "R".

When the vehicle is to be moved backward, the driver releases his or her foot from the brake pedal while the reverse range "R" is set, and depresses an accelerator pedal. On the other hand, when the vehicle is to be moved forward, the driver holds the switch main body 66 with his or her left hand, and pivots it downward, so that the guide pin 82 slides along the oblique groove portion 80c and reaches and stops at the inner end portion of the first lateral groove portion 80b. Subsequently, the switch main body 66 is displaced axially outwardly by the biasing force of the coil spring 66g, so that the guide pin 82 slides along the first lateral groove portion 80b and is fitted in and stopped at the detent hole 76$_N$ corresponding to the neutral range "N". In this manner, the travel range position can be switched to the neutral range "N".

In a state wherein the neutral range "N" is set in this manner, the driver rests both elbows on the armrests 92, and grips the so-called 8 o'clock 20 minute direction positions of the steering wheel 56 to take a driving position. As described above, the travel range switching operation between the neutral range "N" and the forward 2nd-speed range "2" can be attained by only tapping the finger operation portion 68 to pivot the switch main body 66. Therefore, the driver stretches the middle finger of the left hand to tap the finger operation portion 68 downward from the set position of the neutral range "N" while holding the steering wheel 56 with both hands.

With this tap-down operation, the guide pin 82 is lightly disengaged from the detent hole 76$_N$ corresponding to the neutral range "N", slides along the linear groove portion 80a, and is then fitted in and stopped at the detent hole 76$_D$ corresponding to the forward drive range "D". In this manner, the travel range position can be switched to the forward drive range "D". When the forward drive range "D" is set in this manner, the driver releases his or her foot from the brake pedal, and depresses the accelerator pedal, thus driving the vehicle forward in an automatic transmission state.

When the travel range position is switched to the neutral range while the vehicle is stopped at, e.g., an intersection, the driver stretches the middle finger of his or her left hand while gripping the steering wheel 56 with both hands, and taps the finger operation portion 68 of the operation switch 18 upward, so that the guide pin 82 is lightly disengaged from the detent hole $76_D$ corresponding to the drive range "D", slides along the linear groove portion 80a, and is then fitted in and stopped at the detent hole $76_N$ corresponding to the neutral range "N". In this manner, the travel range position can be switched to the neutral range "N".

During forward travel, for example, when the vehicle reaches a long down slope, and requires an engine brake, the driver stretches the middle finger of his or her left hand while gripping the steering wheel 56 with both hands, and taps the finger operation portion 68 of the operation switch 18 downward, so that the guide pin 82 is lightly disengaged from the detent hole $76_D$ corresponding to the drive range "D", slides along the linear groove portion 80a, and is fitted in and stopped at the detent hole $76_2$ corresponding to the forward 2nd-speed range "2". In this manner, the travel range position can be switched to the forward 2nd-speed range "2".

During forward travel, for example, when the vehicle reaches a steep down slope, and requires a strong engine brake, the driver stretches the middle finger of his or her left hand while gripping the steering wheel 56 with both hands, and pushes the push-in section 70 of the operation switch 18 axially inwardly against the biasing force of the coil spring 66g, so that the guide pin 82 is disengaged from the detent hole $76_2$ corresponding to the forward 2nd-speed range "2", slides along the fourth lateral groove portion 80g, and reaches the upper end portion of the second coupling groove portion 80h, thus stopping the push-in operation. Thereafter, the driver pivots the finger operation portion 68 downward (i.e., taps it downward from above) with the middle finger which has pushed in the push-in section 70, so that the guide pin 82 slides along the second coupling groove portion 80h, and is fitted in and stopped at the detent hole $76_1$ for defining the forward 1st-speed range "1". In this manner, the travel range position can be switched to the forward 1st-speed range "1".

In this manner, when the forward 1st-speed range "1" is set, a strong engine brake can be attained. However, when the strong engine brake is erroneously set during high-speed travel, a stable travel state may be disturbed. For this reason, in this embodiment, as described above, when the travel range position is switched from the forward 2nd-speed range "2" to the forward 1st-speed range "1", two-step operations, i.e., push-in and pivot operations are required although the left hand keeps holding the steering wheel 56. Thus, the forward 1st-speed range "1" cannot be set by merely pivoting the finger operation portion 68.

As a result, in a state wherein the travel range switching operation is executed between the forward 2nd-speed range "2" and the neutral range "N" with a light operation force, the forward 1st-speed range "1" cannot be easily set. In addition, in order to switch the travel range position from the forward 2nd-speed range "2" to the forward 1st-speed range "1", a special attention is required, and it can be effectively prevented to erroneously set the forward 1st-speed range "1".

More specifically, in this embodiment, during forward travel of the vehicle, when the driver changes the travel range position between the forward 2nd-speed range "2" and the neutral range "N" while he or she keeps holding the steering wheel 56 with both hands, he or she stretches the middle finger of his or her left hand and lightly taps the finger operation portion 68 of the operation switch 18 downward or upward to pivot the switch main body 66, thereby executing the travel range switching operation during forward travel without releasing the left hand from the steering wheel 56, i.e., while holding the steering wheel 56 with both hands. Thus, high-level safety upon operation of the steering wheel 56 can be attained.

When the travel range position is switched from the forward 2nd-speed range "2" to the forward 1st-speed range "1", the driver stretches the middle finger of his or her left hand, temporarily axially pushes in the push-in section 70 of the operation switch 18, and then strongly taps the finger operation portion 68 downward to pivot the switch main body 66. As a result, the driver can execute the travel range switching operation for effecting a strong engine brake without releasing the left hand from the steering wheel 56, i.e., while holding the steering wheel 56 with both hands. Thus, high-level safety upon operation of the steering wheel 56 can be similarly attained.

When the travel direction of the vehicle is to be reversed from a forward travel state, after the travel range position is temporarily switched to the neutral range "N" by the above-mentioned operations, the driver releases his or her left hand from the steering wheel 56, and pushes the push-in portion 70 axially inwardly against the biasing force of the coil spring 66g with the middle finger of the released left hand. With this push-in operation, the guide pin 82 is disengaged from the detent hole $76_N$ corresponding to the neutral range "N", slides along the first lateral groove portion 80b, and reaches the lower end portion of the oblique groove portion 80c, thus stopping the push-in operation. Thereafter, the driver taps the finger operation portion 68 upward, so that the guide pin 82 slides along the oblique groove portion 80c, reaches its upper end portion, and is fitted in and stopped at the detent hole $76_R$ corresponding to the reverse range "R". In this manner, the travel range position can be switched to the reverse range "R".

When the travel range position is to be switched from the reverse range "R" to the parking range "P", operations quite opposite to those for switching the travel range position from the parking range "P" to the reverse range "R" are executed.

More specifically, in conventional vehicles, when a transmission operation in a manual transmission mechanism or a travel range switching operation in an automatic transmission mechanism is to be performed regardless of types of transmission mechanism (manual or automatic transmission) or types of shift lever (column or floor shift lever type), a driver must release his or her left hand from the steering wheel 56 to perform the operation, a so-called single-hand driving state occurs, and it is not preferable in terms of safety. According to this embodiment, however, this problem can be solved, and the travel range switching operation can be performed without releasing the left hand from the steering wheel 56, i.e., while holding the steering wheel 56 with both hands. As a result, a greatly improved novel driving operation in terms of safety can be realized.

According to this embodiment, the operation switch 18 for switching the transmission range position is mounted on the left side surface of the steering column 58, and a front-wheel driving system is employed. As a result, a floor between the driver's seat and the front passenger's seat can be formed to be almost flat, and a space around the driver's seat can be "neatly" arranged. In this manner, gorgeous circumstances as if the driver's seat were placed on the floor of a reception room can be attained, and the circumstances in the passenger room brews a very "leisurely" atmosphere in addition to the fact that the driver can rest elbows of both arms on the armrests 92 and can take a relaxed driving position. As a result, a comfortable, safety driving condition can be naturally attained.

A control system for controlling a motorized driving operation of the automatic transmission mechanism 12 on the basis of a travel range switching operation through the operation switch 18 with the above-mentioned structure will be described below with reference to FIGS. 16 to 27.

The control system mainly comprises a signal generation mechanism 100 equipped in the operation switch 18, and the control unit 30 for simultaneously or solely driving the first and second driving motors 22A and 22B of the motorized travel range switching apparatus 20 on the basis of a travel range switching signal and a range setting signal output from the signal generation mechanism 100 so that the automatic transmission mechanism 12 can be immediately set at the travel range position newly set by the operation switch 18. The signal generation mechanism 100 of the operation switch 18 will be described in detail below.

As has already been described above with reference to FIG. 7, the signal generation mechanism 100 comprises the contacts $X_P$, $X_R$, $X_N$, $X_D$, $X_2$, and $X_1$ formed on the insulating portion defined on the left side surface of the steering column 58 in correspondence with the travel ranges "P", "R", "N", "D", "2", and "1", and the contact rod 66c fixed on the outward flange portion 66a of the switch main body 66 and sequentially contacting the contacts $X_P$, $X_R$, $X_N$, $X_D$, $X_2$, and $X_1$ in accordance with the pivot operation of the switch main body 66.

Figure 16:
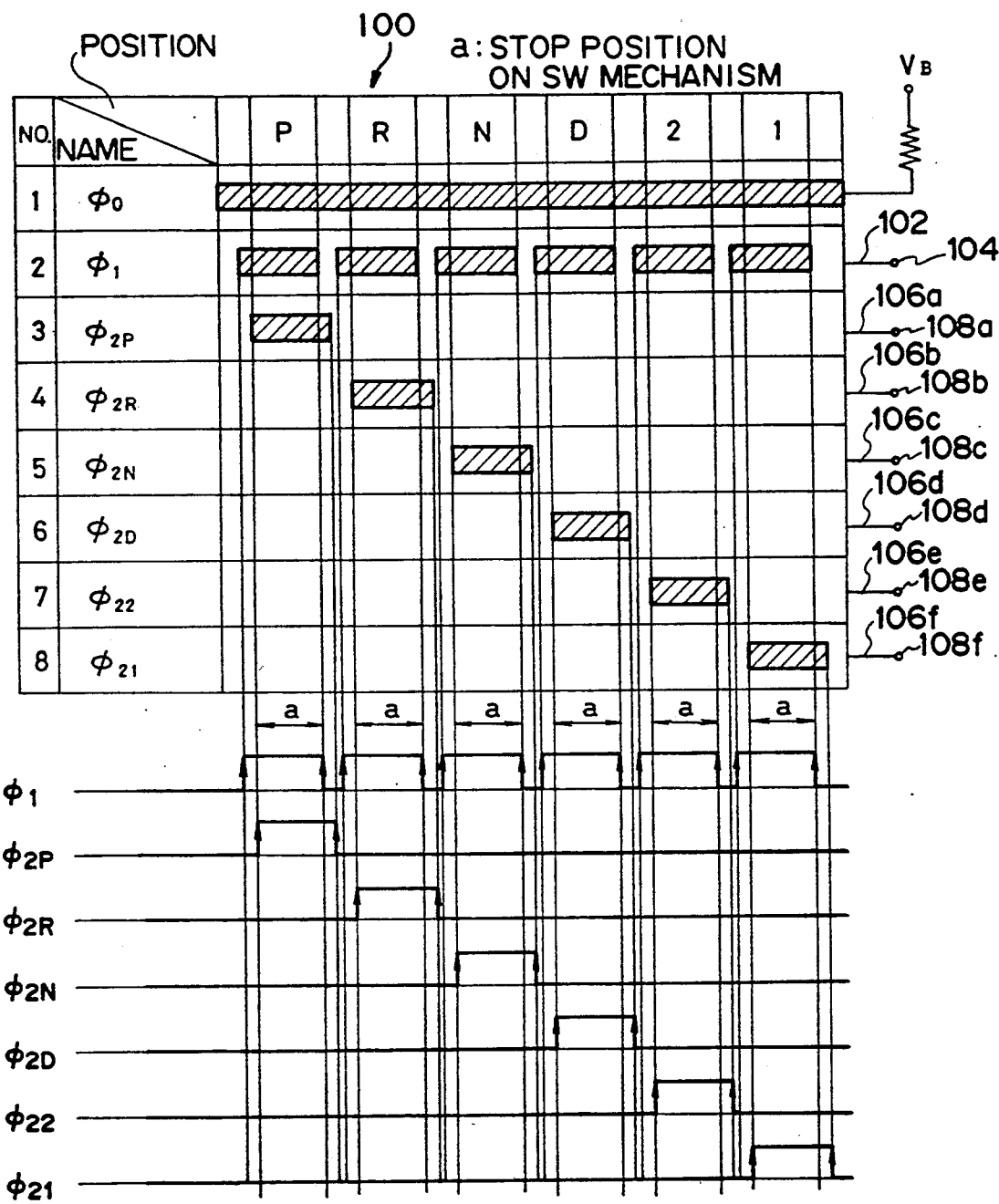
FIG. 16 is a schematic diagram showing an arrangement of a signal generation mechanism in the operation switch.

More specifically, as shown in FIG. 16, the contacts $X_P$, $X_R$, $X_N$, $X_D$, $X_2$, and $X_1$ are constituted by a feeder terminal $\phi_0$ extending in an arcuated pattern along the pivot direction of the switch main body 66 and continuously formed to extend all over the contacts $X_P$, $X_R$, $X_N$, $X_D$, $X_2$, and $X_1$, first contact terminals $\phi_1$ sequentially aligned in a line along the pivot direction of the switch main body 66 beside the feeder terminal $\phi_0$, and independently formed in units of the contacts $X_P$, $X_R$, $X_N$, $X_D$, $X_2$, and $X_1$, and second contact terminals $\phi_{2P}$, $\phi_{2R}$, $\phi_{2N}$, $\phi_{2D}$, $\phi_{22}$, and $\phi_{21}$ sequentially aligned in a line along the pivot direction of the switch main body 66 beside the corresponding first contact terminals $\phi_1$, and formed in correspondence with the contacts $X_P$, $X_R$, $X_N$, $X_D$, $X_2$, and $X_1$.

The feeder terminal $\phi_0$ is connected to a battery (not shown) through a resistor (not shown). As shown in FIG. 16, each first contact terminal $\phi_1$ is formed to extend along the pivot direction of the switch main body 66 in a sectorial shape having a predetermined central angle $\theta_1$ (it is illustrated as a rectangular shape for the sake of illustrative convenience in FIG. 16). The adjacent first contact terminals $\phi_1$ are separated from each other by equal angular intervals having a predetermined central angle $\theta_2$. The first contact terminals $\phi_1$ are electrically commonly connected by a first connection line 102 consisting of branch connection lines 102a temporarily extending sideways from their edges along a direction perpendicular to the slide direction of the contact rod 66c, and a main connection line 102b for commonly coupling these branch connection lines 102a and extending along the slide direction of the contact rod 66c. An end portion of the first connection line 102 is defined as a first output terminal 104.

On the other hand, the second contact terminals $\phi_{2P}$, $\phi_{2R}$, $\phi_{2N}$, $\phi_{2D}$, $\phi_{22}$, and $\phi_{21}$ are formed to extend along the slide direction of the contact rod 66c in a sectorial shape having the above-mentioned central angle $\theta_1$, and are entirely offset by a predetermined central angle $\theta_3$ along a forward operation direction of the operation switch 18 (this forward operation direction is defined as an operation direction from the parking range "P" toward the forward 1st-speed range "1", and a reverse operation direction is defined as an operation direction from the forward 1st-speed range "1" toward the parking range "P").

This offset amount (angle) $\theta_3$ is set to be smaller than the separation angle $\theta_2$ of the first contact terminals $\phi_1$. Therefore, the second contact terminal $\phi_2$ of a given travel range and the first contact terminal $\phi_1$ of the adjacent travel range are completely separated by a central angle $(\theta_2 - \theta_3)$, and the first contact terminal $\phi_1$ of a given travel range and the second contact terminal $\phi_2$ of the adjacent travel range are also completely separated by a central angle $(\theta_2 - \theta_3)$. More specifically, the contacts $X_P$, $X_R$, $X_N$, $X_D$, $X_2$, and $X_1$ of the adjacent travel ranges are completely separated from each other by this complete separation angle $(\theta_2 - \theta_3)$.

Figure 17A:
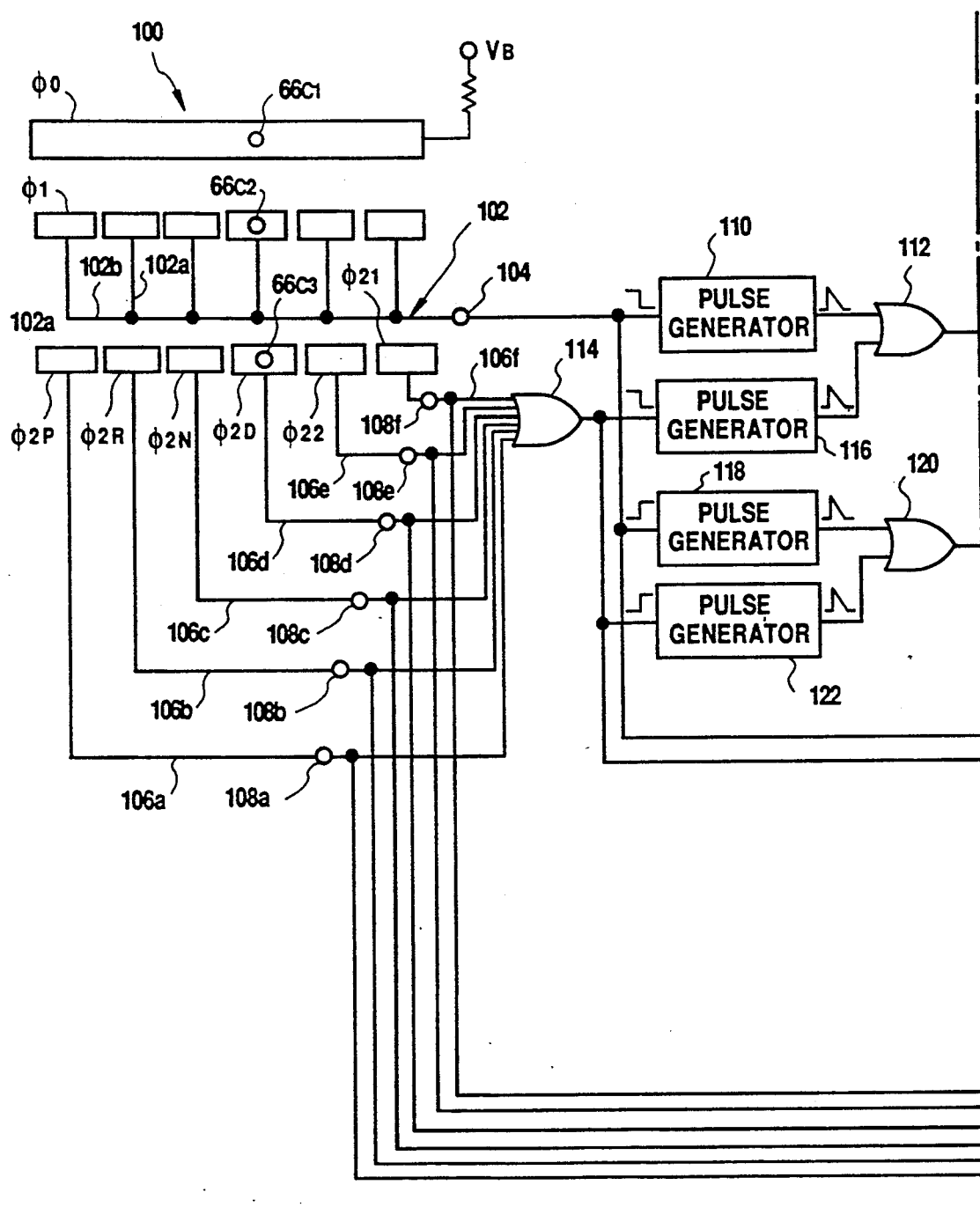
FIG. 17A (a and b) are block diagrams showing in detail a connection state between the operation switch and the control unit.
Figure 17A:
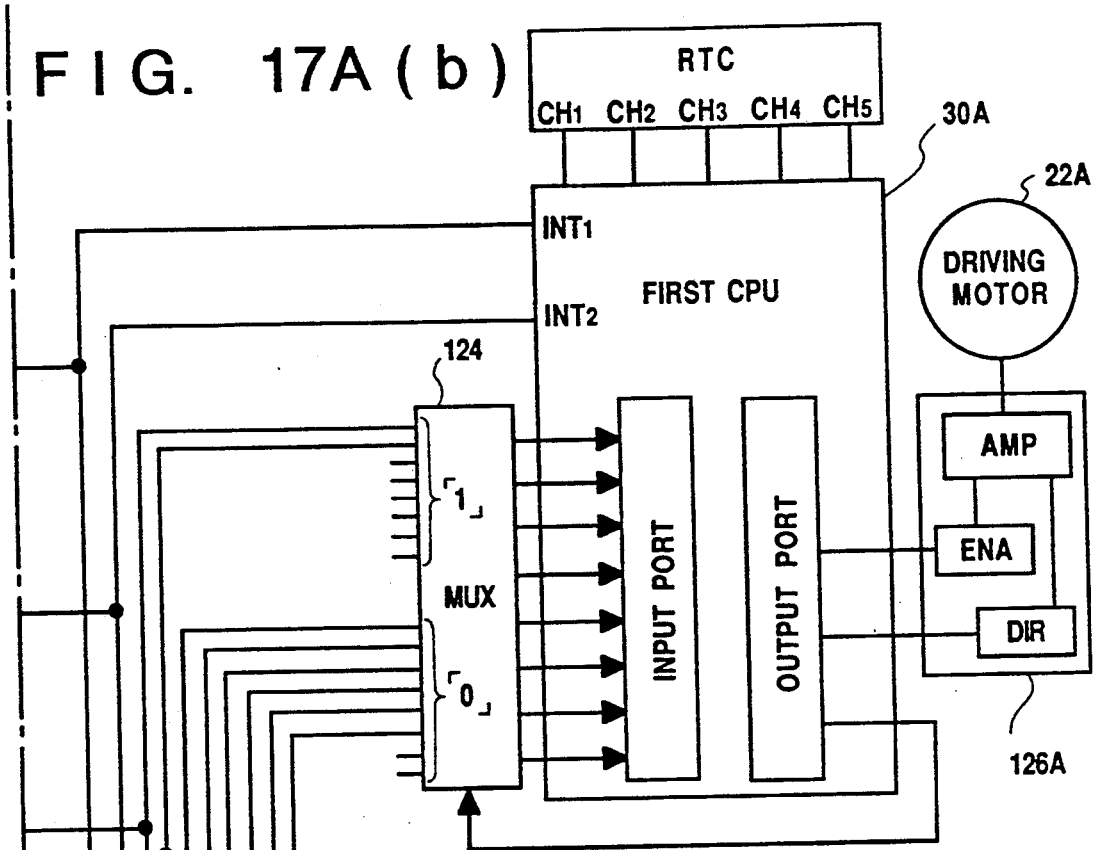
Figure 17A:
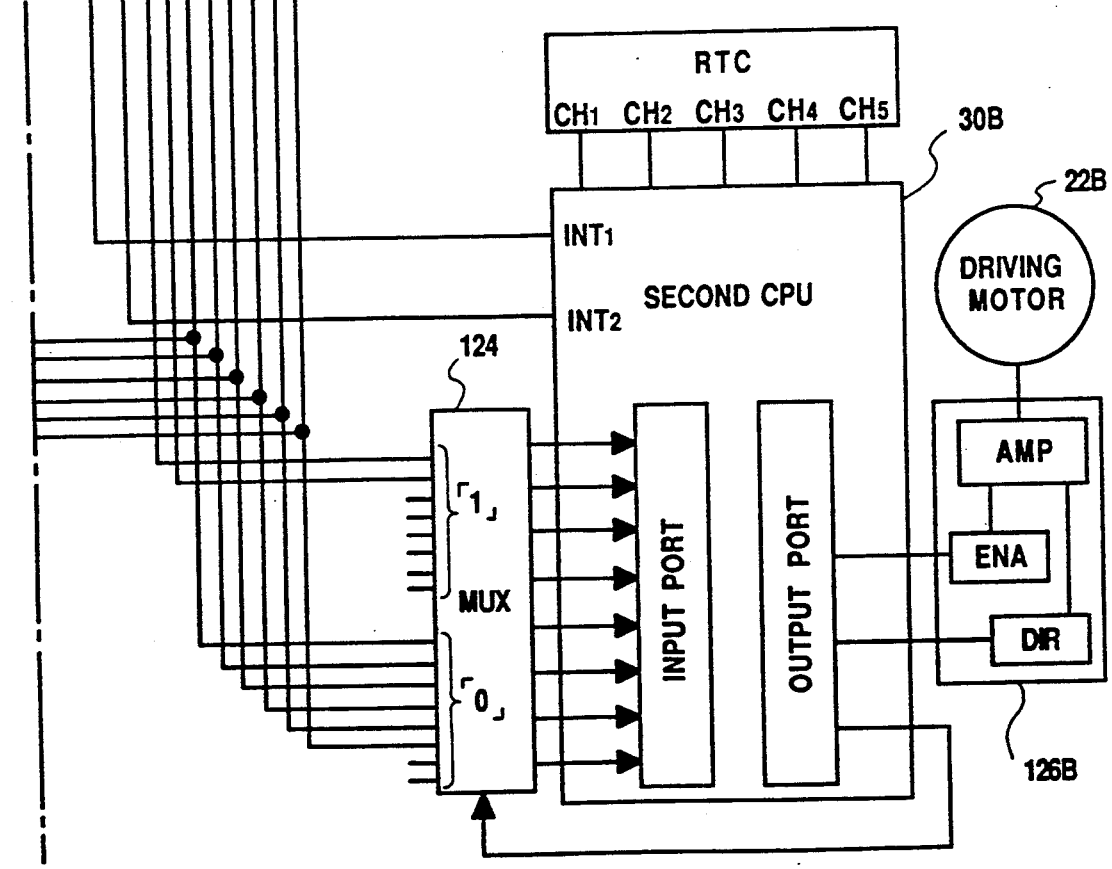

Note that in FIG. 16, for the sake of easy understanding, the second contact terminals $\phi_{2P}$, $\phi_{2R}$, $\phi_{2N}$, $\phi_{2D}$, $\phi_{22}$, and $\phi_{21}$ are illustrated so that they are arranged not to overlap each other in the slide direction of the contact rod 66c. However, in practice, as shown in FIG. 17A, these contact terminals are independently aligned in a line along the travel direction of the contact rod 66c. The second contact terminals $\phi_{2P}$, $\phi_{2R}$, $\phi_{2N}$, $\phi_{2D}$, $\phi_{22}$, and $\phi_{21}$ are led outwardly by connection lines 106a to 106f which temporarily extend sideways from the edges of the terminals along a direction perpendicular to the slide direction of the contact rod 66c, and then extend along the slide direction of the contact rod 66c. The end portions of these second connection lines 106a to 106f are defined as second output terminals 108a to 108f.

Figure 17B:
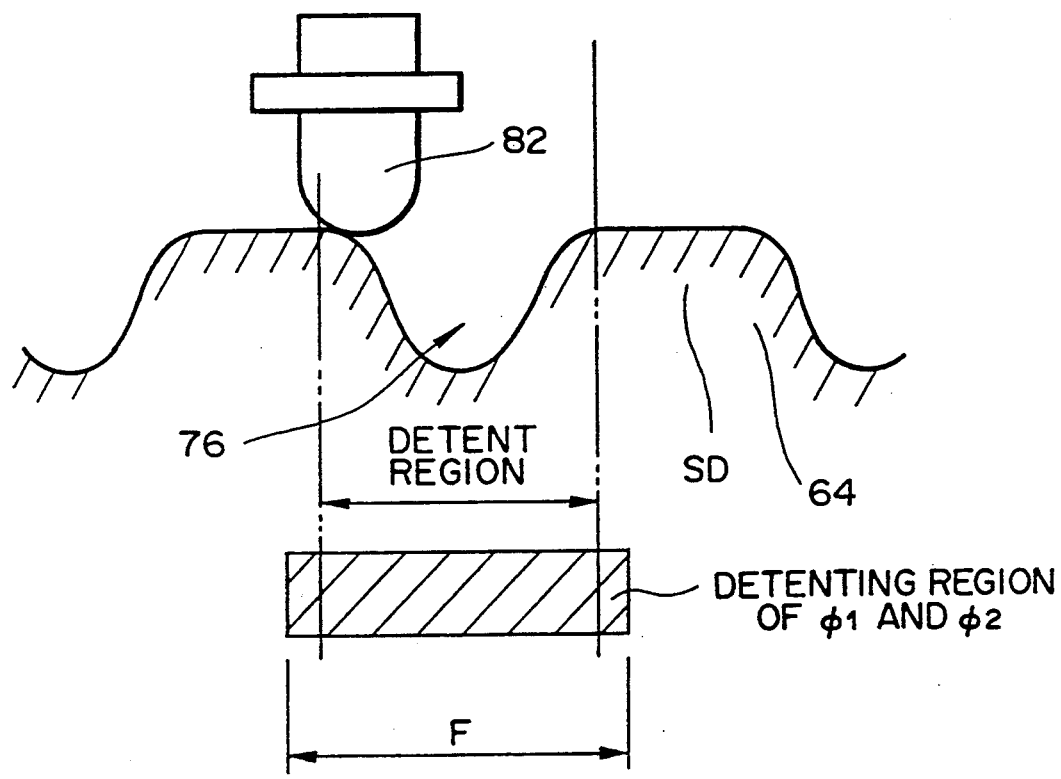
FIG. 17B is a view showing the relationship between a formation range of a detent hole in the operation switch and a formation range of a contact for outputting an electrical signal indicating a travel range position.

The relationship between extending zones of the first contact terminals $\phi_1$ and the corresponding second contact terminals $\phi_{2P}$, $\phi_{2R}$, $\phi_{2N}$, $\phi_{2D}$, $\phi_{22}$, and $\phi_{21}$ in the respective travel ranges, and formation zones of corresponding detent holes in the detect mechanism 76 for mechanically restraining the travel ranges in the operation switch 18, which have already been described above with reference to FIGS. 7 and 8 will be described below with reference to FIG. 17B.

As shown in FIG. 17B, if a total extending zone of the first contact terminal $\phi_1$ in each travel range and the corresponding second contact terminal $\phi_2$ (i.e., a zone extending from the left edge of the first contact terminal $\phi_1$ to the right edge of the corresponding second contact terminal, i.e., a zone for outputting an electrical signal indicating a corresponding travel range) is represented by F, the center of this extending zone F is set to coincide with the center of the detent hole 76 in the corresponding travel range. The extending zone F is set to be wider than the formation zone of the corresponding detent hole 76. More specifically, the two edges of the extending zone F are formed over flat top portions of detent peaks SD formed to be located at two sides of the corresponding detent hole 76, as shown in FIG. 17B.

In this manner, according to this embodiment, since the extending zone F of the contact terminal in each travel range is formed in association with the formation of a zone of the corresponding detent hole 76, even when a driver operates the operation switch 18 vigorously, i.e., pivots the operation switch 18 beyond the central position of the detent hole 76 of the travel range to be set, the switch 18 can be returned to substantially the central position of the detent hole by a detent force as long as the switch falls within a detent zone of the travel range to be set. In addition, since the extending zone of the contact terminal for electrically indicating this travel range is formed to be wider than the detent zone, an electrical signal can be prevented from being erroneously output within a zone for mechanically setting the travel range, and safety in travel control can be guaranteed.

The above-mentioned contact rod 66c comprises a first slide brush $66c_1$ which is always in contact with the feeder terminal $\phi_0$ when the switch main body 66 is pivoted, a second slide brush $66c_2$ which is in selective contact with the first contact terminals $\phi_1$, and a third slide brush $66c_3$ which is in selective contact with the second contact terminals $\phi_{2P}$, $\phi_{2R}$, $\phi_{2N}$, $\phi_{2D}$, $\phi_{22}$, and $\phi_{21}$. These first to third slide brushes $66c_1$, $66c_2$, and $66c_3$ are moved together according to a pivotal movement of the switch main body 66, and are aligned in a line along a direction perpendicular to the moving direction of the contact rod 66c.

Each of the second and third slide brushes $66c_2$ and $66c_3$ has a circular contact end face (slide surface) having a diameter smaller than the above-mentioned complete separation amount ($\theta_2 - \theta_3$). The first and second slide brushes $66c_1$ and $66c_2$, and the first and third slide brushes $66c_1$ and $66c_3$ are electrically connected to each other.

As a result, signals having waveforms shown in the timing chart portion of FIG. 16 are output from the first output terminal 104 and the second output terminals 108a to 108f upon operation of the operation switch 18, i.e., the pivotal movement of the switch main body 66. More specifically, the first output terminal 104 outputs an "L"-level signal when the second slide brush $66c_2$ is in contact with the insulating portion, and outputs an "H"-level signal when the second slide brush $66c_2$ is in contact with the first contact terminal $\phi_1$. Each of the second output terminals 108a to 108f outputs an "L"-level signal while the third slide brush $66c_3$ is in contact with the insulating portion, and outputs an "H"-level signal while the third slide brush $66c_3$ is in contact with the corresponding one of the second contact terminals $\phi_{2P}$, $\phi_{2R}$, $\phi_{2N}$, $\phi_{2D}$, $\phi_{22}$, and $\phi_{21}$.

In this embodiment, the "H"-level signal from the first output terminal 104 and the "H"-level signal from one of the second output terminals 108a to 108f define range setting signals for indicating the travel range presently set by the operation switch 18. On the other hand, the "L"-level signal from the first output terminal 104 and the "L"-level signals from the second output terminals 108a to 108f define travel range switching signals for indicating that the travel range switching operation is started by the operation switch 18.

When the following travel ranges are set by pivoting the switch main body 66, signals are output from the first output terminal 104 and the second output terminals 108a to 108f in the following order.

More specifically, when the switch main body 66 is pivoted in a forward direction from a state wherein the neutral range "N" is presently set, as shown in FIG. 18A, i.e., from a state wherein the "H"-level signals are output from both the first output terminal 104 and the second output terminal 108c, the second slide brush $66c_2$ is disengaged from the first contact terminal $\phi_1$ corresponding to the neutral range "N", and the output from the first output terminal 104 goes from "H" level to "L" level. Subsequently, the third slide brush $66c_3$ is disengaged from the second contact terminal $\phi_{2N}$ corresponding to the neutral range "N", and the output from the second output terminal 108c goes from "H" level to "L" level. In this manner, all the first and second terminals 104 and 108a to 108f output "L"-level signals, i.e., the travel range switching signals.

Thereafter, the second slide brush $66c_2$ is brought into contact with the first contact terminal $\phi_1$ corresponding to the forward drive range "D" adjacent to the neutral range "N" in the forward direction, and the output from the first output terminal 104 goes from "L" level to "H" level. Subsequently, after the lapse of a predetermined delay time, the third slide brush $66c_3$ is brought into contact with the second contact terminal $\phi_{2D}$ corresponding to the forward drive range "D", and the output from the second output terminal 108e goes from "L" level to "H" level. That is, the range setting signals indicating the forward drive range are output.

When the switch main body 66 is pivoted in a reverse direction from a state wherein the forward drive range "D" is presently set, as shown in FIG. 18B, i.e., from a state wherein the "H"-level signals are output from both the first output terminal 104 and the second output terminal 108d, the third slide brush $66c_3$ is disengaged from the second contact terminal $\phi_{2D}$ corresponding to the forward drive range "D", and the output from the second output terminal 108d goes from "H" level to "L" level. Subsequently, the second slide brush $66c_2$ is disengaged from the first contact terminal $\phi_1$ corresponding to the forward drive range "D", and the output from the first output terminal 104 goes from "H" level to "L" level. In this manner, all the first and second terminals 104 and 108a to 108f output "L"-level signals, i.e., the travel range switching signals.

Thereafter, the third slide brush $66c_3$ is brought into contact with the second contact terminal $\phi_{2N}$ corresponding to the neutral range "N" adjacent to the drive range "D" in the reverse direction, and the output from the second output terminal 108c goes from "L" level to "H" level. Subsequently, after the lapse of a predetermined delay time, the second slide brush $66c_2$ is brought into contact with the first contact terminal $\phi_1$ corresponding to the neutral range "N", and the output from the first output terminal 104 goes from "L" level to "H" level. That is, the range setting signals indicating the neutral range are output.

As a result, as will be described in detail later, the control unit 30 monitors the order of rising of output levels of the first and second output terminals 104 and 108a to 108f. When the control unit 30 detects that the output from the first output terminal 104 first goes to "H" level, and then, the output from one of the second output terminals 108a to 108f goes to "H" level, it determines that the operation switch 18 is operated in the forward direction. On the other hand, when the control unit 30 detects that the output from one of the second output terminals 108a to 108f goes to "H" level, and then, the output from the first output terminal 104 goes to "H" level, it determines that the operation switch 18 is operated in the reverse direction. In this manner, upon operation of the operation switch 18, the control unit 30 can recognize at least whether the operation switch is operated in the forward or reverse direction although its destination (i.e., a target stop position) is unknown yet.

In this embodiment, whether the operation switch 18 is operated in the forward or reverse direction is determined on the basis of two "H"-level signals, i.e., the "H"-level output from the first output terminal 104 and the "H"-level output from one of the second output terminals 108a to 108f. As a result, as compared to a case wherein a rotational direction is determined based on a single "H"-level signal, an erroneous operation caused by noise does not easily occur. More specifically, in this embodiment, signals from the signal generation mechanism 100 are constituted by outputs which change based on contact-noncontact operations between contact terminals and the contact rod 66c. When signals are defined based on a change in contact state, noise tends to be generated. When such noise is recognized as an "H"-level signal, if a rotational direction is determined on the basis of a single "H"-level signal, the rotational direction may be erroneously determined based on the noise, and the travel range switching operation may be undesirably started in the automatic transmission mechanism 12 although the operation of the operation switch 18 is not yet determined. However, in this embodiment, as described above, since a rotational direction is recognized based on the two "H"-level signals, a possibility of an erroneous operation caused by noise can be minimized, and the rotational direction can be reliably determined.

Note that symbol a in FIG. 16 denotes a zone of a common extending portion of the first and second contact terminals $\phi_1$ and $\phi_2$ in each travel range, and its length is expressed by $a = \theta_1 - 2 \times \theta_3$. When the contact rod 66c reaches a region represented by the zone a, the travel range setting position is mechanically regulated by the above-mentioned detent mechanism in the operation switch 18, thus stopping the switch 18.

Figure 17C:
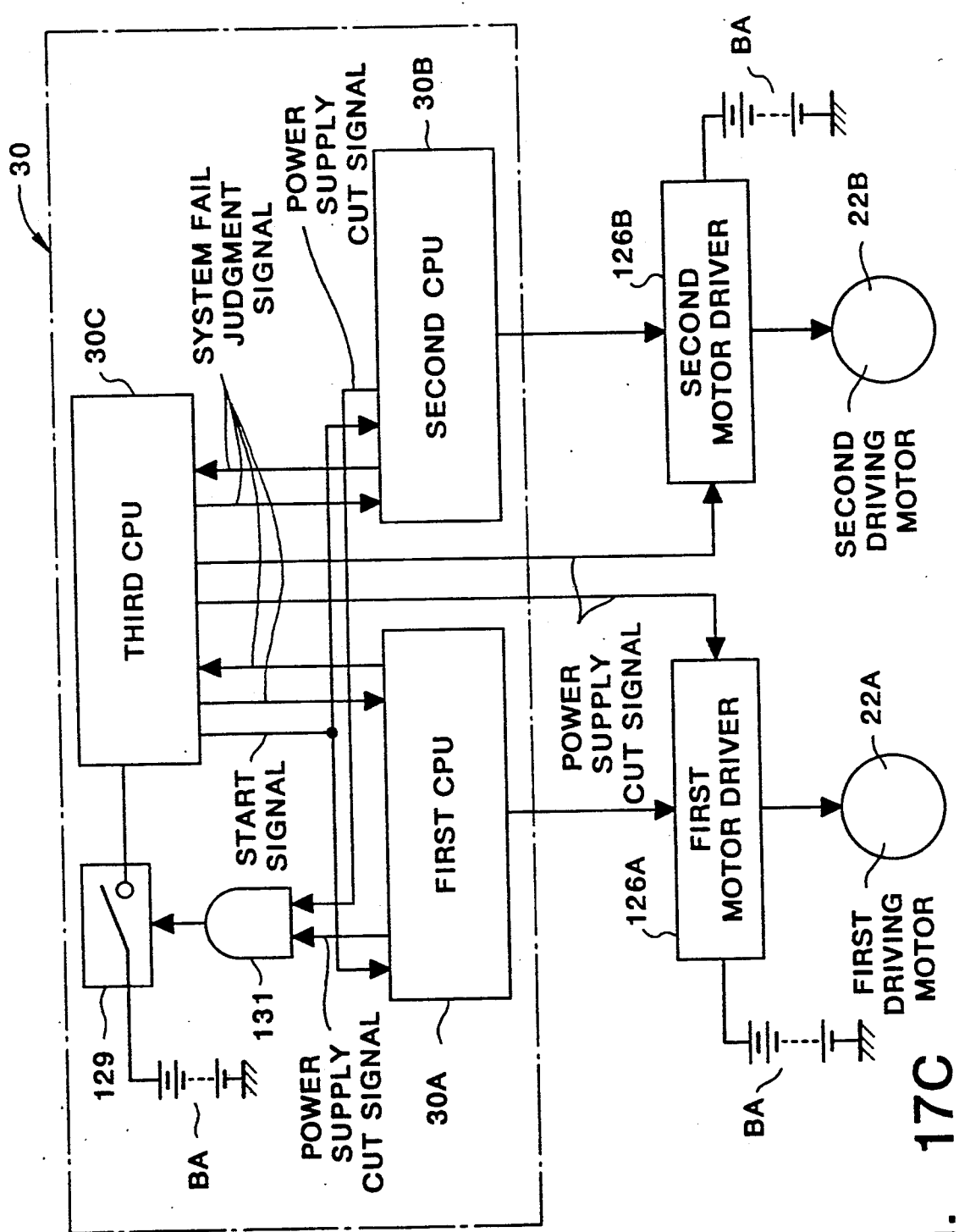
FIG. 17C is a block diagram showing a connection state among first to third CPUs in the control unit.

A connection state among the three CPUs 30A, 30B, and 30C in the control unit 30 will be briefly described below with reference to FIG. 17C.

As described above, in this control unit 30, the first CPU 30A constitutes a first control system for driving the first driving motor 22A, the second CPU 30B constitutes a second control system for driving the second driving motor 22B, and the third CPU 30C constitutes a third control system for detecting the mutual relationship between the first and second CPUs 30A and 30B, and their failed states so as to execute a fail-safe operation. That is, the control unit 30 is constituted by so-called triple control systems.

The first and second CPUs 30A and 30B have the same control sequence although their detailed control sequence will be described in detail later, and always execute the same control operation on the basis of the same input data. The third CPU 30C outputs start signals to the first and second CPUs 30A and 30B when the ignition switch (not shown) is turned on, thus causing them to start their control operations. In addition, in a normal state, in other words, when no system failed state is detected in the first CPU 30A as the main CPU, the third CPU 30C inhibits driving control of the second driving motor 22B on the basis of a control operation of the second CPU 30B, and drives the first driving motor 22A on the basis of a control operation of only the first CPU 30A, thus switching a travel range in the automatic transmission mechanism 12, except for the following exceptional state.

In the exceptional state, it is determined based on the control inhibitor signal input from the control inhibitor switch 32b of the select switch 32 that the parking range "P" is set by the select switch 32 when no system failed state occurs in the first and second CPUs 30A and 30B. In the exceptional state, the third CPU 30C also allows execution of the driving control of the second driving motor 22B based on the control operation of the second CPU 30B. In this manner, the first and second driving motors 22A and 22B are simultaneously driven to execute a switching operation from the parking range "P" to the adjacent reverse range "R".

The connection state between the operation switch 18 and the control unit 30 will be described in detail below with reference to FIG. 17A.

More specifically, the output terminal 104 for the first contact terminals $\phi_1$ is connected to one input terminal of a first OR gate 112 through a first pulse generator 110. The output terminals 108a to 108f for the second contact terminals $\phi_{2P}$ to $\phi_{2l}$ are connected to input terminals of a second OR gate 114. The output terminal of the second OR gate 114 is connected to the other input terminal of the first OR gate 112 via a second pulse generator 116. The first and second pulse generators 110 and 116 output one-shot pulses in response to the trailing edges of input signals. The output terminal of the first OR gate 112 is connected to first interrupt terminals $INT_1$ of the first and second CPUs 30A and 30B of the control unit 30.

The output terminal 104 for the first contact terminals $\phi_1$ is connected to one input terminal of a third OR gate 120 via a third pulse generator 118. The output terminal of the second OR gate 114 is connected to the other input terminal of the third OR gate 120 via a fourth pulse generator 122. The third and fourth pulse generators 118 and 122 output one-shot pulses in response to the trailing edges of input signals. The output terminal of the third OR gate 120 is connected to second interrupt terminals $INT_2$ of the first and second CPUs 30A and 30B of the control unit 30.

The second output terminals 108a to 108f are connected to one input terminal group of an 8×2 multiplexer 124, and the first output terminal 104 and the output terminal of the second OR gate 114 are connected to the other input terminal group of this multiplexer 124. When an "L"-level signal is input to a control terminal of the multiplexer 124, the multiplexer 124 outputs the signals input to one input terminal group to input ports of the first and second CPUs 30A and 30B; when an "H"-level signal is input to the control terminal, it outputs signals input to the other input terminal group to the input ports of the first and second CPUs 30A and 30B.

The first and second CPUs 30A and 30B are respectively connected to real-time counters RTC. Each real-time counter RTC has four channels. In each of the first to fourth channels, when a corresponding timer is started, and a preset time elapses, a time-up signal is output to the corresponding CPU. When each of the first and second CPUs 30A and 30B receives the time-up signal from any of the timers in the first to fourth channels, it determines a failed state, and executes a predetermined fail-safe operation. The timer in each of the second to fifth channels stops a count-up operation in response to an input timer reset signal, and is reset to an initial state to wait for the next signal.

The first CPU 30A is connected to the first driving motor 22A via a first motor driver 126A, and the second CPU 30B is connected to the second driving motor 22B via a second motor driver 126B. The two motor drivers 126A and 126B have the same arrangement, i.e., comprise direction latch circuits DIR for regulating rotational directions of the corresponding driving motors 22A and 22B, and enable latch circuits ENA for regulating driving forces of the corresponding driving motors 22A and 22B, as will be described in detail later. Upon reception of a "0" signal, each direction latch circuit DIR outputs a forward rotation signal for rotating the output shaft 24 in a forward direction; upon reception of a "1" signal, it outputs a reverse rotation signal for driving the output shaft 24 in a reverse direction.

As described above, the rotational driving direction of the first driving motor 22A coincides with the rotational direction of the output shaft 24, while the rotational driving direction of the second driving motor 22B is opposite to the rotational direction of the output shaft 24. For this reason, when the forward rotation signal for driving the output shaft 24 in a forward direction is input, the first driving motor 22A rotates its own driving shaft in the forward rotational direction. However, the second driving motor 22B rotates its own driving shaft in the reverse rotational direction.

Upon reception of a "1" signal, each enable latch circuit ENA turns on a DC/DC converter 128 (to be described later) to output a driving signal for driving the corresponding driving motor 22 at a predetermined voltage; upon reception of a "0" signal, it turns off the DC/DC converter 128 not to apply a voltage to the corresponding driving motor 22.

Note that each of the first and second CPUs 30A and 30B has, as a main routine, a routine for controlling to stop rotation of the driving motors 22A and 22B when a travel range newly set by the operation switch 18 coincides with an inhibitor signal from the select switch 32 of the automatic transmission mechanism 12 after the rotational direction of the operation switch 18 is determined in a rotational direction judgment routine (to be described in detail later) and the driving motors 22A and 22B are rotated based on the determined rotational direction. Meanwhile, when a pulse signal is input to the first or second interrupt terminal INT$_1$ or INT$_2$, the main routine is interrupted, and each CPU executes the first or second interrupt routine.

Each of the first and second CPUs 30A and 30B comprises a fail judgment signal generation routine in each control sequence, which signal is used for system fail judgment by the third CPU 30C. Each of the first and second CPUs 30A and 30B outputs system fail judgment signals having a predetermined pulse width to the third CPU 30C at predetermined intervals. On the other hand, the third CPU 30C always monitors the fail judgment signals output from the first and second CPUs 30A and 30B. When the system fail judgment signals are not output at the predetermined intervals, or when they are kept output, the third CPU 30C determines that a control operation of the corresponding CPU runs away, and a system failed state occurs, and executes a system fail-safe operation.

The third CPU 30C also comprises a fail judgment signal generation routine in its own control sequence, which is used in system fail judgment by the first and second CPUs 30A and 30B, and outputs system fail judgment signals having a predetermined pulse width to the first and second CPUs 30A and 30B at predetermined intervals. On the other hand, each of the first and second CPUs 30A and 30B always monitors the fail judgment signals output from the third CPU 30C. When the system fail judgment signals are not output at the predetermined intervals, or when they are kept output, the first or second CPU determines that a control operation of the third CPU 30C runs away, and a system failed state occurs, and outputs a power supply cut signal to a control switch 129 interposed between the third CPU 30C and a battery BA.

More specifically, the first and second CPUs 30A and 30B are connected to a control terminal of the control switch 129 via an AND gate 131. When the power supply cut signal is output from at least one of the CPUs 30A and 30B, the control switch 129 is set in a power supply cut state, as will be described later.

The control switch 129 comprises a release switch, and is normally biased in a closed state. In this closed state, the battery BA is directly connected to the third CPU 30C, thus allowing an operation of the third CPU 30C. Upon reception of the power supply cut signal, the control switch 129 is opened, and the battery BA is disconnected from the third CPU 30C. Thus, no current can be supplied to the third CPU 30C, i.e., the operation of the third CPU 30C is stopped.

More specifically, with this AND gate 131, even if one of the first and second CPUs 30A and 30B system-fails, and outputs the power supply cut signal before the third CPU 30C cuts off the power supply of the system-failed CPU, as will be described later, the control switch 129 cannot be opened by only one power supply cut signal, and the third CPU 30C can be continuously supplied with a power supply voltage. Therefore, the third CPU 30C can normally execute a control operation. As a result, the power supply cut signal is input to the control terminal of the control switch 129 only when both the first and second CPUs 30A and 30B determine that the third CPU 30C system-fails. In this manner, a control operation of the third CPU 30C can be reliably prevented from being erroneously stopped when one of the first and second CPUs 30A and 30B system-fails, thus assuring safety travel.

The arrangements of the first and second motor drivers 126A and 126B described above will be described in detail below with reference to FIG. 17D. Since the two motor drivers 126A and 126B have the same arrangement, and are connected to the corresponding CPUs 30A and 30B in quite the same connection state, the first motor driver 126A will be exemplified below, and a description of the second motor driver 126B will be omitted. In connection states of the two motor drivers 126A and 126B to the corresponding driving motors 22A and 22B, since the rotational directions of the two driving motors 22A and 22B must be opposite to each other, as described above, mounting positions of two terminals 22a and 22b of the second driving motor 22B must be reversed to those of the first driving motor 22A.

The motor driver 126A comprises the enable latch circuit ENA, the direction latch circuit DIR, the DC/DC converter 128 serving as a voltage regulator, first and second p-type FETs 130 and 132, first and second n-type FETs 134 and 136, and a pair of converters 138 and 140. The drain of the first p-type FET 130 is connected to the source of the first N-type FET, and these terminals are connected to one input terminal 22a of the first driving motor 22A. The drain of the second p-type FET 132 is connected to the source of the second n-type FET 136, and these terminals are connected to the other input terminal 22b of the first driving motor 22A.

The input terminal of the DC/DC converter 128 is connected to the positive terminal of the battery. The output terminal of the DC/DC converter 128 is connected to the sources of the first and second p-type FETs 130 and 132. The drains of the first and second n-type FETs 134 and 136 are connected to a ground terminal. The direction latch circuit DIR has two output terminals. One output terminal of the circuit DIR is directly connected to the gate of the first p-type FET 130, and is also connected to the gate of the second n-type FET 136 via the converter 138 described above. The other output terminal of the direction latch circuit DIR is directly connected to the gate of the first n-type FET 134, and is connected to the gate of the second p-type FET 132 via the converter 140 described above.

When a "0" signal is input from the corresponding first CPU 30A to the direction latch circuit DIR, the circuit DIR outputs "L"-level signals from the two output terminals; when a "1" signal is input, it outputs "H"-level signals from the two output terminals. The p-type FETs 130 and 132 are enabled upon reception of "L"-level signals at their gates, and are disabled upon reception of "H"-level signals. On the other hand, the n-type FETs 134 and 136 are disabled upon reception of "L"-level signals at their gates, and are enabled upon reception of "H"-level signals.

When a current flows from one terminal 22a to the other terminal 22b, the corresponding first driving motor 22A is rotated in a forward direction. When a current flows from the other terminal 22b to one terminal 22a, the motor 22A is rotated in the reverse direction.

In this embodiment, when a "0" signal is output from the corresponding first CPU 30A to the direction latch circuit DIR, "L"-level signals are output from the two output terminals of the circuit DIR, and as a result, the first p-type FET 130 and the second n-type FET 136 are simultaneously enabled, and the second p-type FET 132 and the first n-type FET 134 are simultaneously disabled. Therefore, in this ON/OFF state, a current output from the DC/DC converter 128 flows from one terminal 22a to the other terminal 22b in the corresponding first driving motor 22A, and as a result, the first driving motor 22A is rotated in the forward direction.

When a "1" signal is output from the corresponding first CPU 30A to the direction latch circuit DIR, "H"-level signals are output from the two output terminals of the circuit DIR. As a result, the first p-type FET 130 and the second n-type FET 136 are simultaneously disabled, and the second p-type FET 132 and the first n-type FET 134 are simultaneously enabled. In this ON/OFF state, a current output from the DC/DC converter 128 flows from the other terminal 22b to one terminal 22a in the corresponding first driving motor 22A. In this manner, the first driving motor 22A is rotated in the reverse direction.

A voltage variation detection circuit 142 for detecting a variation in voltage output from the battery BA and maintaining a predetermined voltage in the DC/DC converter 128 is connected to the DC/DC converter 128. In addition, a temperature variation detection circuit 144 for maintaining the predetermined voltage regardless of a change in temperature is connected to the DC/DC converter 128. In this embodiment, since the DC/DC converter 128 serving as the voltage regulator is connected to the voltage variation detection circuit 142 and the temperature variation detection circuit 144, it can maintain a predetermined voltage without changing its output voltage against a variation in voltage from the battery BA and a variation in temperature.

Furthermore, in this embodiment, a control switch 146 for enabling/disabling power supply to the first driving motor 22A and the first CPU 30A via the first motor driver 126A is interposed between the battery BA and the DC/DC converter 128. The third CPU 30C is connected to the control terminal of the control switch 146, and the third CPU 30C outputs the power supply cut signal to the control switch 146.

The control switch 146 comprises a release switch, and is normally biased in a closed state. In this closed state, the battery BA is directly connected to the DC/DC converter 128 to allow a driving operation of the first driving motor 22A. The control switch 146 is opened in response to the power supply cut signal output from the third CPU 30C, and the battery BA is disconnected from the DC/DC converter 128, so that no current can be supplied to the first CPU 30A and the first driving motor 22A. More specifically, the driving operation of the first driving motor 22A is inhibited.

A control sequence in the control unit 30 will be described below with reference to FIGS. 19A to 27.

Figure 19A:
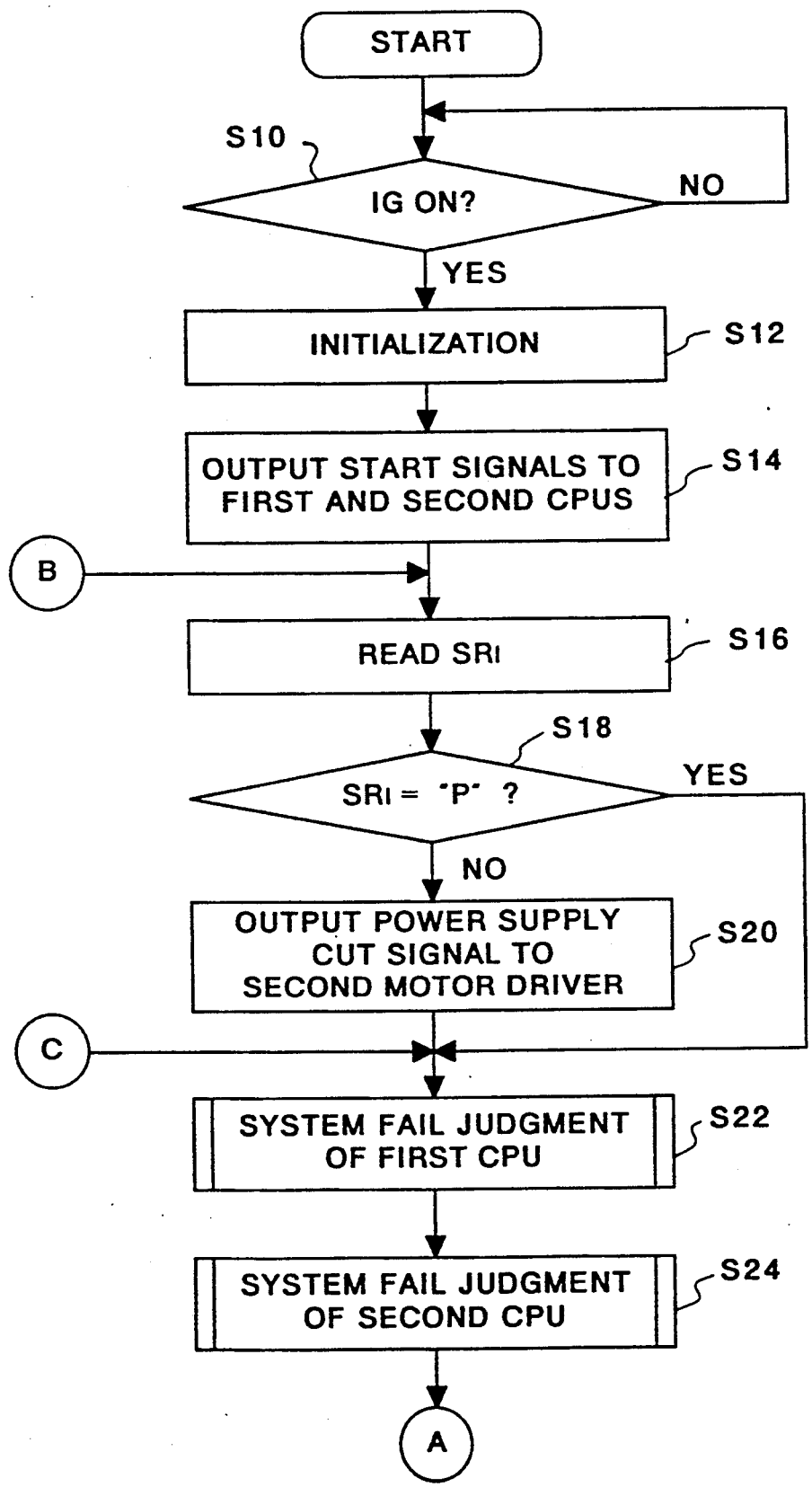
FIGS. 19A and 19B are flow charts showing a control sequence of a main routine in the third CPU.
Figure 19B:
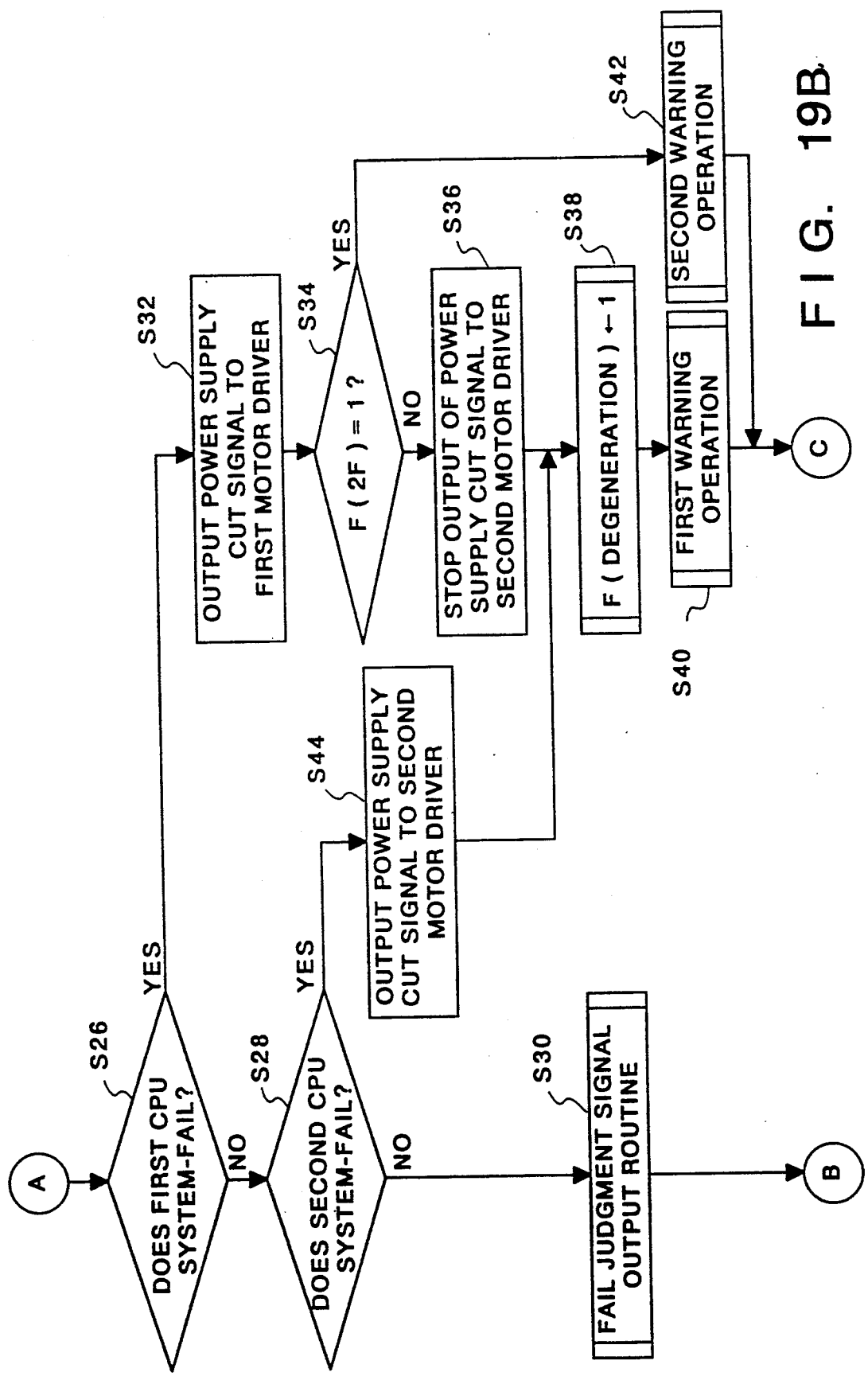

The main routine in the third CPU 30C for controlling the entire apparatus will be described below with reference to FIGS. 19A and 19B.

In step S10, the control waits for an ON operation of the ignition switch (not shownb). When the ignition switch is turned on, a detailed control operation is started as follows. More specifically, in step S12, all the variables are initialized. In this initialization, "1" is set in a flag F (F) (to be described later), and a system fail judgment timer and a fail judgment signal output timer are reset. In step S14, start signals are output to the first and second CPUs 30A and 30B, so that the two CPUs 30A and 30B are started at substantially the same timings. As will be described in detail later, the two CPUs 30A and 30B start their control sequences upon reception of these start signals. Note that once the start signal is output, it is kept latched in a destination unless the ignition switch is turned off.

Thereafter, the flow advances to step S16, and a control inhibitor signal output from the control inhibitor switch 32b of the select switch 32, i.e., a travel range signal SR_I indicating a travel range presently set in the automatic transmission mechanism 12 is read.

In step S18, it is checked if the read travel range signal SR_I indicates the parking range "P". If NO in step S18, i.e., if it is determined that a travel range other than the parking range "P" is set in the automatic transmission mechanism 12, the follow advances to step S20 to execute normal control, and a power supply cut signal is output to the control switch 146 in the second motor driver 126B constituting the second control system, thus inhibiting the driving operation of the second driving motor 22B. Subsequently, step S22 is executed.

More specifically, when a travel range other than the parking range "P" is set in the automatic transmission mechanism 12, the driving operation of the second driving motor 22B is inhibited, and only the first driving motor 22A is driven although the first CPU 30A and the second control system similarly execute the control operations.

If YES in step S18, i.e., if it is determined that the parking range "P" is set in the automatic transmission mechanism 12, the flow skips step S20 to execute exceptional control, and step S22 is executed.

More specifically, when the parking range "P" is set in the automatic transmission mechanism 12, the first CPU 30A and the second control system similarly execute the control operations, and both the first and second driving motors 22A and 22B are driven without inhibiting the driving operation of the second driving motor 22B.

The exceptional control which skips step S20 is ended when NO is determined in step S18, i.e., when the control inhibitor signal indicating the parking range "P" output from a contact corresponding to the parking range "P" of the control inhibitor switch 32b of the select switch 32 is stopped, and the control mode is then switched to normal control for executing step S22 via step S20.

In this manner, in this embodiment, only when the parking range "P" is set in the automatic transmission mechanism 12, the two driving motors 22A and 22B are driven, and execute an operation for disengaging a travel range from the parking range "P" in cooperation with each other. As a result, in a switching operation from the parking range "P" to another travel range, which operation requires a larger switching driving torque than that in a case wherein a travel range other than the parking range "P" is switched to another travel range, the driving torques of the first and second driving motors 22A and 22B are combined, and are output from the output shaft 24. Thus, in the automatic transmission mechanism 12, a travel range can be reliably switched from the parking range "P" to another travel range.

When a travel range is switched from a travel range other than the parking range "P" to another travel range, one driving motor 22A or 22B need only be driven, and as a result, a maximum driving torque of the driving motor 22A or 22B can be smaller than that in a case wherein a switching operation from the parking range "P" to another travel range is performed by a single driving motor. In addition, power consumption required when a travel range is switched from a travel range other than the parking range "P" to another travel range can be decreased, and a load on the battery BA can be reduced.

In particular, in this embodiment, when the first CPU 30A as the main CPU system-fails, the second CPU 30B as the sub CPU controls the driving control system instead to switch the travel range of the automatic transmission mechanism 12. Since the second driving motor 22B arranged for a fail-safe operation is driven at least when a travel range is switched from the parking range "P" to another travel range, the driving system of the second driving motor 22B can be reliably prevented from, e.g., being rusted and locked. In addition, since the switching operation from the parking range "P" to another travel range can be reliably executed, it can be confirmed that the second driving motor 22B is satisfactorily driven, thus guaranteeing reliable execution of a system fail-safe operation even if the first CPU 30A system-fails.

In step S22 described above, it is checked if a system failed state occurs in the first CPU 30A. In step S24, it is checked if a system failed state occurs in the second CPU 30B. The system fail judgment operations have substantially the same sequence, and an operation for determining a system failed state in the first CPU 30A will be described below as a subroutine with reference to FIG. 23. In this case, a description of an operation for determining a system failed state in the second CPU 30B will be omitted. If it is determined that the first CPU 30A system-fails, "1" is set in a flag F(1F) indicating that the first CPU 30A system-fails. If it is determined that the second CPU 30B system-fails, "1" is set in a flag F (2F) indicating that the second CPU 30B system-fails.

After the system fail judgment routine for the second CPU 30B is executed in step S24, it is checked in step S26 if the first CPU 30A system-fails. In step S26, it is checked based on whether or not "1" is set in the flag F (1F) if the first CPU 30A system-fails. If NO in step S26, i.e., if it is determined that "0" is set in the flag F (1F), and no system failed state occurs in the first CPU 30A, it is checked in step S28 if the second CPU 30B system-fails.

It is checked in step S28 based on whether or not "1" is set in the flag F (2F) if the second CPU 30B system-fails. If NO in step S28, i.e., if it is determined that "0" is set in the flag F (2F), and no system failed state occurs in the second CPU 30B, since it can be determined that a system failed state occurs in neither the first CPU 30A nor the second CPU 30B, the third CPU 30C executes a fail judgment signal output operation for outputting a system fail judgment signal indicating its own system failed state, e.g., a runaway state. Thereafter, the flow returns to step S16, and a control sequence from step S16 and subsequent steps is repetitively executed.

The system fail judgment signal is output to the first and second CPUs 30A and 30B, and the first and second CPUs 30A and 30B always monitor the system failed state of the third CPU 30C. The fail judgment signal output operation is step S30 will be described in detail later with reference to FIGS. 22A and 22B as a subroutine.

If YES in step S26, i.e., if it is determined that "1" is set in the flag F (1F), and a system failed state occurs in the first CPU 30A, a first system fail-safe operation is executed as follows. In the first fail-safe operation, in step S32, the power supply cut signal is output to the control switch 146 of the first motor driver 126A so as to stop the driving operation of the first motor driver 126A controlled by the system-failed first CPU 30A. In this manner, the first driving motor 22A is set in a state wherein its driving operation is inhibited even when an erroneous control signal is output from the system-failed first CPU 30A, thus preventing danger caused by the system-failed first CPU 30A.

Thereafter, in step S34, it is checked if "1" is set in the flag F (2F) indicating that a system failed state occurs in the second CPU 30B. If NO in step S34, i.e., if it is determined that no system failed state occurs in the second CPU 30B, since the travel range switching operation of the automatic transmission mechanism 12 can be executed by the second driving motor 22B under the control of the second CPU 30B, and output of the power supply cut signal to the control switch 146 of the second motor driver 126B is stopped.

In this manner, when the first CPU 30A as the main CPU system-fails, the second driving motor 22B is controlled by the second CPU 30B as the sub CPU to execute the switching driving operation, and the travel range of athe automatic transmission mechanism 12 is switched by the second driving motor 22B.

In this embodiment, since a safety driving state is guaranteed under a condition that the triple control systems are completely operated, when the first CPU 30A. system-fails in this manner, it is determined that a safety state is already impaired although the second CPU 30B perfectly functions and can execute a normal travel state. Thus, in order to cause the second CPU 30B to limit a travel range switching zone and to forcibly execute degeneration control which is set to guarantee a more safety travel state, "1" is set in a flag F (degeneration) to execute degeneration control in step S38.

Thereafter, in step S40, a first warning operation is executed to inform to a driver that one of the first and second CPUs 30A and 30B system-fails, and the control unit 30 starts a degeneration operation. Note that the first warning operation includes a content for urging a driver to go to a nearby service station to repair the control unit 30 since a safety travel state is not guaranteed although there is no inconvenience in a normal travel state at present.

In this manner, after the first warning operation is executed in step S40, the flow returns to step S26, and a control sequence from step S26 and subsequent steps, i.e., the first system fail-safe operation is repetitively executed. In other words, once a system failed state of the first CPU 30A is determined, the first system fail-safe operation is kept executed regardless of the travel range position set in the automatic transmission mechanism 12.

On the other hand, if YES in step S34, i.e., if it is determined that the secnd CPU 30B has already been system-failed, this means that the driving operations of the first and second motor drivers 126A and 126B are stopped upon execution of step S32 described above, and that a travel range switching operation by the operation switch 18 is disabled. For this reason, in step S42, a second warning operation is executed. The second warning operation informs to a driver that both the first and second CPUs 30A and 30B cause system failure the travel range switching operation be the operation switch 18 is disabled, and a presently set travel range is fixed. The second warning operation also includes a content indicating that a travel range can be manually switched via the manual driving mechanism 38, if necessary.

Note that the travel range switching disabled state of the operation switch 18 is canceled by entirely resetting the control unit 30 in such a manner that a vehicle is temporarily stopped, and the ignition switch is turned off and is then turned on again.

When the reset operation is executed, a temporary system failed state can be canceled, and a normal travel state can be resumed. However, when a system failed state occurs due to system down, the system failed state occurs again.

In this manner, after the second warning operation is executed in step S42, the flow returns to step S26, and a control sequence from step S26 and subsequent steps is repetitively executed. More specifically, a state wherein the travel range switching operation by the operation switch 18 is inhibited is maintained unless the above-mentioned reset operation is not executed.

If YES is determined in step S28 described above, i.e., if it is determined that the first CPU 30A is normal but the second CPU 30B system-fails, a second system fail-safe operation is executed as follows. More specifically, in the second system fail-safe operation, the power supply cut signal is output to the control switch 146 of the second motor drive 126B so as to stop the driving operation of the second motor driver 126B controlled by the system-failed second CPU 30B in step S44. In this manner, the second driving motor 22B is set in a state wherein its driving operation is inhibited even when an erroneous control signal is output from the system-failed second CPU 30B, thus preventing danger caused by the system-failed second CPU 30B.

In this manner, even when the second CPU 30B as the sub CPU system-fails, the first driving motor 22A is kept controlled by the first CPU 30A as the main CPU, and the travel range of the automatic transmission mechanism 12 can be switched by the first driving motor 12A as usual. However, as described above, since safety travel is guaranteed under a condition that the triple control systems are completely operated, the flow jumps to step S38, and "1" is set in the flag F (degeneration) to force the first CPU 30A to execute a degeneration control operation. In step S40, the first warning operation is executed, and thereafter, the second system-fail safe operation is repetitively executed.

The main routine in the first CPU 30A will be described below with reference to FIGS. 20A and 20B. Note that the main routine in the second CPU 30B is the same as that in the first CPU 30A, and its description will be omitted.

In this main routine, in step S48, the control waits for the start signal input from the third CPU 30C. If it is detected that the start signal is input, all the variables are initialized in step S50. In this initialization, all the flags F are set to be "0", and a timer in a channel for detecting a system failed state and a timer for outputting a fail judgment signal are reset.

Thereafter, in step S52, a travel range ($SR_I$) presently, set in the automatic transmission mechanism 12 is read on the basis of an inhibitor signal (INH) from the select switch 32. In step S54, an "L"-level signal is output to the control terminal of the multiplexer MUX, so that signals connected to one input terminal group of the multiplexer, i.e., signals output from the second output terminals 108a to 108f are input to the input terminals of the CPU. Thereafter, in step S56, a travel range ($SR_S$) presently set at the operation switch 18 is read on the basis of the signal from the second output terminals 108a to 108b.

In step S58, it is checked if "1" is set in the flag F (degeneration) for forcibly executing the degeneration control. If NO in step S58, i.e., if it is determined that "0" is set in the flag F (degeneration), and no degeneration control is forced, step S60 is executed.

It is checked in step S60 if the travel range ($SR_I$) set in the automatic transmission mechanism 12 read in step S52 coincides with the travel range ($SR_S$) set at the operation switch 18 read in step S56. If YES in step S60, i.e., if it is determined that the travel range ($SR_I$) set in the automatic transmission mechanism 12 coincides with the travel range ($SR_S$) set at the operation switch 18, since there is no need to drive the first driving motor 22A to switch the travel range of the automatic transmission mechanism 12, stop control is executed in step S62. The stop control in step S62 will be described in detail later with reference to FIGS. 24A and 24B as a subroutine.

Thereafter, learning control is executed in step S64, as will be described in detail later with reference to FIGS. 25A and 25B. Subsequently, the first fail judgment operation is executed in step S66. The first fail judgment operation step S66 will be described in detail later with reference to FIG. 26 as a subroutine. In step S68, a system fail judgment signal output from the third CPU 30C is monitored to determine whether or not a system failed state occurs in the third CPU 30C.

Figure 23:
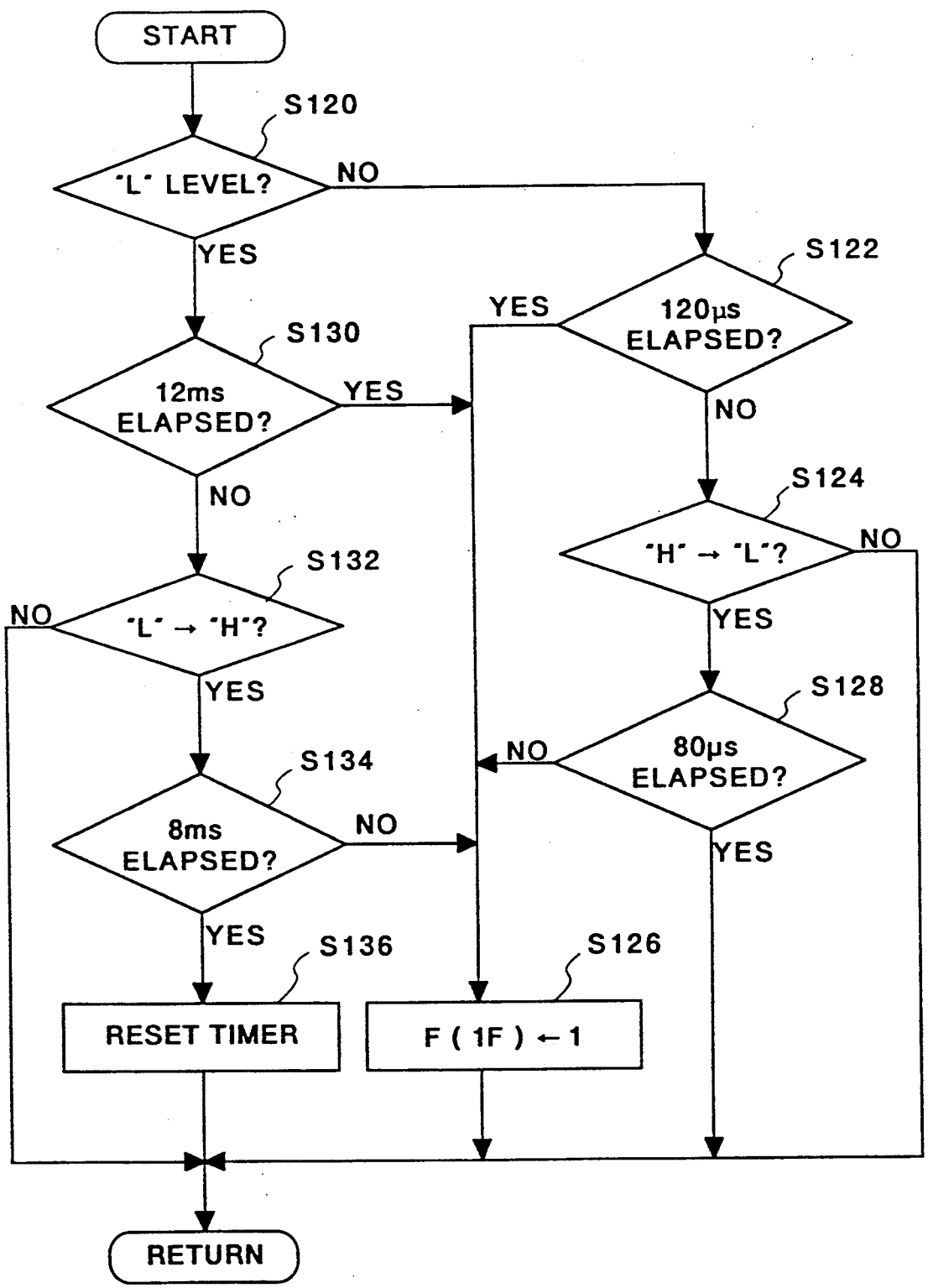
FIG. 23 is a flow chart showing a control sequence of a system fail judgment operation subroutine.

Since the system fail judgment operation in step S68 is the same as that for the first CPU 30A, an operation for determining whether or not a system failed state occurs in the first CPU 30A will be described later with reference to FIG. 23 as a subroutine, and a description of a judgment operation of a system failed state of the third CPU 30C will be omitted. If it is determined that the third CPU 30C system-fails, "1" is set in a flag F (3F) indicating that the third CPU 30C system-fails.

Thereafter, in step S70, it is checked if the third CPU 30C system-fails. In step S70, whether or not "1" is set in the flag F (3F) is checked to determine if the third CPU 30C system-fails. If NO in step S70, i.e., if it is determined that "0" is set in the flag F (3F) and no system failed state occurs in the third CPU 30C, the flow advances to step S72.

In step S72, a fail judgment signal output operation for outputting a system fail judgment signal indicating that a system failed state, e.g., a runaway state of itself, i.e., the first CPU 30A is executed. Thereafter, the flow returns to step S52, and a sequence from step S52 and subsequent steps is executed. The fail judgment signal output operation in step S72 is the same as that in step S30 for the third CPU 30C described above, and a description thereof will be omitted (see FIGS. 22A and 22B).

On the other hand, if YES in step S70, i.e., if it is determined that "1" is set in the flag F (3F), and a system failed state occurs in the third CPU 30C, a third system fail-safe operation is executed as follows. More specifically, in the third system fail-safe operation, as described above, since safety travel is guaranteed in this control unit 30 under a condition that all the three control systems are normally operated, safety travel cannot be guaranteed when it is determined that the third CPU 30C system-fails in this manner. Thus, in step S74, "1" is set in the flag F (degeneration) to force the first and second CPUs 30A and 30B to execute degeneration control.

In step S76, the power supply cut signal is output to the control switch 129 for supplying a power supply voltage to the third CPU 30C so as to stop driving operation of the system-failed third CPU 30C. In this manner, the driving operation of the third CPU 30C is stopped, and the power supply cut signal can no longer be output from the third CPU 30C to the motor drivers 126A and 126B. However, as described above, since the control switches 146 of the first and second motor drivers 126A and 126B are kept in the closed state unless the power supply cut signal is input thereto, the first driving motor 22A is driven under the control of the first CPU 30A.

After step S76 is executed, the first warning operation is executed in step S78. The first warning operation is the same as that in step S40 described above, and a detailed description thereof will be omitted. After step S78 is executed, the flow advances to step S72 described above. More specifically, the third system fail-safe operation is constituted by steps S74, S76, and S78 described above.

On the other hand, NO may be in step S60, i.e., it may be determined that the travel range ($SR_I$) set in the automatic transmission mechanism 12 does not coincide with the travel range ($SR_S$) set at the operation switch 18 in the following state.

More specifically, when a driver operates the operation switch 18 to switch a travel range, and the next travel range adjacent to the old range in the forward or reverse direction is newly set, the new travel range is determined when the output from the first output terminal 104 and the output from a corresponding one of the second output terminals 108a to 108f go to "H" level. In addition, as will be described in detail later, since the start timing of the driving motor 22 is defined by the rising timings of these outputs, the ranges $SR_I$ and $SR_S$ do not coincide with each other.

For this reason, after a noncoincidence state is detected, when the two ranges are separated by only one range (i.e., when the operation switch 18 is operated to the neighboring travel range), the driving motor 22 is driven to cause the two ranges to coincide with each other. When the two ranges are separated by two or more ranges (i.e., when the operation switch 18 is operated to a farther range beyond the neighboring range), the driving motor 22 is controlled so that the travel range of the automatic transmission mechanism 12 is set to coincide with the immediately preceding travel range set by the operation switch 18.

More specifically, if NO in step S60, it is checked in step S80 if a flag F (monitor) for defining a monitor range is "1". Note that the monitor range is defined between the first falling timing to the last rising timing of adjacent travel ranges, as shown in FIGS. 18A and 18B. When the operation switch 18 is stopped at the adjacent travel range position, since a noncoincidence between $SR_I$ and $SR_S$ has already been detected in step S60, NO is always determined in step S80. However, when the operation switch 18 is further operated beyond the adjacent travel range, since it enters the next monitor range, YES is inevitably determined in step S80.

If NO in step S80, the forward or reverse direction operation of the operation switch 18 is determined in step S82. The forward/reverse judgment of the operation switch 18 is performed on the basis of a judgment result in an operation direction judgment routine of the operation switch 18, which is executed at a timing when both the outputs from the first output terminal 104 and a corresponding one of the second output terminals 108a to 108f go to "H" level in the second interrupt routine (to be described later).

If the forward direction is determined in step S82, i.e., if it is determined that the flag F (forward) is set, a "1" signal is output to the enable latch circuit ENA of the first motor driver 126A, and a "0" signal is output to the direction latch circuit DIR in step S84. As a result, the first driving motor 22A is driven in the forward direction, and the switching operation from the presently set travel range to the adjacent travel range in the forward direction is executed in the automatic transmission mechanism 12.

If the reverse direction is determined in step S82, i.e., if it is determined that the flag F (reverse) is set, "1" signals are output to both the enable latch circuit ENA and the direction latch circuit DIR of the first motor driver 126A in step S86. As a result, the first driving motor 22A is driven in the reverse direction, and a switching operation from the presently set travel range to the adjacent travel range in the reverse direction is executed in the automatic transmission mechanism 12.

When step S84 or S86 is executed, a second fail judgment operation is executed in step S88, and the flow jumps to step S68 described above to repeat the sequence from step S68 and subsequent steps. Thereafter, the flow returns to step S52 to execute the sequence from step S52 and subsequent steps. Note that the second fail judgment operation in step S88 will be described later with reference to FIG. 27 as a subroutine.

In a process of repeating the sequence from step S52 and thereafter, when the travel range set in the automatic transmission mechanism 12 based on a driving operation of the first driving motor 22A is close to the next adjacent travel range but the travel range ($SR_S$) set by the operation switch 18 does not coincide with the travel range ($SR_I$) based on the select switch 32 yet, NO is determined in step S60, and steps S80, S82, and S84 (or S86) are successively executed to keep driving the first driving motor 22A.

When the travel range set in the automatic transmission mechanism 12 is set to be the next adjacent travel range, the travel range ($SR_S$) by the operation switch 18 coincides with the travel range ($SR_I$) based on the select switch 32. As a result, YES is determined in step S60. Therefore, the sequence from step S62 is executed, and the first driving motor 22A is stopped upon execution of step S62.

If YES in step S80, i.e., if it is determined that the operation switch 18 enters the next monitor range beyond the adjacent travel range, the travel range ($SR_I$) presently set in the automatic transmission mechanism 12 is read based on the inhibitor signal (INH) from the select switch 32 in step S90.

In step S92, the immediately preceding travel range ($SR_{S-1}$) set by the operation switch 18 is read. More specifically, the travel range ($SR_{S-1}$) is defined by the travel range located immediately behind the monitor range in the operation direction where the operation switch 18 enters. Whether or not this travel range ($SR_{S-1}$) is adjacent to the travel range ($SR_1$) presently set in the automatic transmission mechanism 12 is not concerned, and when the operation switch 18 is immediately operated, the operation of the automatic transmission mechanism 12 is relatively delayed, and the above ranges may be separated by two or more travel ranges.

In step S94, it is checked if the travel range ($SR_I$) read in step S80 and presently set in the automatic transmission mechanism 12 coincides with the immediately preceding travel range ($SR_{S-1}$) read in step S82 and set by the operation switch 18. If NO in step S94, the flow jumps to step S82, and the first driving motor 22A is kept driven; otherwise, i.e., if it is determined that the travel range ($SR_I$) presently set in the automatic transmission mechanism 12 coincides with the immediately preceding travel range ($SR_{S-1}$) set by the operation switch 18, the flow jumps to step S62 to execute stop control, thereby stopping the driving operation of the first driving motor 22A.

In this manner, as long as the operation switch 18 is located within the monitor range, the travel range in the automatic transmission mechanism 12 is stopped at an immediately preceding travel range ($SR_{S-1}$) set by the operation switch 18, and a travel range can be reliably prevented from overshooting that to be set by the operation switch 18.

More specifically, according to this embodiment, as will be described later, only the operation direction of the operation switch 18 is read before a target stop position of the operation switch 18 is determined, and the first driving motor 22A is started according to the read operation direction to execute the switching operation in the automatic transmission mechanism 12 so that the travel range switching operation is executed in quick response to the operation of the operation switch 18.

As a result, since no stop signal of the first driving motor 22A is output in the above-mentioned monitor range, if the operation switch 18 is operated very slowly in this monitor range, the travel range switching speed by the first driving motor 22A exceeds the operation speed of the switch 18, and the travel range set in the automatic transmission mechanism 12 overtakes that set by the operation switch. Thus, an uncontrollable state may occur.

More specifically, assume that the operation switch 18 is quickly operated from the neutral range position "N" to a monitor range located between the forward drive range "D" and the forward 2nd-speed range "2" beyond the forward drive range "D", and is then operated very slowly in this monitor range. In this case, when the operation switch 18 passes the forward drive range "D", the first CPU 30A outputs a driving signal to rotate the first driving motor 22A in the forward direction. If no proper measure is adopted at all in this state, since no stop condition is established as long as the operation switch 18 stays in the monitor range between the forward drive range "D" and the forward 2nd-speed range "2", the first driving motor 22A is kept driven while the switch 18 is located in this monitor range, and the travel range set in the automatic transmission mechanism 12 is sequentially switched in the forward direction.

As a result, when the driver stops the operation switch 18 at the forward 2nd-speed range position "2" and wants to switch the travel range position to the forward 2nd-speed range "2", the forward 1st-speed range "1" is undesirably set beyond the forward 2nd-speed range "2" in the automatic transmission mechanism 12. That is, the travel range set by the operation switch 18 does not coincide with the travel range set in the automatic transmission mechanism 12, and a failed state occurs.

However, as described above, according to this embodiment, as long as the operation switch 18 is located within the monitor range, the travel range in the automatic transmission mechanism 12 is stopped at the immediately preceding travel range set by the operation switch 18, and this travel range is temporarily set. Therefore, the travel range in the automatic transmission mechanism 12 can be reliably prevented from overshooting a travel range to be set by the operation switch 18.

While the operation switch 18 is operated within the monitor range, a control loop is executed such that NO is determined in step S60 via steps S52 to S58, YES is determined in step S80, NO is determined in step S94 via steps S90 and S92, and then the flow returns to step S52 via steps S82, S84 (or S86), S88, and S68. As will be described later, however, since it is very abnormal to operate the operation switch 18 to stay within the monitor range for a long period of time, when a stay time of the operation switch 18 in the monitor range exceeds a predetermined period of time, a fourth failed state is satisfied, and a fourth fail-safe operation is executed.

On the other hand, when the operation switch 18 is further operated and enters the next travel range setting position to fall outside the monitor range, NO is determined in step S60 at that time, and steps S82 and S84 (or S86) are executed to drive the first driving motor 22A in the same manner as in a case wherein the operation switch 18 is switched to the adjacent travel range. Thereafter, steps S88, S68, S70, S72, S52, S54, and S56 are executed, and decision step S60 is then executed again. Since the travel range in the automatic transmission mechanism 12 catches up that set by the operation switch 18, YES is determined in step S60, and steps S62, S64, S66, S68, ... are executed to stop the first driving motor 22A.

On the other hand, when the third CPU 30C system-fails, and "1" is set in the flag F (degeneration) in step S74 described above, or when the third CPU 30C detects that the first or second CPU 30A or 30B system-fails, and "1" is set in the flag F (degeneration) in step S38 in the main routine of the third CPU 30C, degeneration control is started. When "1" is set in the flag F (degeneration) in this manner, since YES is determined in step S58, the flow advances to step S96, and degeneration control is executed in step S96.

Figure 21:
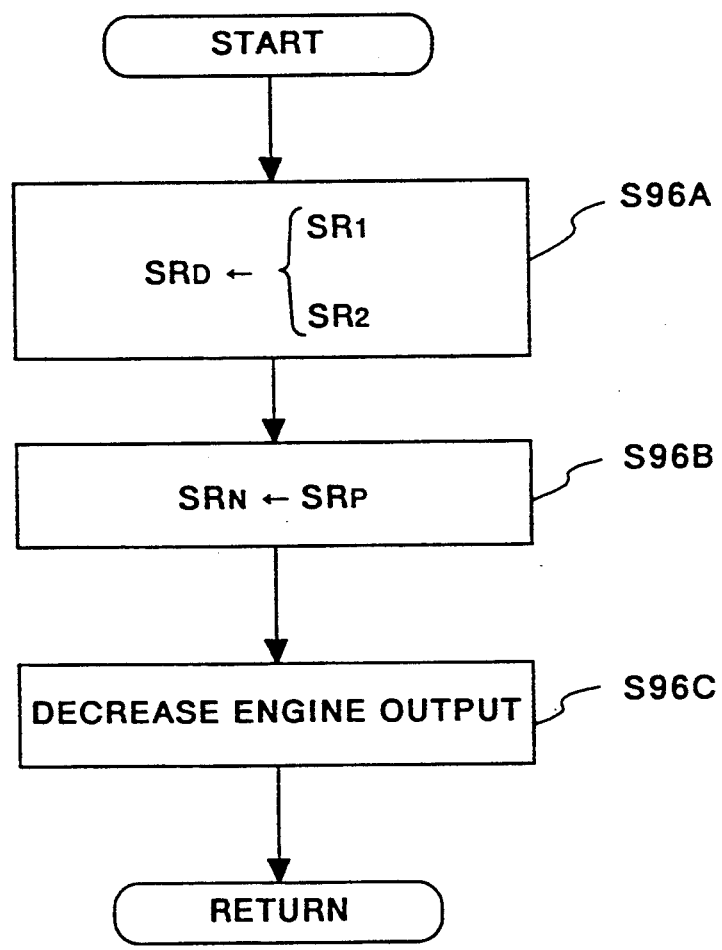
FIG. 21 is a flow chart showing a control sequence of a degeneration control subroutine.

In this degeneration control, as shown in FIG. 21, in step S96A, both travel range signals $SR_1$ and $SR_2$ indicating the forward 1st-speed range "1" and the forward 2nd-speed range "2" of the travel ranges set by the operation switch 18 are controlled to be a pseudo travel range signal $SR_D$ indicating the forward drive range "D", and in step S96B, a travel range signal $SR_P$ indicating the parking range "P" is controlled to be a pseudo travel range signal $SR_N$ indicating the neutral range "N". In addition, in step S96C, an operation for decreasing an engine output is executed. After a pseudo control operation is executed as the degeneration control operation, the flow returns to step S60.

More specifically, in this degeneration control, travel ranges switched by the operation switch 18 are limited to three ranges, i.e., the forward drive range "D", the neutral range "N", and the reverse range "R". As a result, the forward 1st-speed range "1", the forward 2nd-speed range "2", and the parking range "P" cannot be set in the automatic transmission mechanism 12, and even when the forward 1st-speed range "1" or the forward 2nd-speed range "2" is set by the operation switch 18, the automatic transmission mechanism 12 is forced to set the forward drive range "D". Even when the parking range "P" is set by the operation switch 18, the automatic transmission mechanism 12 is forced to set the neutral range "N". In this manner, the travel range switching operation in the automatic transmission mechanism 12 is limited, thus assuring safety travel.

The operation for decreasing the engine output is executed by forcibly prolonging a fuel injection timing or forcibly decreasing a fuel injection amount in an engine adopting a fuel injection system. As a result, a maximum velocity of a vehicle is limited to, e.g., 30 km/h. Since the engine output is forcibly decreased in the degeneration control, even when the driver does not notice the first warning operation, and keeps driving a vehicle as usual, he or she can reliably recognize an abnormal state since the travel velocity is decreased. Thus, the driver is forced to travel a vehicle to a service station, and even when another CPU system-fails, he or she can safely stop the vehicle.

In this manner, the degeneration control is executed in step S96, thus reliably guaranteeing safety travel of the vehicle.

As described in detail above, as shown in the main routine of the first CPU 30A, the travel range of the automatic transmission mechanism 12 is set to reliably coincide with the travel range set at a stop position of the operation switch 18.

As has already been described above, since the control sequence of the main routine in the second CPU 30B is the same as that in the first CPU 30A, a description thereof will be omitted.

A subroutine of a fail judgment signal output operation in step S30 shown in FIG. 19B will be described below with reference to FIGS. 22A and 22B.

This subroutine outputs a system fail judgment signal having a predetermined pulse width (e.g., 100 μs) at a predetermined time interval (e.g., 10 ms), as shown in FIG. 22B, as long as the third CPU 30C normally and repetitively executes its control sequence. In other words, if this third CPU 30C runs away, and can no longer normally execute the control sequence, the above-mentioned system fail judgment signal is kept output or is not output at all. Therefore, the first or second CPU 30A or 30B always monitors the system fail judgment signal output from the third CPU 30C. More specifically, the first or second CPU 30A or 30B measures a pulse width of the system fail judgment signal, i.e., a high-level period, and an output interval, i.e., a time between two adjacent leading edges to "H" level. When the first or second CPU 30A or 30B determines that these data exceed their allowable variation ranges, it determines that the third CPU 30C system-fails, and sets "1" in the flag F (3F) indicating that the third CPU 30C system-fails.

The control sequence of the fail judgment signal output operation will be described below with reference to FIG. 22A.

In an initialized state in step S12 described above, an output state of this system fail judgment signal is set to be "H" level, and a first timer for generating the signal is reset to start a count-up operation. In this state, in step S100, it is checked if the output state of the system fail judgment signal is "L" level. Immediately after this control sequence is started, NO is normally determined in step S100, and it is checked in step S102 if 100 μs have elapsed after the first timer is reset. If NO in step S102, i.e., if it is determined that 100 μs have not elapsed yet after the first timer is reset, the control sequence returns to the original main routine.

On the other hand, if YES in step S102, i.e., if it is determined that 100 μs have elapsed after the first timer is reset, the flow advances to step S104, and an output state is switched from "H" level to "L" level. Thereafter, the control operation returns to the original main routine.

If YES in step S100, i.e., if it is determined that the output state is "L" level, the flow advances to step S106 to check if 10 ms have elapsed after the first timer is reset. If NO in step S106, i.e., if it is determined that 10 ms have not elapsed yet after the first timer is reset, the control sequence returns to the original main routine.

On the other hand, if YES is determined in step S106, i.e., if it is determined that 10 ms have passed after the first timer is reset, the flow advances to step S108, and the output state is switched from "L" level to "H" level. After the timer is reset in step S110, the control operation returns to the original main routine.

In this manner, steps S100 to S110 are executed to output a predetermined system fail judgment signal, as shown in FIG. 22B.

Figure 22A:
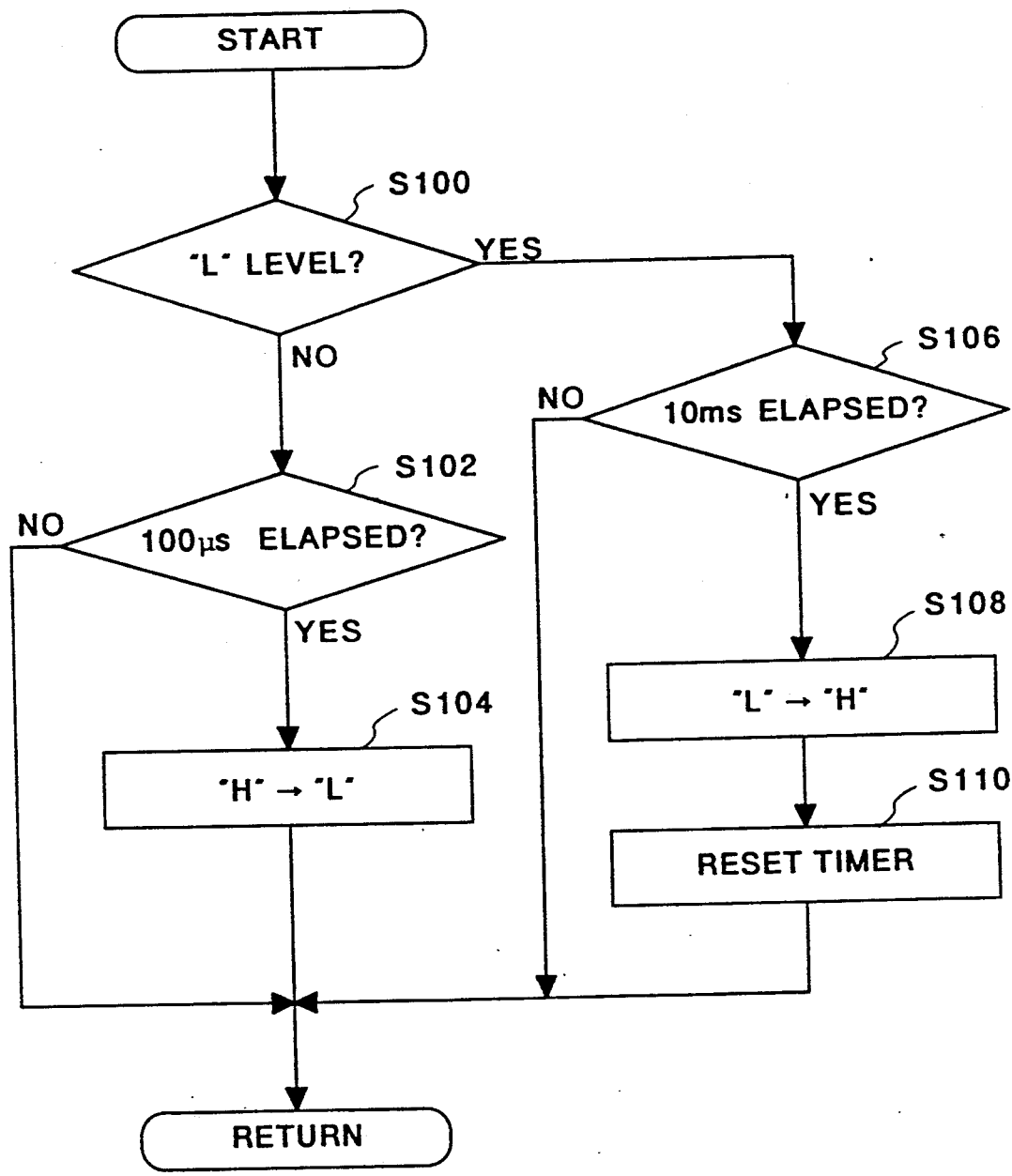
FIG. 22A is a flow chart showing a control sequence of a fail judgment signal output operation subroutine.

The fail judgment signal output operation shown in FIG. 22A is the same as that in step S72 for the first CPU 30A, and hence, is the same as that executed in the second CPU 30B. For this reason, a description of the fail judgment signal output operation executed in the first and second CPUs 30A and 30B will be omitted.

The system fail judgment operation of the first CPU 30A in step S22 in FIG. 19A will be described below with reference to FIG. 23.

In this system fail judgment operation, the system fail judgment signal output from the first CPU 30A by the above-mentioned fail judgment signal output operation is always monitored. When it is determined that the output state of the system fail judgment signal is changed between "H" level and "L" level within a predetermined allowable range, it can be determined that the first CPU 30A does not suffer from system failure, and executes a normal control operation.

In this embodiment, the above-mentioned allowable range is set to be ±20%. As a result, if "H" level is changed (falls) to "L" level within a range of 80 $\mu$s to 120 $\mu$s after the timer is reset, it is determined that the CPU is normal. On the other hand, if "L" level is changed (raised) to "H" level within a range of 8 ms to 12 ms after the timer is reset, it is determined that the CPU is normal.

The timer used in this judgment operation is reset by an initialization operation executed when the third CPU 30C is started, and executes a time-up count operation. More specifically, the first and second CPUs 30A and 30B, and the first and third CPUs 30A and 30C exchange the system fail judgment signals each other, and always monitor whether or not the other CPU system-fails, as shown in FIG. 17C. The timers for outputting the system fail judgment signals and timers for determining whether or not a system failed state occurs are reset at substantially the same time when the main corresponding routines are started, and start count-up operations.

When the system fail judgment operation is started, it is checked in step S120 if the present output state is "L" level. If NO in step S120, i.e., if it is determined that the present output state is "H" level, it is then checked in step S122 if 120 $\mu$s have elapsed after the timer is reset. If NO in step S122, i.e., if it is determined that 120 $\mu$s have not elapsed yet after the timer is reset, it is checked in step S124 if the output state is changed from "H" level to "L" level.

If NO in step S124, i.e., if it is determined that the output state is not changed from "H" level to "L" level before 120 $\mu$s elapse after the timer is reset, an abnormal state should not be determined. Therefore, the control sequence returns to the main routine.

On the other hand, if YES in step S122, i.e., if it is determined that the output level is not changed from "H" level to "L" level after 120 $\mu$s have elapsed after the timer is reset, it is determined that the first CPU 30A is abnormal. Thus, in step S126, "1" is set in the flag F (1F) indicating that the first CPU 30A system-fails, and the control sequence returns to the main routine.

Only step S126 is different from the system fail judgment routine in the first and second CPUs 30A and 30B. In step S126 of these CPUs 30A and 30B; "1" is set in the flag F (3F) indicating that the third CPU 30C as an object to be judged system-fails. In step S24 of the third CPU 30C, whether or not the second CPU 30B system-fails is checked. In this step S24, a control sequence other than step S126 is the same as that in step S22 shown in FIG. 23. In step S126 in step S24, "1" is set in the flag F (2F) indicating that the second CPU 30B as an object to be judged system-fails.

If YES is determined in step S124, i.e., if it is determined that the output level is changed from "H" level to "L" level before 120 $\mu$s elapse after the timer is reset, the flow advances to step S128 to check if the level is changed after 80 $\mu$s have elapsed after the timer is reset. If YES in step S128, i.e., if it is determined that the output level is changed from "H" level to "L" level after 80 $\mu$s have elapsed after the timer is reset, this means that the change in output level occurs within a range of 80 $\mu$s to 120 $\mu$s after the timer is reset. Therefore, it is determined that this change in output is normal, and the control sequence returns to the main routine.

On the other hand, if NO is determined in step S128, i.e., if it is determined that the output level is changed before 80 $\mu$s elapse after the timer is reset, it is determined that the first CPU 30A is abnormal, and the flow advances to step S126. In step S126, "1" is set in the flag F (1F) indicating that the first CPU 30A system-fails, and the control sequence returns to the main routine.

If YES is determined in step S120 described above, i.e., if it is determined that the present output level is "L" level, the flow advances to step S130 to check if 12 ms have elapsed after the timer is reset. If NO in step S130, i.e., if it is determined that 12 ms have not elapsed yet after the timer is reset, it is checked in step S132 if the output level is changed from "L" level to "H" level.

If NO in step S132, i.e., if it is determined that the output level is not changed from "L" level to "H" level before 12 ms elapse after the timer is reset, it should not be determined that the CPU is abnormal, and the control sequence returns to the main routine.

If YES in step S130, i.e., if it is determined that the output level is not changed from "L" level to "H" level after 12 ms have elapsed after the timer is reset, it is determined that the first CPU 30A is abnormal, and the flow advances to step S126 described above. In step S126, "1" is set in the flag F (1F) indicating that the first CPU 30A system-fails, and the control sequence returns to the main routine.

If YES in step S132, i.e., if it is determined that the output level is changed from "L" level to "H" level before 12 ms elapse after the timer is reset, the flow advances to step S134 to check if 8 ms have elapsed after the timer is reset. If YES in step S134, i.e., if it is determined that the output level is changed from "L" level to "H" level after 8 ms have elapsed after the timer is reset, this means that the change in output level occurs within a range of 8 ms to 12 ms after the timer is reset, and it is determined that this change in output is normal. Thus, the timer is reset in step S136, and the control sequence then returns to the main routine.

On the other hand, if NO in step S134, i.e., if it is determined that the output level is changed before 8 ms elapse after the timer is reset, it is determined that the first CPU 30A is abnormal, and the flow advances to step S126 described above. In step S126, "1" is set in the flag F (1F) indicating that the first CPU 30A system-fails, and the control sequence returns to the main routine.

Since the system fail judgment routine is programmed in this manner, whether or not the first CPU 30A as an object to be judged system-fails can be reliably determined.

Figure 24A:
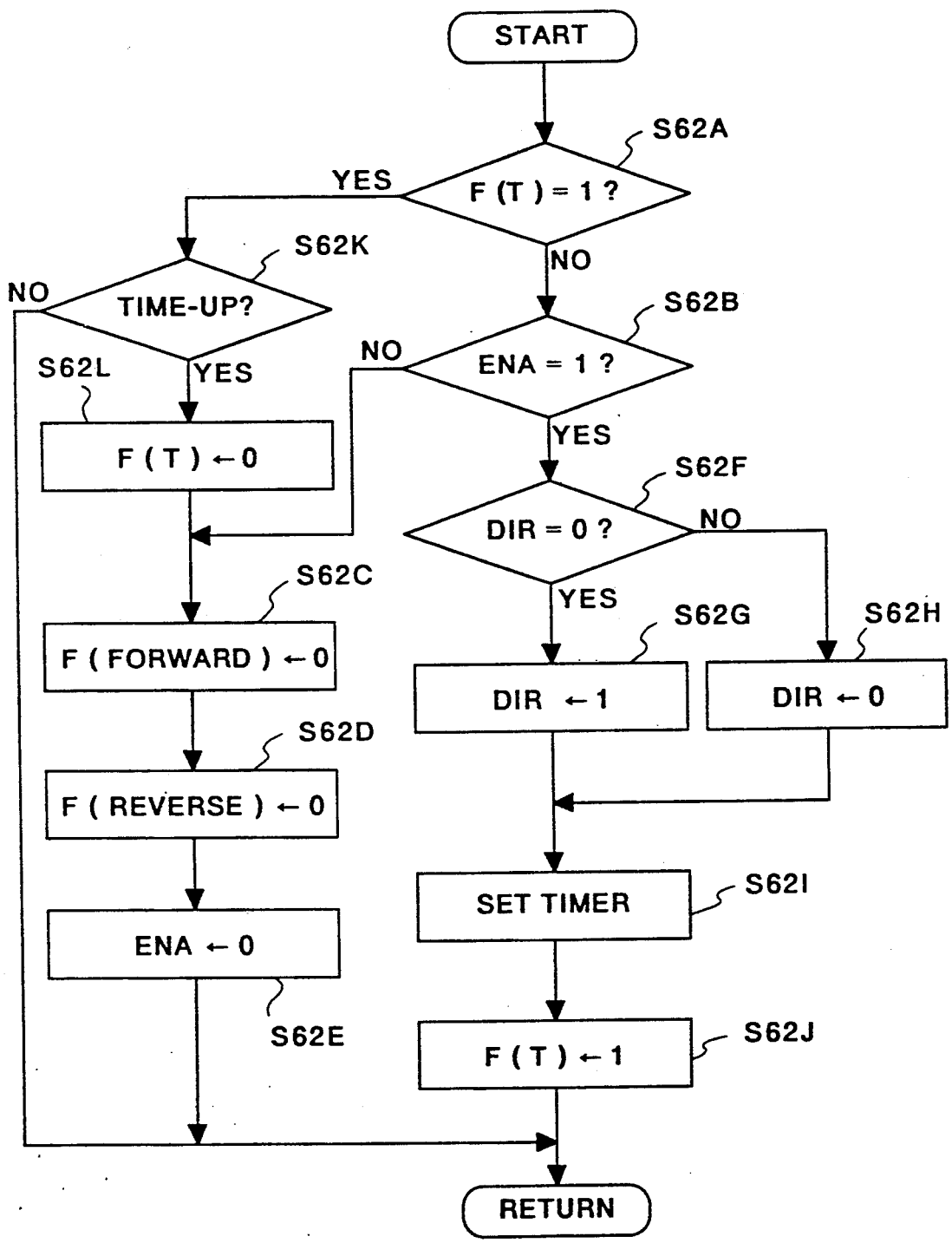
FIG. 24A is a flow chart showing a control sequence of a stop control subroutine in the main routine of the first CPU.

A stop control subroutine in step S62 in the main routine of the first CPU 30A will be described in detail below with reference to FIGS. 24A and 24B.

In this stop control, sequences according to two stop modes are executed. More specifically, in one stop mode wherein a travel range indicated by the operation switch 18 coincides with a travel range set in the automatic transmission mechanism 12 when the first driving motor 22A is kept stopped, since a coincidence state continues, control is made to maintain the stop state.

In the other stop mode wherein the travel range set in the automatic transmission mechanism 12 is caused to coincide with the travel range indicated by the operation switch 18 as a result of the driving operation of the first driving motor 22A, control for stopping the first driving motor 22A at the travel range position set in the automatic transmission mechanism 12 is performed.

More specifically, if YES is determined in step S60 in the main routine of the first CPU 30A, the stop control is started. As shown in FIG. 24A, it is checked in step S62A if "1" is set in a flag (T) indicating a set state of a timer (to be described later). If NO in step S62A, i.e., if it is determined "1" is not set in the flag (T), and the timer does not execute a count operation, the flow advances to step S62B to check if a "1" signal is output to the enable latch circuit ENA.

If NO in step S62B, i.e., if it is determined that YES is determined in step S60 not as a result of the driving operation of the first driving motor 22A upon operation of the operation switch 18 but since a travel range indicated by the operation switch 18 is kept coinciding with a travel range set in the automatic transmission mechanism 12, the first driving motor 22A need not be driven. Therefore, a flag F (forward) indicating that the operation switch 18 is operated in the forward direction is reset in step S62C, and a flag F (reverse) indicating that the operation switch 18 is operated in the reverse direction is reset in step S62D. In step S62E, a "0" signal is output to the enable latch circuit ENA of the first motor driver 126A, and the flow returns to the main routine. As a result, the driving operation of the first driving motor 22A is kept disabled.

On the other hand, if YES in step S62B, i.e., if it is determined that YES is determined in step S60 as a result of the driving operation of the first driving motor 22A upon operation of the operation switch 18, the driving operation of the first driving motor 22A must be stopped, and a travel range in the automatic transmission mechanism 12 must be caused to precisely coincide with a new travel range set by the operation switch 18. For this purpose, in a sequence from step S62F, a direction of a current flowing through the first driving motor 22A is reversed for a predetermined period of time, and the first driving motor 22A is braked by this reverse current. In this manner, control is made so that the driving motor 22A can be reliably stopped in a travel range where a coincidence is determined in step S60.

It is checked in step S62F if a "0" signal is output to the direction latch circuit DIR. If YES in step S62F, a "1" signal is output to the direction latch circuit DIR in step S62G; otherwise, i.e., if it is determined that the "1" signal is output to the direction latch circuit DIR, a "0" signal is output to the direction latch circuit DIR in step S62H.

After the rotational direction of the first driving motor 22A is reversed in this manner, a timer T is set in step S62I. When the timer T is set, a count-up operation for a predetermined time t (to be described later) is started. In step S62J, "1" is set in the flag (T) indicating that the timer T is set, and the flow returns to the main routine.

If YES is determined in step S60 in the main routine, and if YES is determined in step S62A in the stop control subroutine, in other words, when the first driving motor 22A is braked and stopped by the temporary reverse current, it is checked in step S62K if a time set in the timer T has passed so as to measure the energization time of the reverse current. If NO in step S62K, i.e., if it is determined that the time set in the timer T has not passed yet, the flow returns to the above-mentioned main routine, and the reverse current is kept supplied to the first driving motor 22A to brake it.

If YES in step S62K, i.e., if it is determined that the time set in the timer T has passed, and the energization period of the reverse current is ended, "0" is set in the flag (T) in step S62L, i.e., the flag is reset, and the flow advances to step S62C. Then, steps S62C to S62E are sequentially executed, thereby stopping the driving operation of the first driving motor 22A. In a state wherein the first driving motor 22A is stopped in this manner, the flow returns to the main routine.

A detailed operation for precisely positioning and stopping a travel range, which is being switched in the automatic transmission mechanism 12 under the above-mentioned stop control of the CPU, at a target travel range position set by the operation switch 18 will be described below.

More specifically, in order to set a target travel range of the operation switch 18, a stop time of the operation switch 18 stopped at a given travel range position is monitored, and when this stop time exceeds a predetermined period of time, the travel range at the stop position is determined as a target travel range. When the determined target travel range is separated from a travel range presently set in the automatic transmission mechanism 12 by two or more ranges, the first driving motor 22A is braked by energizing it to rotate in a direction opposite to a rotational direction so far for a predetermined period of time when a control inhibitor signal is output from the target travel range control inhibitor switch 32b. Thus, the first driving motor 22A is precisely stopped and held at the target travel range position in a mechanically restrained state by the above-mentioned detent mechanism 76, a detent mechanism (not shown) in the manual driving mechanism 38, and the detent mechanism 62H equipped in the select switch 32 itself.

Figure 24B:
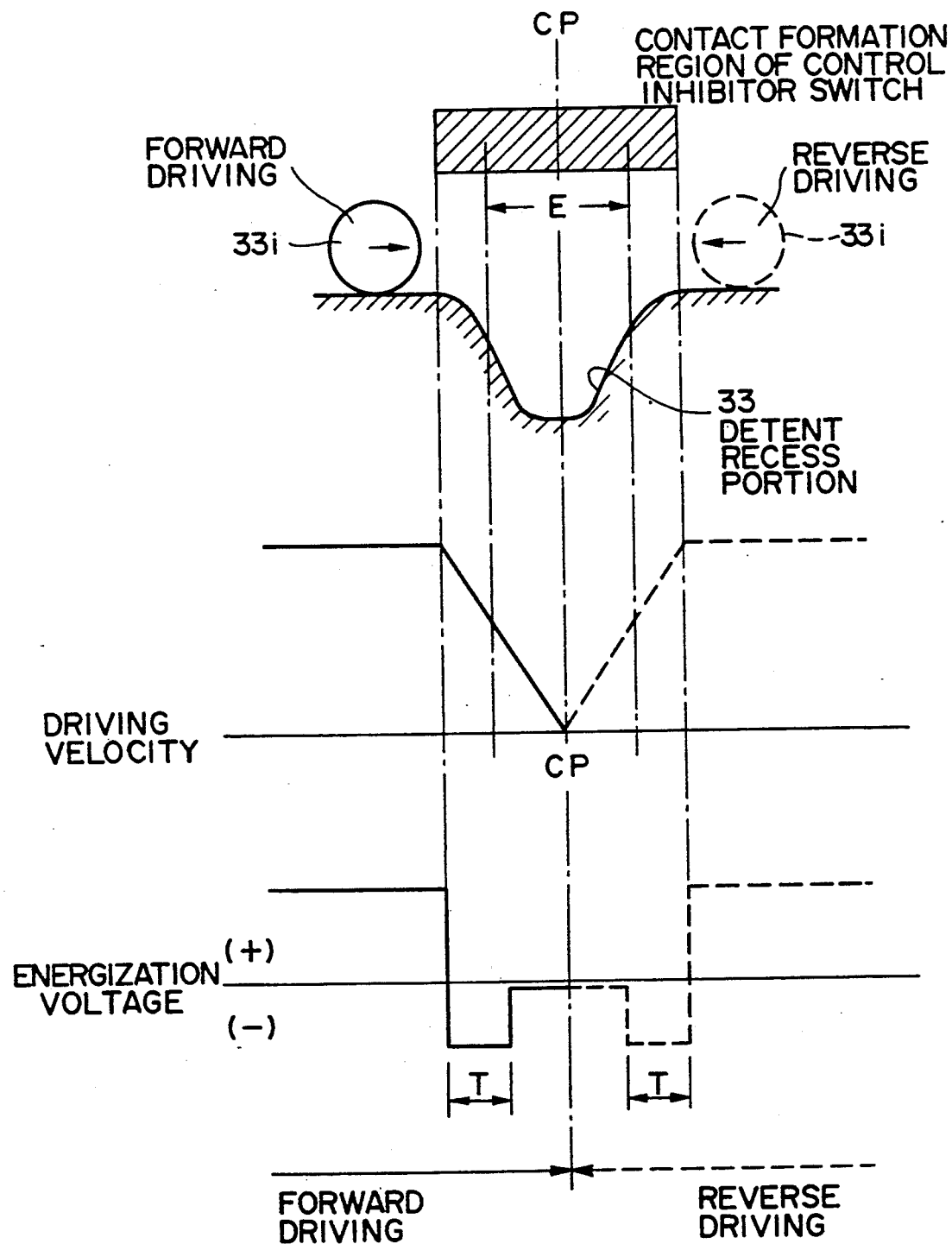
FIG. 24B is a view for explaining a stop operation of a driving motor.

More specifically, as shown in FIG. 24B, when a constant braking time is set, a deceleration of the first driving motor 22A can be kept constant. As described above, a voltage applied to the first driving motor 22A is maintained at a predetermined value by the DC/DC converter 128, and as a result, a driving torque can be kept constant. Therefore, the driving velocity can be kept constant. More specifically, since both the driving velocity and the deceleration are constant, a moving distance L from when the braking operation is started until the switching rod 16a of the hydraulic valve 16 is stopped can be kept constant regardless of the travel ranges, and a switching operation starting from any travel range.

As a result, when each of the contacts $S_P$, $S_R$, $S_N$, $S_D$, $S_2$, and $S_1$ are formed such that their two edges are located at positions extending from the center CP of each of the detent recess portions 33a to 33f corresponding to the respective travel ranges by the distance L in the two travel directions, a target travel range indicated by the operation switch 18 can be precisely set in the automatic transmission mechanism 12.

The first driving motor 22A is controlled in this manner, so that the travel range in the automatic transmission mechanism 12 precisely coincides with the travel range set by the operation switch 18. However, the first driving motor 22A may overshoot or undershoot under various conditions (e.g., initial variations in members, initial variations in mounting states, variations caused by aging, and the like), and a travel range in the automatic transmission mechanism 12 cannot often be precisely defined.

The overshoot or undershoot state of the first driving motor 22A is detected on the basis of an output from a potentiometer connected to the first driving motor 22A, and an overshoot or undershoot amount is also measured. In particular, in the first stop control operation after the engine is started, a variation in torque occurs due to the above-mentioned conditions, and the motor tends to overshoot or undershoot. For this reason, after the first stop control operation after the engine is started is executed, learning control for changing initial parameters is specially executed, as shown in step S64.

Figure 25A:
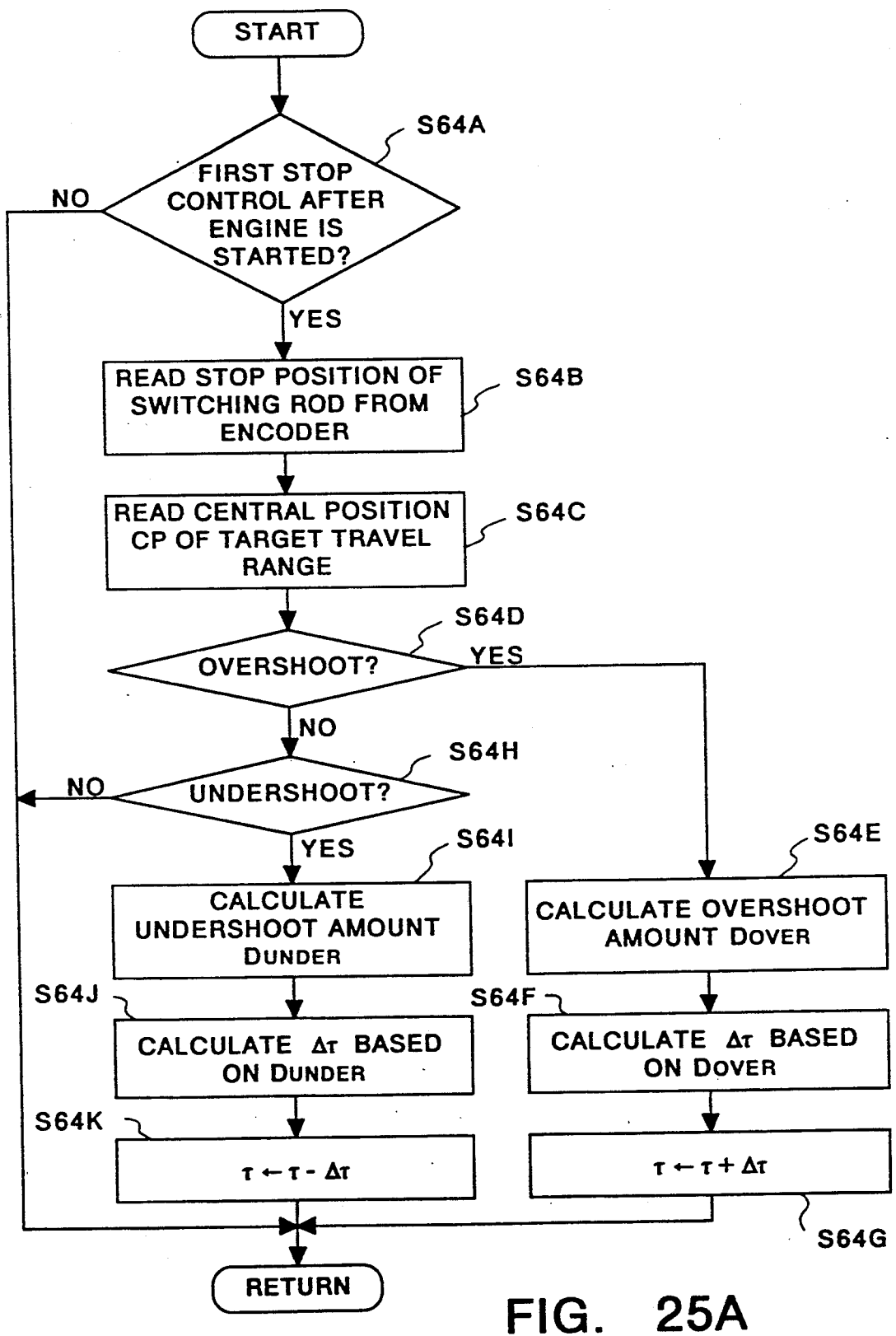
FIG. 25A is a flow chart showing a control sequence of a learning control subroutine in the main routine.
Figure 25B:
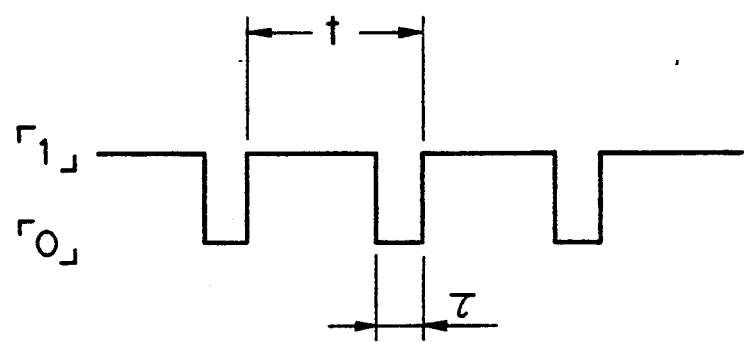
FIG. 25B is a timing chart for explaining a definition of a duty ratio in duty control of the driving motor.

Prior to the description of the learning control, duty control for the first driving motor 22A will be described below. More specifically, in this embodiment, an energization current to the first driving motor 22A is duty-driven at a duty ratio DUTY whose initial value is set to be, e.g., 75% so as to cope with a variation in driving torque while the energization voltage is kept constant, as described above. The duty ratio DUTY is given by:

$$DUTY = (t - \tau)/t$$

where $\tau$ is the non-energization time when a predetermined reference time is represented by t, as shown in FIG. 25B. More specifically, when the non-energization time $\tau$ is prolonged, an energization time essentially serving as a driving torque is shortened, and a driving velocity is decreased. When the non-energization time $\tau$ is shortened, the energization time essentially serving as the driving torque is prolonged, and the driving velocity is increased.

In a state wherein the first driving motor is duty-controlled in this manner, when the stop control is executed in step S62 in the main routine, the learning control is started, and it is checked in step S64A in FIG. 25A if the stop control executed in immediately preceding step S62 is the first stop control after the engine is started. If NO in step S64A, i.e., if it is determined that the stop control executed in immediately preceding step S62 is not the first stop control after the engine is started but is at least the second one, an operation for changing initial values is already completed, and the control immediately returns to the main routine to skip this learning control.

However, if YES in step S64A, i.e., if it is determined that the stop control executed in immediately preceding step S62 is the first stop control after the engine is started, a stop position of a target travel range is read on the basis of an output value from the encoder 36A connected to the first driving motor 22A in step S64B. In step S64C, the central position CP of the target travel range is read. In step S64D, the position data read in steps S64B and S64C are compared to check if the stop position overshoots the target position.

If YES in step S64D, i.e., if it is determined that the stop position overshoots, an overshoot amount $D_{OVER}$ is calculated based on a difference between the read data in step S64E. In step S64F, the above-mentioned non-energization time $\tau$ is corrected on the basis of the calculated overshoot amount $D_{OVER}$, and a correction time $\Delta\tau$ for making the overshoot amount $D_{OVER}$ zero is calculated. After the correction time $\Delta\tau$ is calculated in this manner, the correction time $\Delta\tau$ is added to the non-energization time $\tau$ in step S64G to shorten the essential energization time, thereby essentially decreasing the torque output from the first driving motor 22A. Since the output torque of the first driving motor 22A is decreased in this manner, the stop position and the central position of the target travel range can precisely coincide with each other in the next stop control. After the non-energization time $\tau$ is corrected in this manner in step S64G, the flow returns to the main routine.

On the other hand, if NO in step S64D, i.e., if it is determined that the stop position does not overshoot, step S64H is executed. In step S64H, the position data read in steps S64B and S64C are compared to check if the stop position undershoots the target position. If NO in step S64H, since it is determined that the stop position causes neither overshoot nor undershoot, and the initial value of the above-mentioned duty ratio is correct, the control operation is ended without correcting the initial value. The flow then returns to the main routine.

However, if YES in step S64H, an undershoot amount $D_{UNDER}$ is calculated based on a difference between the two read values in step S64I. In step S64J, the above-mentioned non-energization time $\tau$ is corrected based on the undershoot amount $D_{UNDER}$, and a correction time $\Delta\tau$ for making the undershoot amount $D_{UNDER}$ zero is calculated. After the correction time $\Delta\tau$ is calculated in this manner, the correction time $\Delta\tau$ is subtracted from the non-energization time $\tau$ to increase an essential energization time in step S64K, thereby essentially increasing the torque output from the first driving motor 22A.

More specifically, since the output torque of the first driving motor 22A is increased in this manner, the stop position and the central position of the target travel range can precisely coincide with each other in the next stop control. After the non-energization time $\tau$ is corrected in this manner in step S64K, the flow returns to the main routine.

In addition to an overshoot or undershoot state in the first stop control, an overshoot or undershoot state may occur under various conditions based on arbitrary stop control. When such an overshoot or undershoot state is detected, the first driving motor 22A is energized by an energization time set in proportion to the overshoot or undershoot amount. That is, when the motor overshoots, the first driving motor 22A is energized by the set energization time to be rotated in a direction opposite to a rotational direction so far; when the motor undershoots, the first driving motor 22A is energized by the set energization time to be rotated in the same direction as the rotational direction so far.

In this manner, according to this embodiment, even if an overshoot or undershoot state occurs, the position displacement can be reliably corrected, and a precise positioning state can be attained.

When the correction operation takes too much time, or when an overshoot or undershoot state beyond the correctable range occurs, the first driving motor 22A is kept driven after the stop condition is logically satisfied. Therefore, the first fail judgment is made.

In the select switch 32 of this embodiment, an indication inhibitor signal is output while the first slide brush 32f passes an indication inhibitor contact having a predetermined width in the indication inhibitor switch 32a, and they are in contact with each other, and a travel range set in the automatic transmission mechanism 12 is indicated by the indicator 96 while the inhibitor signal is output. In the control inhibitor switch 32b, a control inhibitor signal is output while the second slide brush 32g passes a control inhibitor contact having a predetermined width, and they are in contact with each other. When the control inhibitor signal is output, constant velocity control of the first driving motor 22A by current feedback is stopped, and a braking operation by a reverse current is started, thereby controlling a final velocity V of the first driving motor 22A.

As a result, as shown in FIG. 2D, in the select switch 32 of the automatic transmission mechanism 12, a detent recess portion corresponding to a travel range set by the operation switch 18 approaches the ball 32i, and after the first and second slide brushes 32f and 32g are brought into contact with the edge portion of the predetermined zone E for defining this travel range, the first slide brush 32f is brought into contact with the corresponding terminal of the indication inhibitor switch 32a to output the indication inhibitor signal first, so that the indicator 96 is caused to indicate a travel range to be set. Thereafter, the brush enters a corresponding hydraulic pressure generation region of the hydraulic valve 16, and the hydraulic valve 16 is caused to generate a predetermined hydraulic pressure necessary for switching the set travel range. Finally, the second slide brush 32g is brought into contact with a corresponding terminal of the control inhibitor switch 32b to output the control inhibitor signal, thus starting a braking operation of the first driving motor 22A.

When the control inhibit signal is output finally, the ball 32i does not enter the receiving zone in the detent recess portion. The braking operation of the first driving motor is started in accordance with the output control inhibitor signal, and the pivotal movement of the switching member 32e having the detent recess portion is stopped just when the ball 32i fits in this detent recess portion. More specifically, according to this embodiment, a travel range in the automatic transmission mechanism 12 can be precisely switched to a travel range finally set by the operation switch 18.

As a result, according to this embodiment, when a travel range set by the operation switch 18 is set in the automatic transmission mechanism 12, the final stop position of the switching member 32e in the select switch 32 need not be detected, and is defined by the detent recess portion. Therefore, the stop position control can be easily performed. In this manner, according to this embodiment, the pivot position of the switching member 32e need not be sequentially detected by, e.g., a potentiometer to precisely recognize a braking start position or a final stop position. Since the hydraulic pressure generation region is set prior to an output of the control inhibitor signal, the travel range switching operation can be reliably executed. In the select switch 32, the indication inhibitor signal is output first when the ball 32i is brought to a formation range of the detent recess portion corresponding to the finally set travel range, and the indicator indicates the finally set travel range. In this manner, when a driver operates the operation switch 18 to set a new travel range, the new travel range can be quickly indicated by the indicator 96, thus attaining proper indication.

Assuming that a distance from an origin of a potentiometer when the inhibitor slide terminal begins to contact the inhibitor contact is represented by $L_1$, a distance from the origin of the potentiometer when the inhibitor slide terminal is about to be disengaged from the inhibitor contact is represented by $L_2$, and a distance from the origin of the potentiometer to a stop position for defining each travel range in the select switch 32 is represented by $L_0$, this distance $L_0$ is corrected and set every time the inhibitor slide terminal passes each inhibitor contact so as to satisfy:

$$L_0 = (L_1 + L_2)/2$$

As a result, even when a relative position between the first driving motor 22A and the potentiometer is changed, a stop position for defining each travel range is always calculated and updated, thus attaining a precise positioning operation.

In the CPU of this embodiment, when the operation switch 18 begins to be operated, and is operated in the reverse direction in a state wherein the travel range set by the operation switch 18 is separated from the travel range in the automatic transmission mechanism 12, i.e., the travel range based on the inhibitor signal from the select switch 32 by one or more range, more specifically, when a second output $\Phi_2$ goes from "L" level to "H" level and then, a first output $\Phi_1$ goes from "L" level to "H" level in a state wherein it is determined that the operation switch 18 is operated in the forward direction since it is detected that the second output $\Phi_2$ goes from "L" level to "H" level after the first output $\Phi_1$ goes from "L" level to "H" level, the reverse operation of the operation switch 18 is detected.

When the reverse operation of the operation switch 18 is detected, the CPU temporarily ignores this reverse detection, and maintains the present driving direction of the first driving motor 22A without reversing it. When the travel range set by the operation switch 18 exceeds the travel range defined based on the inhibitor signal output from the select switch 32, i.e., when the operation position of the operation switch 18 crosses the operation position in the automatic transmission mechanism 12 and passes to the opposite side, the CPU drives the first driving motor 22A in the reversed direction based on the above-mentioned reverse instruction.

With this arrangement, it can be reliably prevented that the travel range position in the automatic transmission mechanism 12 is set to exceed that set by the operation switch 18, and a good control state can be maintained.

The first interrupt routine during execution of the above-mentioned main routine will be described below with reference to FIG. 26. The first interrupt routine is executed every time pulse signals are input to the first interrupt terminals $INT_1$ of the first and second CPUs 30A and 30B in FIG. 17A.

More specifically, when the operation switch 18 is operated, and is moved in a direction to be away from the presently set travel range, two "L"-level states occur in an output (to be simply referred to as a first output hereinafter) $\Phi_1$ from the first output terminal 104 or an output (to be simply referred to as a second output hereinafter) $\Phi_2$ from the second OR gate 114 regardless of the operation direction (forward or reverse direction) of the operation switch 18. More specifically, every time the "L"-level state occurs, a pulse signal is output from the first OR gate 112, and when the operation switch 18 is switched from the presently set travel range position, the first interrupt routine is started a total of twice.

In the first interrupt routine for the first time, in step S140, an "H"-level signal is output to the control terminal of the multiplexer MUX, so that the output from the first output terminal 104 and the output from the second OR gate 114 are input to the input port. In step S142, the first and second outputs $\Phi_1$ and $\Phi_2$ are read.

Thereafter, in step S144, it is checked based on the read results in step S142 if both the first and second outputs $\Phi_1$ and $\Phi_2$ are at "L" level. When the first pulse signal is input to the first interrupt terminal $INT_1$, one of the first and second outputs $\Phi_1$ and $\Phi_2$ goes to "L" level, but the other is kept at "H" level. Thus, NO is determined in step S144.

In step S146, a first timer $T_1$ of the real-time counter RTC is started. An allowable time $t_1$ from when one of the first and second outputs $\Phi_1$ and $\Phi_2$ goes to "L" level until both the outputs go to "L" level is preset in the first timer $T_1$. When the time $t_1$ has passed, the first timer $T_1$ outputs a time-up signal to the CPU, and upon reception of this time-up signal, the CPU interrupts this routine and executes the third fail-safe routine, as will be described later. In step S148, a flag F (monitor) indicating that the operation switch 18 is present in the above-mentioned monitor range is set, and the flow returns to the main routine.

In the first interrupt routine for the first time, a start point of the monitor range is defined, and the first timer $T_1$ starts to count a time during which a state wherein one of the outputs $\Phi_1$ and $\Phi_2$ of the operation switch 18 is kept at "H" level is maintained as the third fail judgment operation.

When the operation switch 18 is further operated and is moved in a direction to be completely away from the presently set travel range, the second "L"-level state occurs in the first or second output $\Phi_1$ or $\Phi_2$ regardless of its operation (forward or reverse) direction. At this time, the second pulse signal is output from the first OR gate 112, and the first interrupt routine is started again, i.e., for the second time.

In the first interrupt routine for the second time, in step S140, an "H"-level signal is output to the control terminal of the multiplexer MUX, and in step S142, the first and second outputs $\Phi_1$ and $\Phi_2$ are read in the same manner as in the first time. In step S144, it is checked based on the read results in step S142 if both the first and second outputs $\Phi_1$ and $\Phi_2$ are at "L" level. When the second pulse signal is input to the first interrupt terminal $INT_1$, since both the first and second outputs $\Phi_1$ and $\Phi_2$ go to "L" level, YES is determined in step S144.

Since one of the outputs $\Phi_1$ and $\Phi_2$ of the operation switch 18 has already gone from an "H"-level state to an "L"-level state, the first timer $T_1$ of the real-time counter RTC is reset in step S150 so as not to execute the third fail judgment. That is, when the first timer $T_1$ is reset, the first timer $T_1$ stops a time-count operation, and is reset to an initial state.

Thereafter, in step S152, a second timer $T_2$ of the real-time counter RTC is started. An allowable time $t_2$ during which a state wherein both the first and second outputs $\Phi_1$ and $\Phi_2$ are kept at "L" level is maintained when the operation switch 18 is operated is preset in the second timer $T_2$. When the time $t_2$ has passed, the second timer $T_2$ outputs a time-up signal to the CPU, and upon reception of this time-up signal, the CPU interrupts this routine and executes the fourth fail-safe routine, as will be described later. In this manner, after the second timer $T_2$ is started in step S152, the flow returns to the main routine.

More specifically, in the first interrupt routine for the second time, the first timer $T_1$ is reset to stop counting a time for maintaining a state wherein one of the outputs $\Phi_1$ and $\Phi_2$ of the operation switch 18 is kept at "H" level, and the second timer $T_2$ starts counting a time for maintaining a state wherein both the outputs $\Phi_1$ and $\Phi_2$ of the operation switch 18 are kept at "L" level as the fourth fail judgment operation.

The second interrupt routine during execution of the above-mentioned main routine of the first CPU 30A will be described below with reference to FIG. 27. The second interrupt routine interrupts the main routine and is executed every time a pulse signal is input to the second interrupt terminal $INT_2$ shown in FIG. 17A.

More specifically, when the operation switch 18 is operated to be moved in a direction to be away from the presently set travel range, and is about to enter the adjacent travel range, two "H"-level states occur in the output $\Phi_1$ from the first output terminal 104 or the output $\Phi_2$ from the second OR gate 114 regardless of the operation (forward or reverse) direction of the switch 18. Every time an "H"-level state occurs, a pulse signal is output from the third OR gate 120. More specifically, when the operation switch 18 is switched from the presently set travel range to the adjacent travel range, the second interrupt routine is executed a total of twice.

In the second interrupt routine for the first time, in step S160, an "H"-level signal is output to the control terminal of the multiplexer MUX, so that the first and second outputs $\Phi_1$ and $\Phi_2$ are input to the input port. In step S162, the first and second outputs $\Phi_1$ and $\Phi_2$ are read.

In step S164, an output change state is judged. The output change state includes three modes, i.e., a first change mode wherein the first output $\Phi_1$ is at "H" level and the second output $\Phi_2$ is at "L" level, a second change mode wherein the first output $\Phi_1$ is at "L" level and the second output $\Phi_2$ is at "H" level, and a third change mode wherein both the outputs $\Phi_1$ and $\Phi_2$ are at "H" level. However, since this second interrupt routine is executed for the first time, only the first and second change modes can theoretically occur. If the first change mode is determined in step S164, this means that the operation direction of the operation switch 18 is determined as a forward direction when the interrupt routine for the second time is started. Therefore, in step S166, a flag (T forward) for preliminarily defining the forward direction is set.

Thereafter, the second timer $T_2$ is reset in step S168. That is, since the second interrupt routine is started, this means that at least one of the outputs $\Phi_1$ and $\Phi_2$ goes to "H" level, and the second timer $T_2$ for counting a time during which both the outputs $\Phi_1$ and $\Phi_2$ are at "L" level is reset to inhibit the fourth fail judgment operation. More specifically, when the second timer $T_2$ is reset, it stops a time-count operation, and is reset to an initial state. In step S170, a third timer $T_3$ of the real-time counter RTC is started.

An allowable time $t_3$ from when one of the first and second outputs $\Phi_1$ and $\Phi_2$ goes to "H" level until both the outputs go to "H" level is preset in the third timer $T_3$. Note that when the time $t_3$ has passed, the third timer $T_3$ outputs a time-up signal to the CPU, and upon reception of this time-up signal, the CPU interrupts this routine and executes the fifth fail-safe routine, as will be described later. After the third timer $T_3$ is started in step S170, the flow returns to the main routine.

On the other hand, if the second change mode is determined in step S164, this means that the operation direction of the operation switch 18 is determined as a reverse direction when the interrupt routine for the second time is started. In step S172, a flag F (T reverse) for preliminarily defining the reverse direction is set, and the flow jumps to step S168 described above. Steps S168 and S170 are sequentially executed, and then, the flow returns to the main routine.

In this manner, in the second interrupt routine for the first time, the third timer $T_3$ starts counting a time for maintaining a state wherein one of the outputs $\Phi_1$ and $\Phi_2$ of the operation switch 18 is at "L" level as the fifth fail judgment operation.

When the operation switch 18 is further operated and is moved in a direction to perfectly enter the next travel range, the second "H"-level state occurs in the first or second output $\Phi_1$ or $\Phi_2$ regardless of its operation (forward or reverse) direction. At this time, the third OR gate 120 outputs the second pulse signal, and the second interrupt routine is started again, i.e., for the second time.

In the second interrupt routine for the second time, steps S160 and S162 are sequentially executed in the same manner as in the first time, and in step S164, the third change mode is determined, i.e., it is judged that both the outputs $\Phi_1$ and $\Phi_2$ go to "H" level. Since establishment of this judgment means that the operation switch 18 escapes from the above-mentioned monitor range, the flag F (monitor) for defining the monitor range is reset in step S174. In step S176, whether the operation switch 18 is operated in the forward or reverse direction is determined.

More specifically, if the third change mode is determined in step S164 in a state wherein the preliminary flag F (T forward) is set in the second interrupt routine for the first time, it is determined in step S176 that the operation switch 18 is operated in the forward direction. In step S178, the flag F (forward) indicating that the operation switch 18 is operated in the forward direction is set, and in step S180, the flag F (reverse) indicating the reverse direction is reset. In addition, in step S182, the preliminary flag F (T forward) is reset.

Thereafter, since it is recognized in step S164 that both the outputs $\Phi_1$ and $\Phi_2$ go to "H" level, the third timer $T_3$ of the real-time counter RTC is reset in step S184 to inhibit the fifth fail judgment. That is, when the third timer $T_3$ is reset, it stops a time-count operation, and is reset to an initial state. After the third timer $T_3$ is reset in step S184, the flow returns to the main routine.

On the other hand, if the third change mode is determined in step S164 in a state wherein the preliminary flag F (T reverse) is set in the second interrupt routine for the first time, it is determined in step S176 described above that the operation switch 18 is operated in the reverse direction. In step S186, the flag F (reverse) indicating that the operation switch 18 is operated in the reverse direction is set, and in step S188, the flag F (forward) indicating the forward direction is reset. In addition, in step S190, the preliminary flag F (T reverse) is reset.

Thereafter, the flow jumps to step S184 described above, and the third timer $T_3$ of the real-time counter RTC is reset. After the third timer $T_3$ is reset in this manner, the flow returns to the main routine.

In this manner, in the second interrupt routine for the second time, the third timer $T_3$ is reset to stop counting a time for maintaining a state wherein one of the outputs $\Phi_1$ and $\Phi_2$ of the operation switch 18 is at "L" level, and whether the operation switch 18 is operated in the forward or reverse direction is defined. As a result, as has been described above in step S82 in the main routine, even if the final target position (travel range) upon operation of the operation switch 18 is unknown, since at least the operation direction of the operation switch 18 is determined, the following control is executed while the target travel range position is unknown. That is, the first driving motor 22A is started in accordance with the operation direction of the operation switch 18, thus starting the travel range switching operation in the automatic transmission mechanism 12.

As a result, in this embodiment, even when the operation switch 18 is quickly operated, the travel range switching operation in the automatic transmission mechanism 12 is started to follow this quick operation. Thus, the actual travel range switching operation in the automatic transmission mechanism 12 which satisfactorily responds to the travel range switching operation by the driver can be realized.

The first fail judgment subroutine in step S66 described in the above-mentioned main routine of the first CPU 30A will be described below with reference to FIG. 28.

In this first fail judgment, even when a time $t_4$ which sufficiently makes an allowance for a time required for converging a vibration state when the motor is stopped after the stop state of the first driving motor 22A is logically attained, and a time required for mechanically correcting an allowable overshoot or undershoot by the above-mentioned detent mechanism is set, if the first driving motor 22A is kept driven to exceed the setting time $t_4$, an abnormal state is determined, and fail judgment is executed.

Figure 28:
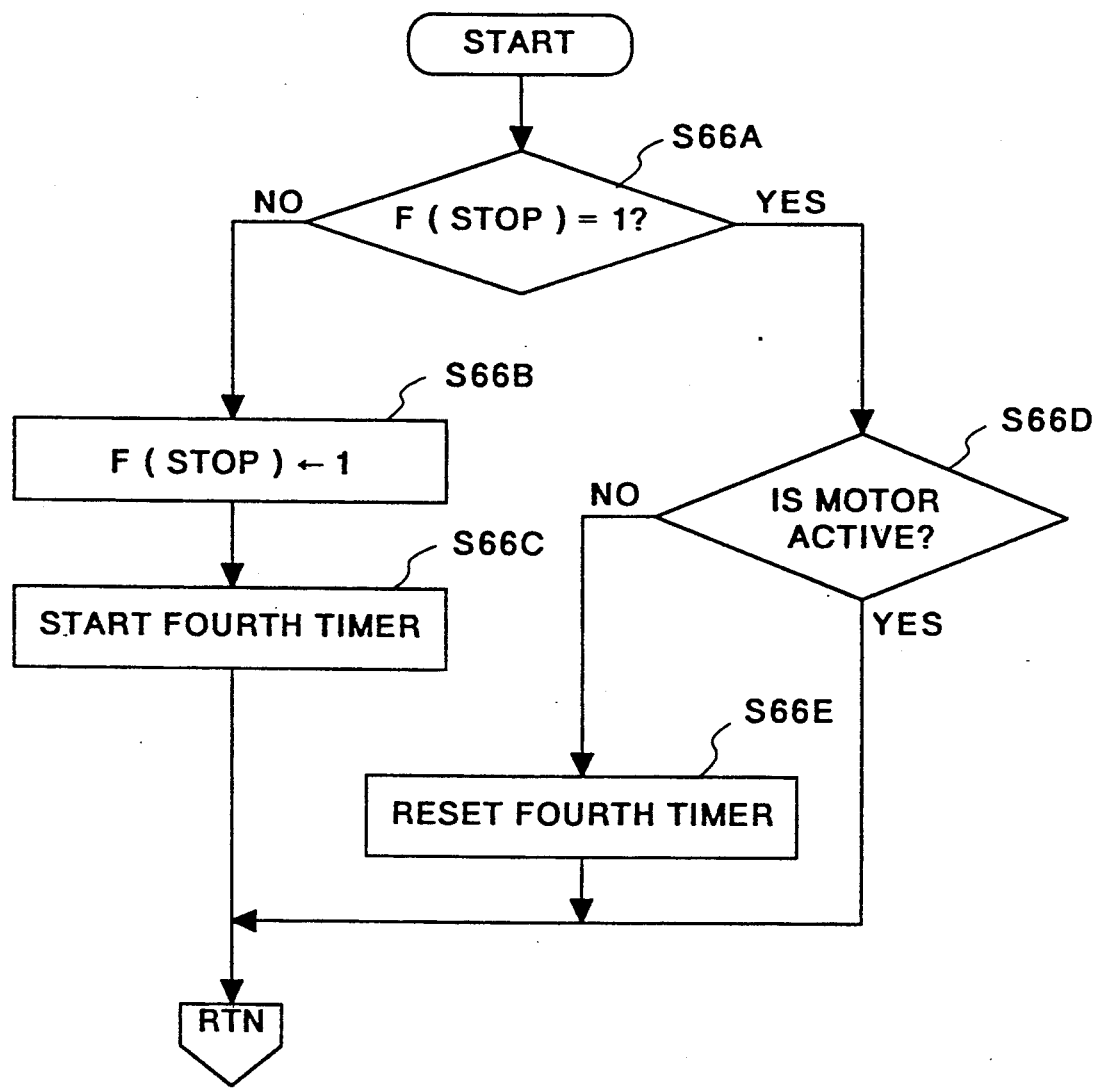
FIG. 28 is a flow chart showing a sequence of a first fail judgment operation subroutine in the CPU.

More specifically, when execution of learning control in step S64 is completed in the main routine, as shown in FIG. 28, it is checked in step S66A if a flag F (stop) indicating that a stop state occurs is set. When step S66A is judged for the first time, since this flag F (stop) is not set in advance, NO is determined. In step S66B, this flag F (stop) is set, and a fourth timer $T_4$ of the real-time counter RTC is started in step S66C.

The above-mentioned predetermined time $t_4$ is preset in the fourth timer $T_4$. When the time $t_4$ has passed, the fourth timer $T_4$ outputs a time-up signal to the first CPU 30A, and upon reception of this time-up signal, the first CPU 30A interrupts the executing routine, and executes the first fail-safe routine, as will be described later. After the fourth timer $T_4$ is started in step S66C in this manner, the flow returns to the main routine.

When the first fail judgment subroutine is executed for the second time and thereafter, since the flag F (stop) is set in step S66B in the first subroutine, YES is determined in step S66A. If YES in step S66A, it is checked in step S66D if the first driving motor 22A is kept operated. This judgment is performed by detecting an output from the encoder 36A attached to the first driving motor 22A.

If YES in step S66D, i.e., if it is determined that the first driving motor 22A is kept operated, the flow returns to the main routine without resetting the fourth timer $T_4$. However, if NO in step S66D, i.e., if it is determined that the driving operation of the first driving motor 22A is stopped, the fourth timer $T_4$ is reset in step S66E to stop the first fail judgment. More specifically, when the fourth timer $T_4$ is reset, it stops a time-count operation, and is reset to an initial state. After the fourth timer $T_4$ is reset in step S66E, the flow returns to the main routine.

Since the first fail judgment subroutine is constituted in this manner, if the first driving motor 22A is kept operated to exceed the setting time $t_4$ described above, i.e., if step S66E is not executed, the time-up signal is output from the fourth timer $T_4$ to the first CPU 30A, and the first CPU 30A determines a failed state.

Figure 29:
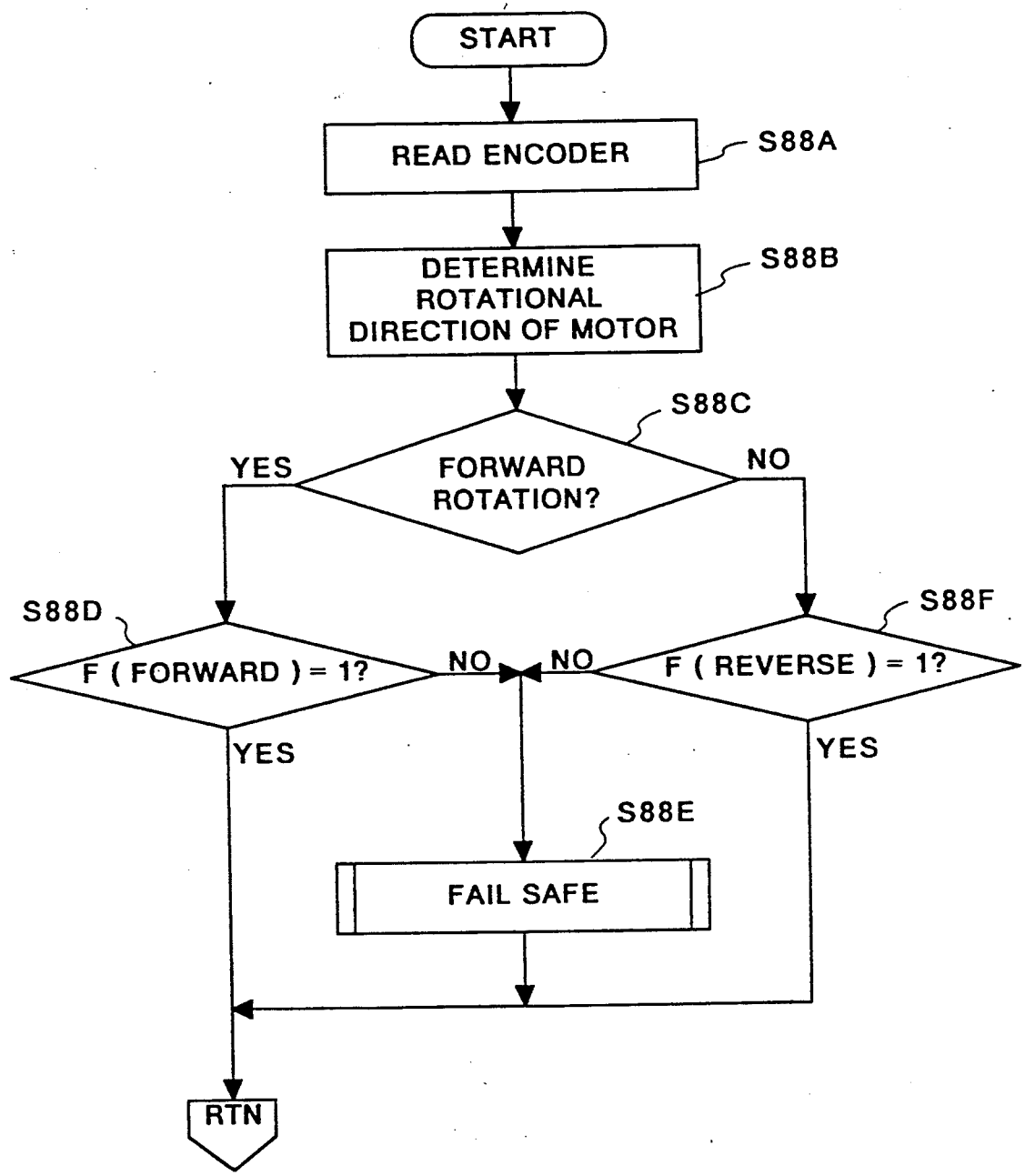
FIG. 29 is a flow chart showing a sequence of a second fail judgment operation subroutine in the CPU.

The second fail judgment subroutine in step S88 described in the above-mentioned main routine will be described below with reference to FIG. 29.

In this second fail judgment, when the operation direction of the operation switch 18 determined in the operation direction determination routine in the second interrupt routine does not coincide with the actual driving direction of the first driving motor 22A, it is determined that an abnormal state occurs, and fail judgment is executed.

More specifically, when step S84 or S86 is executed in the above-mentioned main routine, in step S88A, an output state of the encoder 36A of the first driving motor 22A is read, and the rotational direction of the first driving motor 22A is judged on the basis of the read output from the encoder 36A in step S88B. If it is determined in step S88C that the rotational direction of the first driving motor 22A is the forward direction, it is checked in step S88D if the flag F (forward) indicating that the operation direction of the operation switch 18 is the forward direction is set.

If YES in step S88D, i.e., if it is determined that both the rotational direction of the first driving motor 22A and the operation direction of the operation switch 18 are forward directions, since there is no problem, the flow returns to the main routine. However, if NO in step S88D, i.e., if it is determined that the rotational direction of the first driving motor 22A is the forward direction but the operation direction of the operation switch 18 is the reverse direction, and the two directions do not coincide with each other, it is determined that an abnormal state occurs. In step S88E, the second fail-safe operation is executed, and a warning operation is executed to inform to a driver that a failed state occurs and a fail-safe operation is under execution based on this failed state. The flow then returns to the main routine.

On the other hand, if it is determined in step S88C that the rotational direction of the first driving motor 22A is the reverse direction, it is checked in step S88F if the flag F (reverse) indicating that the operation direction of the operation switch 18 is the reverse direction is set.

If YES in step S88F, i.e., if it is determined that both the rotational direction of the first driving motor 22A and the operation direction of the operation switch 18 are reverse directions, since there is no problem, the flow returns to the main routine. However, if NO in step S88F, if it is determined that the rotational direction of the first driving motor 22A is the reverse direction but the operation direction of the operation switch 18 is the forward direction, and the two directions do not coincide with each other, it is determined that an abnormal state occurs. The flow jumps to step S88E to execute the fail-safe operation, and the flow returns to the main routine.

The first and third to fifth fail-safe control operations will be described below with reference to FIGS. 30 to 33.

Figure 26:
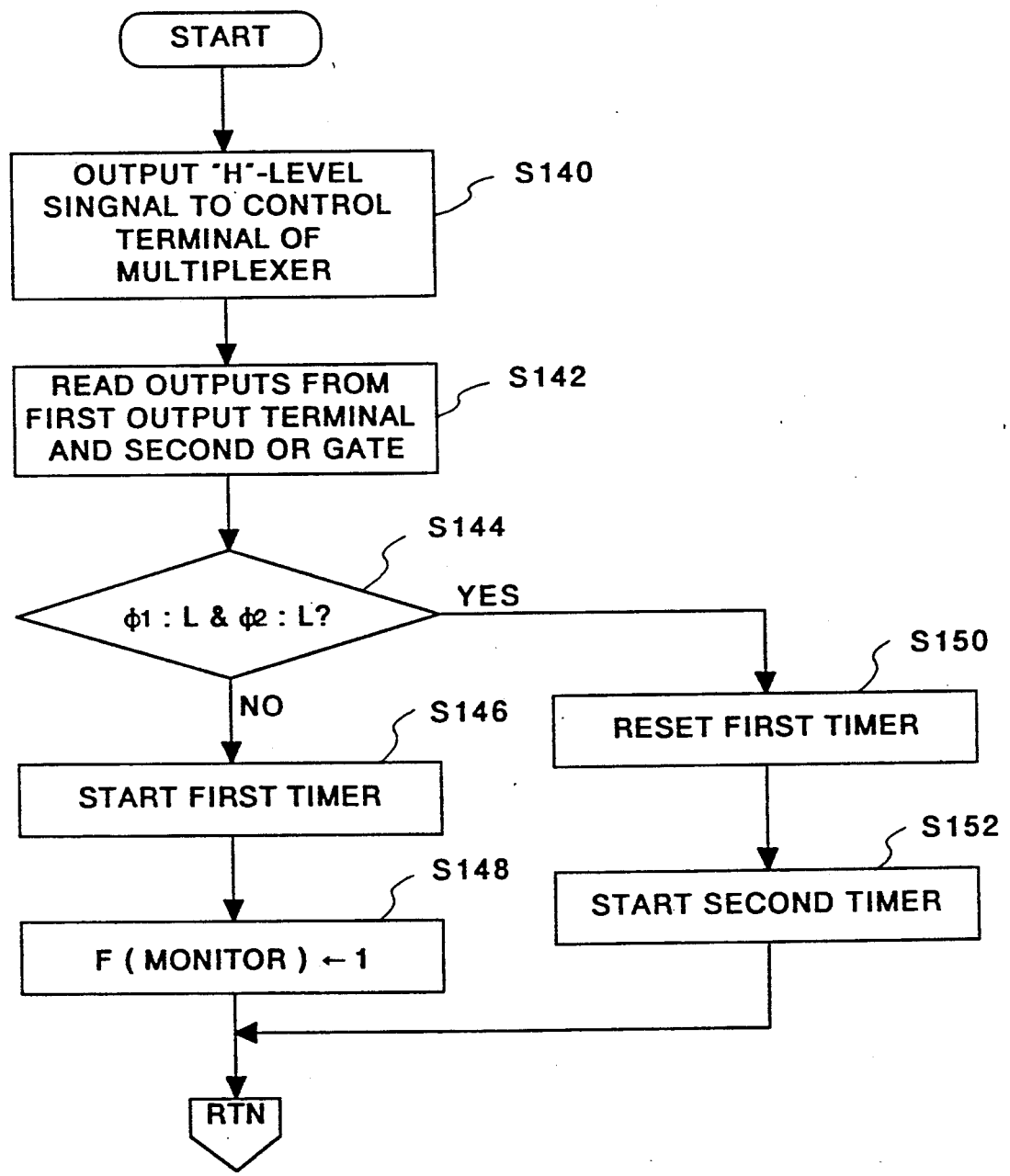
FIG. 26 is a flow chart showing a sequence of a first interrupt routine in the CPU.

As has been described above in the first interrupt routine with reference to FIG. 26, when the operation switch 18 is operated to switch the presently set travel range, a state wherein both the first and second outputs $\Phi_1$ and $\Phi_2$ are "H" level must transit to a state wherein one of these outputs is at "L" level. When the first timer $T_1$ is not reset after one of the outputs $\Phi_1$ and $\Phi_2$ goes to "L" level and the predetermined time $t_1$ has passed, i.e., when the operation switch 18 is held at an unstable position where one of the outputs $\Phi_1$ and $\Phi_2$ goes to "L" for the predetermined time $t_1$ or longer, this means that an abnormal operation is performed, or an output state is abnormal, and the third failed state occurs.

Figures 30, 31:
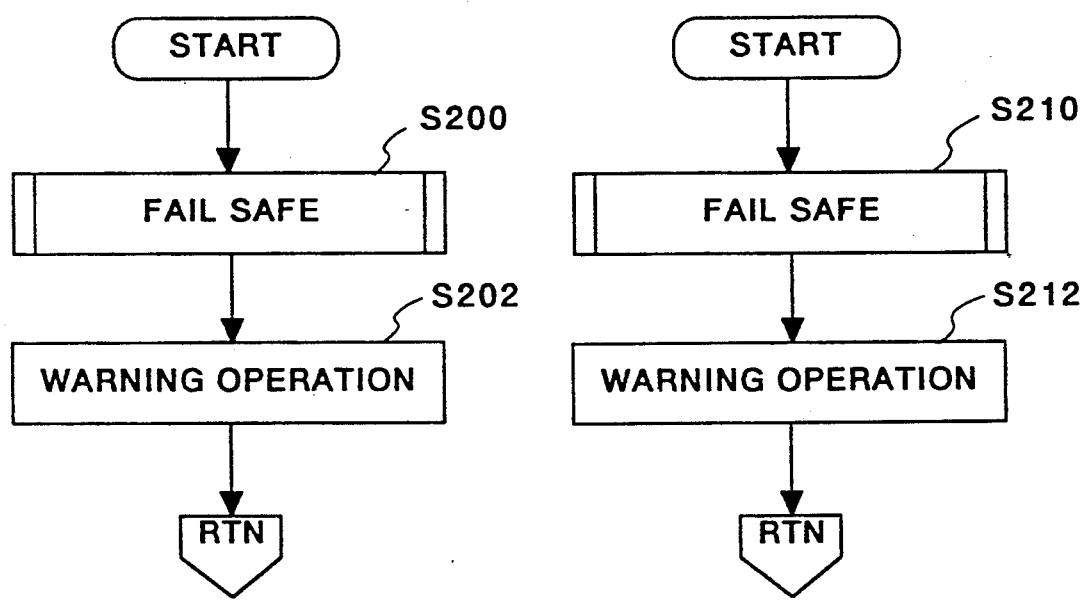
FIGS. 30 to 33 are flow charts showing sequences of first to fourth timer interrupt routines in the CPU, respectively.

Therefore, when the predetermined time $t_1$ has passed, the first timer $T_1$ outputs a time-up signal to the first CPU 30A, and the first CPU 30A starts the first timer interrupt routine upon reception of this time-up signal. In this first timer interrupt routine, as shown in FIG. 30, in step S200, the fail-safe operation is executed, and in step S202, a warning operation is executed, thereby informing to the driver that the failed state occurs, and the fail-safe operation is being executed on the basis of this failed state. The flow then returns to the main routine.

Figure 27A:
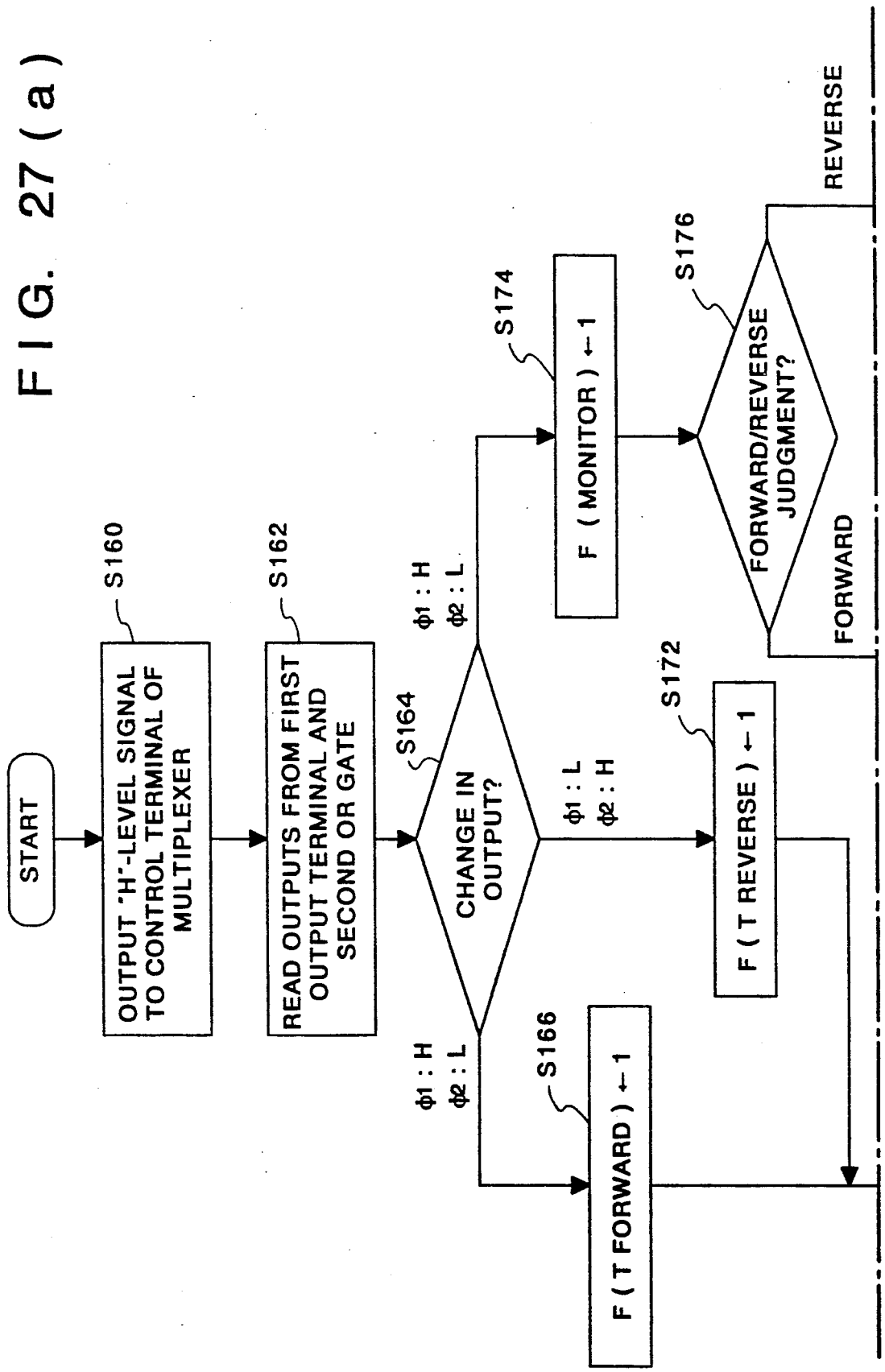
FIG. 27 (a and b) are flow charts showing a sequence of a second interrupt routine in the CPU.
Figure 27B:
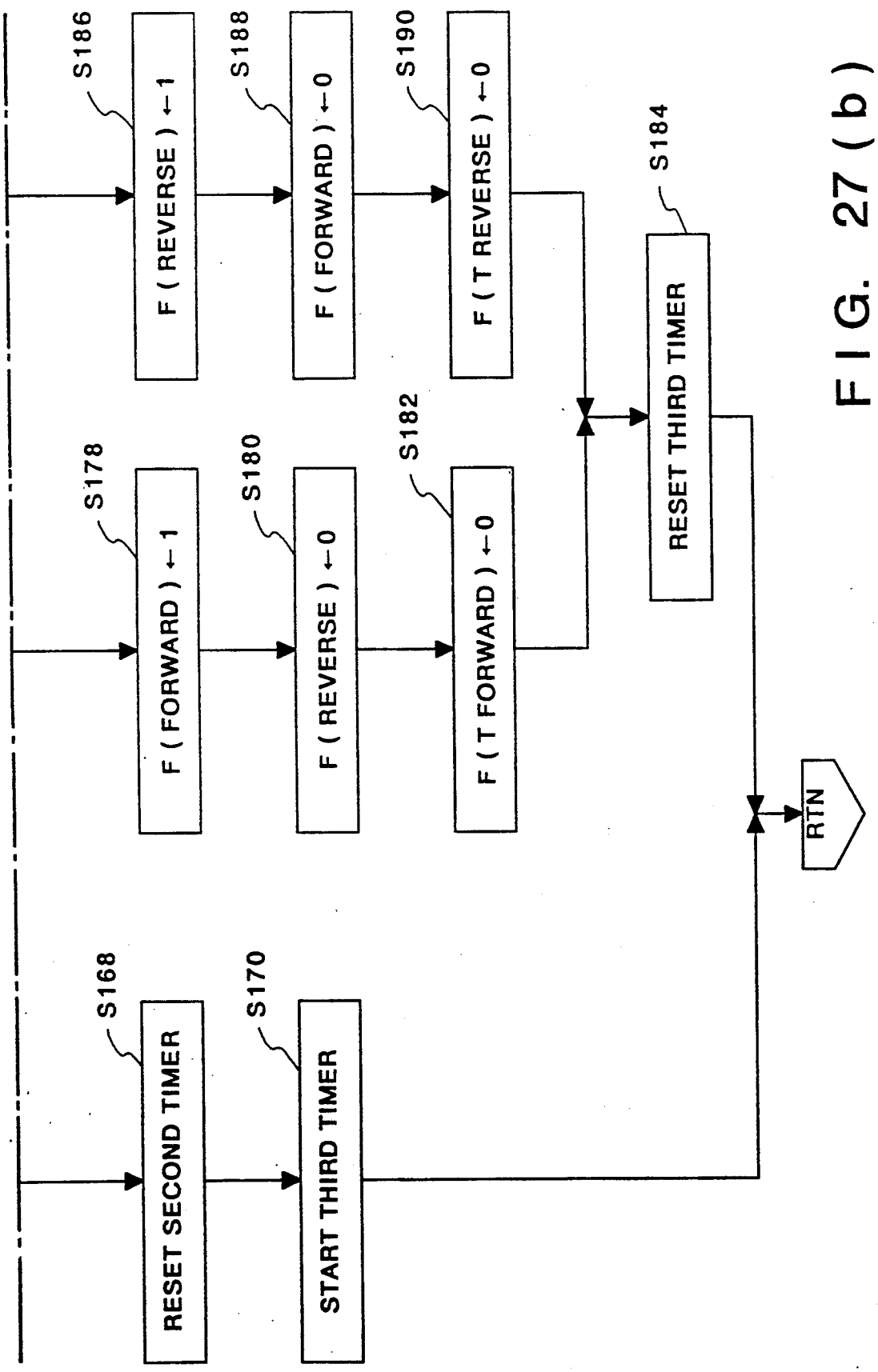

On the other hand, as has been described above in the first and second interrupt routines with reference to FIGS. 26 and 27, a state wherein both the first and second outputs $\Phi_1$ and $\Phi_2$ are at "L" must occur before the operation switch 18 is operated and is switched to the travel range to be set. However, when the second timer $T_2$ cannot be reset after both the outputs $\Phi_1$ and $\Phi_2$ go to "L" level and the predetermined time $t_2$ has passed, i.e., when the operation switch 18 is held at an unstable position where both the outputs $\Phi_1$ and $\Phi_2$ go to "L" level for the predetermined time $t_2$ or longer, this means that an abnormal operation is performed, or an output state is abnormal, and the fourth failed state occurs.

Therefore, when the predetermined time $t_2$ has passed, the second timer $T_2$ outputs a time-up signal to the first CPU 30A, and the first CPU 30A starts the second timer interrupt routine upon reception of this time-up signal. In this second timer interrupt routine, as shown in FIG. 31, in step S210, the fail-safe operation is executed, and in step S212, a warning operation is executed, thereby informing to the driver that the failed state occurs, and the fail-safe operation is being executed on the basis of this failed state. The flow then returns to the main routine.

As has been described above in the second interrupt routine with reference to FIG. 27, when the operation switch 18 is operated to switch the presently set travel range to the next travel range, a state wherein both the first and second outputs $\Phi_1$ and $\Phi_2$ are at "L" level must transit to a state wherein one of these outputs is at "H" level. When the third timer $T_3$ is not reset after one of the outputs $\Phi_1$ and $\Phi_2$ goes to "H" level and the predetermined time $t_3$ has passed, i.e., when the operation switch 18 is held at an unstable position where one of the outputs $\Phi_1$ and $\Phi_2$ goes to "H" level for the predetermined time $t_3$ or longer, this means that an abnormal operation is performed, or an output state is abnormal, and the fifth failed state occurs.

Figure 32:
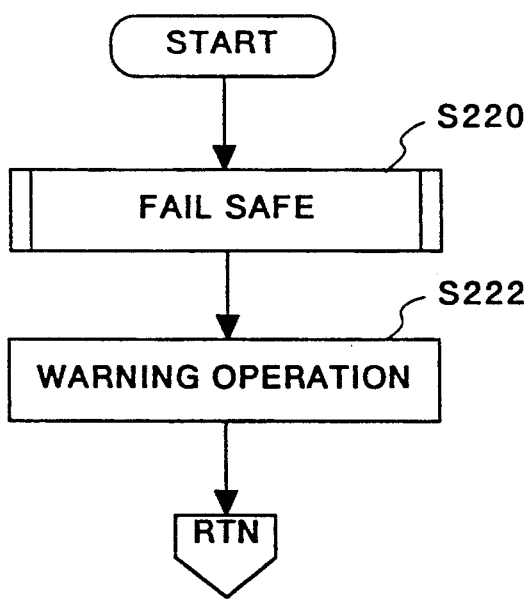

Therefore, when the predetermined time $t_3$ has passed, the third timer $T_3$ outputs a time-up signal to the first CPU 30A, and the first CPU 30A starts the third timer interrupt routine upon reception of this time-up signal. In this third timer interrupt routine, as shown in FIG. 32, in step S220, the fail-safe operation is executed, and in step S222, a warning operation is executed, thereby informing to the driver that the failed state occurs, and the fail-safe operation is being executed on the basis of this failed state. The flow then returns to the main routine.

Note that a total value of the predetermined times $t_1$, $t_2$, $t_3$ respectively set in the first to third timers $T_1$, $T_2$, and $T_3$ is defined as an allowable maximum time when the operation switch 18 passes the monitor range. That is, when the operation switch 18 stays in the monitor range for a long period of time, this means that a target travel range to be set by the operation switch 18 is unknown for a long period of time. As a result, as described above, the travel range of the automatic transmission mechanism 12 is temporarily set at the immediately preceding travel range position of the operation switch 18. However, since the travel range temporarily set in the automatic transmission mechanism 12 never be one to be set by the driver, such a travel range setup state which is not intended by the driver should be avoided as much as possible although it is temporary. From this point of view, a total value of the predetermined times $t_1$, $t_2$, and $t_3$ is limited to a predetermined value.

As has been described above with reference to FIG. 28, after the stop condition of the first driving motor 22A is logically established, when the fourth timer $T_4$ cannot be reset and the predetermined time $t_4$ has passed, i.e., when the first driving motor 22A is kept operated to exceed the predetermined time $t_4$ although it has been stopped logically, this means that the first failed state occurs.

Figure 33:
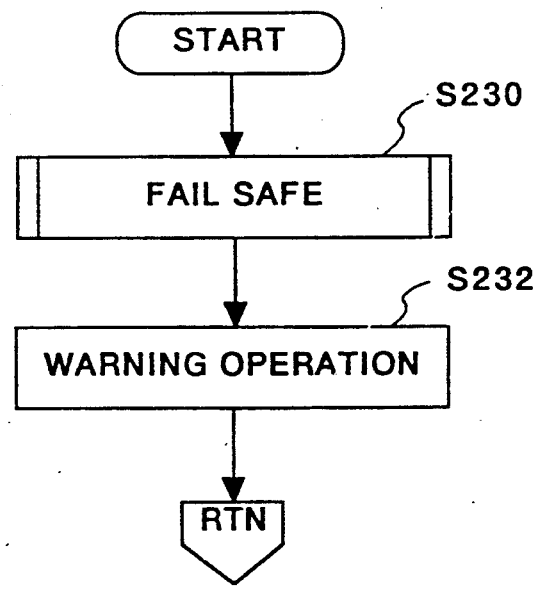

Therefore, when the predetermined time $t_4$ has passed, the fourth timer $T_4$ outputs a time-up signal to the first CPU 30A, and the first CPU 30A starts the fourth timer interrupt routine upon reception of this time-up signal. In this fourth timer interrupt routine, as shown in FIG. 33, in step S230, the fail-safe operation is executed, and in step S232, a warning operation is executed, thereby informing to the driver that the failed state occurs, and the fail-safe operation is being executed on the basis of this failed state. The flow then returns to the main routine.

Note that in this embodiment, the above-mentioned first to fifth fail-safe operations are attained by cutting a power supply to the first driving motor 22A. After the fail-safe operation is executed in this manner, when the driver wants to cancel the fail-safe state and to travel the vehicle again, he or she turns off the ignition switch, and then turns it on again. Thus, the first CPU 30A is reset to an initial state, and the fail-safe state can be automatically canceled.

When the driver drives the vehicle in this reset state, and operates the operation switch 18 to execute the travel range switching operation, if the fail-safe operation is executed again, the travel range switching operation via the operation switch 18 can no longer be performed. In this case, the lid member 54a arranged on the cowl panel lower 54 is removed to expose the manual driving mechanism 38, the switching lever 50 is pivoted from the control position to the disengaging position to disengage the clutch mechanism 34, and the wrench 48 is fitted in the fitting hole 40a of the pivot disc 40, so that the pivot disc 40 is pivoted through the wrench 48, thereby setting an arbitrary travel range. Thus, the travel range in the automatic transmission mechanism 12 can be manually switched.

The present invention is not limited to the arrangement of the above-mentioned embodiment, and various changes and modifications may be made within the spirit and scope of the invention.

Figure 20A:
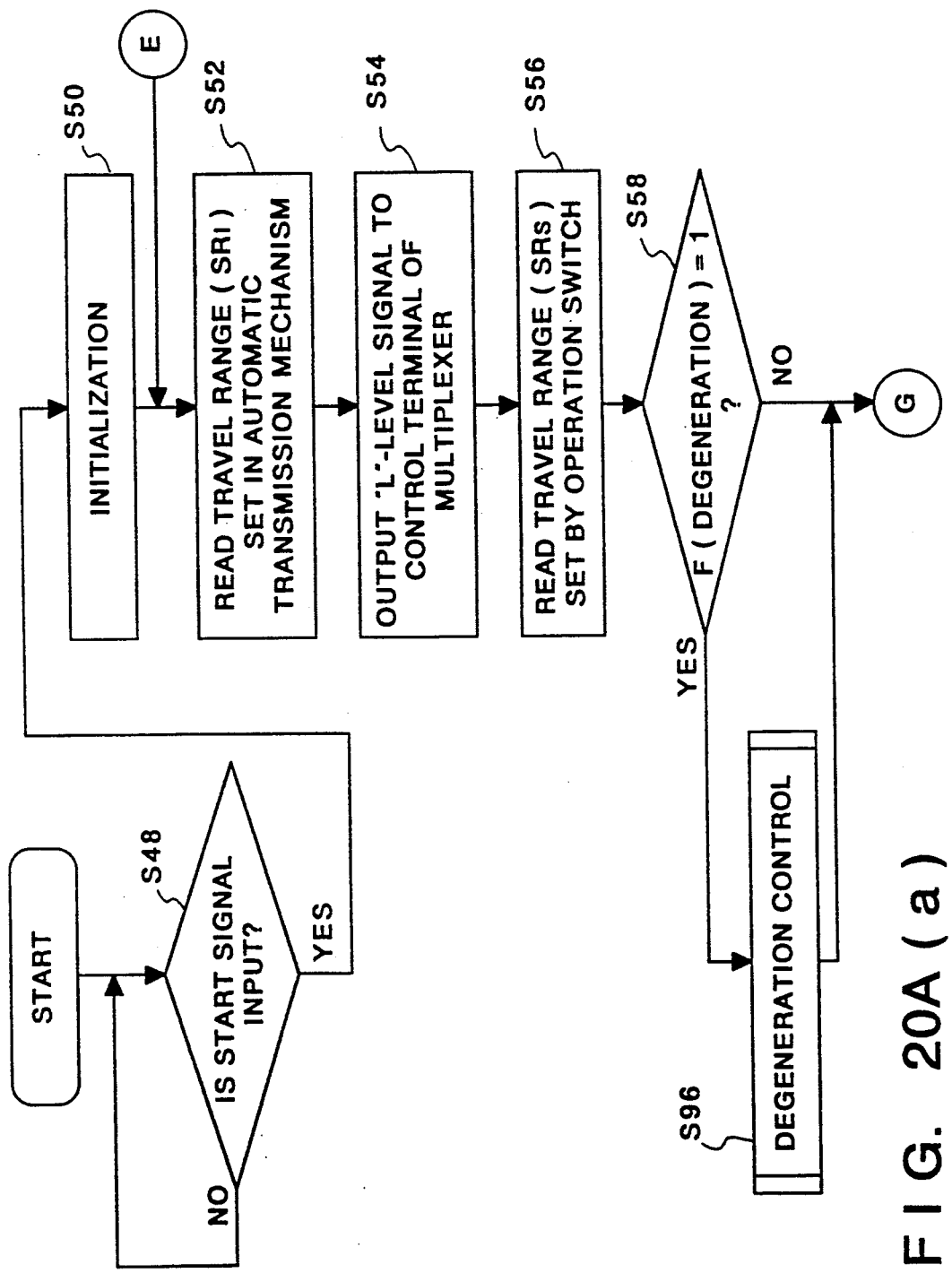
FIGS. 20A (a and b) and 20B are flow charts showing a control sequence of a main routine in the first CPU.
Figure 20A:
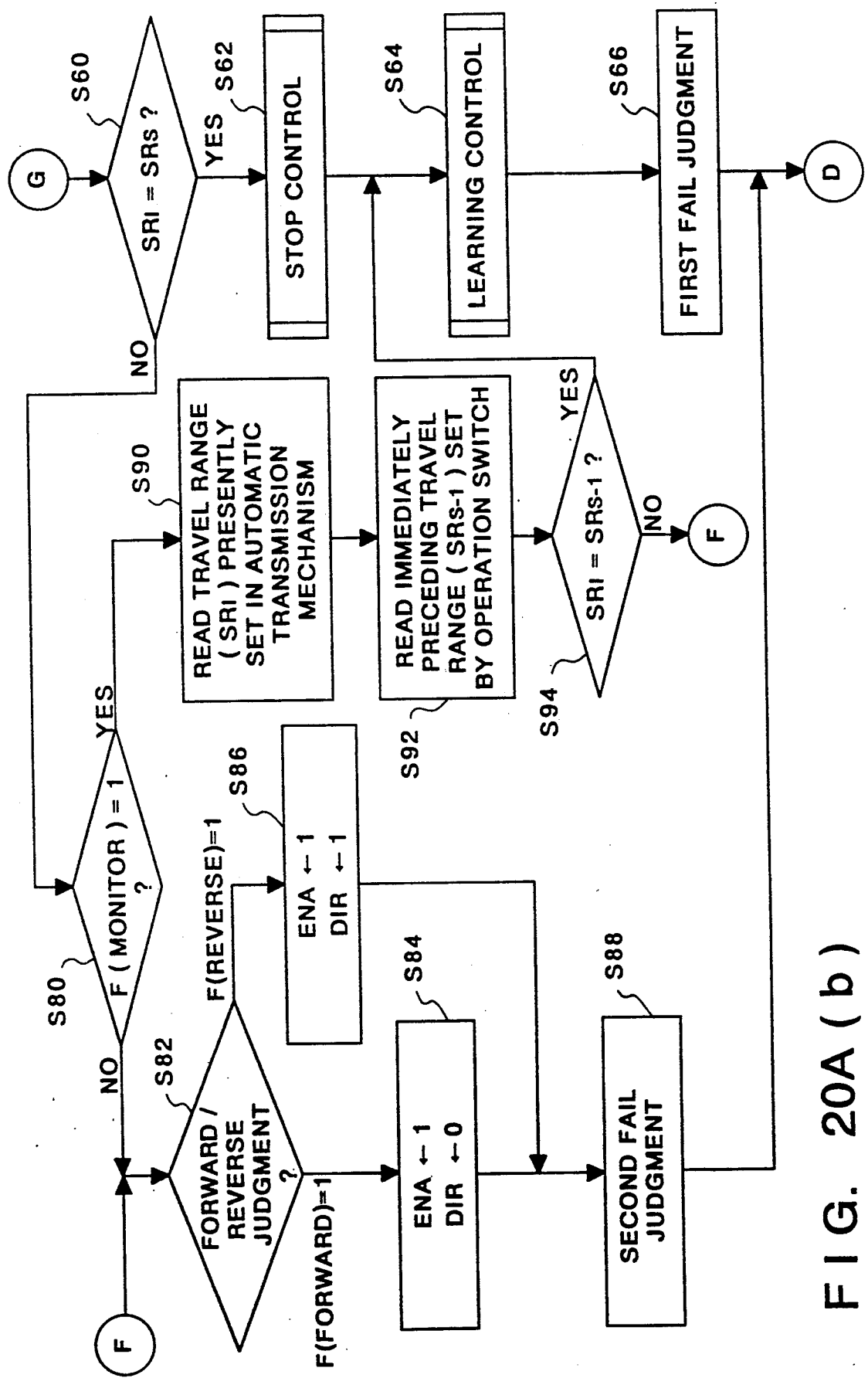
Figure 20B:
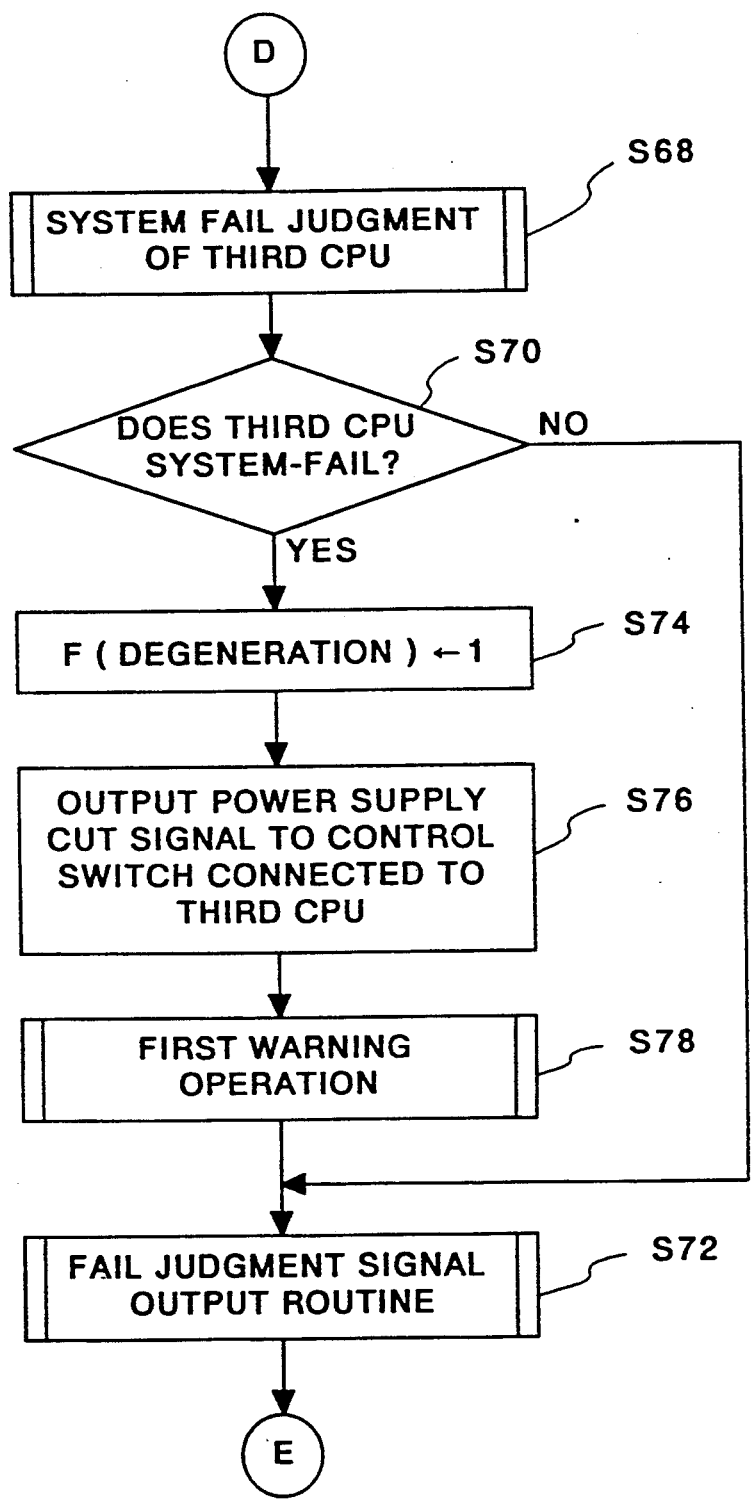

For example, in the above embodiment, when an engine output is decreased in the degeneration control shown in step S96 in FIG. 20A, in the case of, e.g., a fuel injection type engine, a fuel injection amount is decreased, or a fuel injection time is shortened. However, the present invention is not limited to this arrangement. For example, in an engine for electrically controlling a throttle valve, sensitivity of a degree of opening of the throttle valve in response to a depression amount of an accelerator pedal may be decreased, or an upper-limit value may be limited to, e.g., half a maximum value. That is, in step S96, the engine output need only be decreased to limit a maximum velocity of a vehicle regardless of a type of engine and its execution method.

The expected effect can be attained even if the degeneration control does not include the operation for decreasing the engine output.

In the degeneration control, travel ranges to be set by the operation switch 18 are limited to three ranges, i.e., the forward drive range "D", the neutral range "N", and the reverse range "R". However, the present invention is not limited to this. For example, a travel range may be forcibly fixed to the forward 1st-speed range "1". In this case, the operation for decreasing the engine output described above must be performed to prevent over-revolution of the engine.

In the above embodiment, the triple control systems of the control unit comprise the first CPU 30A for controlling the first driving motor 22A, the second CPU 30B for controlling the second driving motor 22B, and the third CPU 30C for managing the first and second CPUs 30A and 30B. However, the present invention is not limited to this arrangement. For example, the same three CPUs may be arranged, and if one of the contents output from these CPUs does not coincide with the remaining two contents, a driving motor may be controlled based on the coinciding contents of the two CPUs.

In the above embodiment, the control unit comprises the triple control systems. The control unit need only comprise at least double control systems. That is, it is important to provide an arrangement wherein when one CPU system fails, the other CPU can control a driving system.

In the above arrangement, as a control sequence for judging a system failed state, a signal waveform of a system fail judgement signal output from another CPU is monitored, and when this signal waveform is different from a predetermined waveform beyond an allowable range, it is determined that a system failed state occurs in the other CPU. However, the present invention, is not limited to this arrangement. For example, a system fail judgement signal of predetermined logic level may be output to another CPU, and when a signal having logic level opposite to the output logic level is sent back from the other CPU, it may be determined that the other CPU is normal. If a signal having different level is sent back, it may be determined that the other CPU system-fails.

As many apparently widely different embodiments of the present invention can be made without departing from the spirit and scope thereof, it is to be understood that the invention is not limited to the specific embodiments thereof except as defined in the appended claims.

What is claimed is:

1. An operation apparatus for a vehicle automatic transmission mechanism, which comprises:
   first and second actuators, connected in parallel with hydraulic valve, for driving said hydraulic valve to switch a travel range of an automatic transmission mechanism;
   control means for controlling said first and second actuators; and
   transmission operation means for outputting a range signal indicating a presently set travel range to said control means, and
   wherein said transmission operation means includes a stroke contact type operation switch on which travel ranges to be set are sequentially aligned along a predetermined path, and
   said control means includes:
   a first control unit, connected to said first actuator, for controlling a driving operation of said first actuator;
   a second control unit, connected to said second acturator, for controlling a driving operation of said second actuator; and
   a third control unit, connected to said first and second control units, for setting, in a driving state, one of said first and second actuators connected to one of said first and second control units, which unit serves as a main unit, for monitoring system failed states of said first and second control units, for, when said third control unit determines that a system failed state occurs, inhibiting the driving operation of the actuator connected to the system-failed control unit, and for permitting the driving operation of the actuator connected to the control unit which does not suffer from the system failed state.

2. The operation apparatus according to claim 1, wherein
   said first and second cntrol units have the same control sequence.

3. The operation apparatus according to claim 1, wherein
   said first and second control units monitor a system failed state of said third control unit, and inhibits a control operation of said third control unit when it is determined that said third control unit system-fails.

4. The operation apparatus according to claim 3, wherein
   the control operation of said third control unit is inhibited only when both said first and second control units determine that said third control unit system-fails.

5. The operation apparatus according to claim 1, wherein
   when each of said first to third control units determines that the other control unit system-fails, the control unit which detects the system failed state occurs.

6. The operation apparatus according to claim 1, wherein
   said third control unit sets both said first and second actuators in a driving state when it determines that a travel range set in said automatic transmission mechanism is a parking range.

7. The operation apparatus according to claim 1, wherein
   said first and second actuators are connected to said hydraulic valve via a planetary gear mechanism.

8. The operation apparatus according to claim 7, wherein
   said first actuator is connected to a planet carrier of said planetary gear mechanism to rotate said planet carrier,
   said second actuator is connected to a sun gear of said planetary gear mechanism to rotate said sun gear, and
   an internal gear of said planetary gear mechanism is connected to said hydraulic valve.

9. The operation apparatus according to claim 8, wherein
   said first actuator is connected to said planet carrier via a rack & pinion mechanism, and
   said second actuator is connected to said sun gear via another rack & pinion mechanism.

10. An operation apparatus for a vehicle automatic transmission mechanism, which comprises:
    a pair of actuators, connected in parallel with a hydraulic valve, for driving said hydraulic valve to switch a travel range of an automatic transmission mechanism;
    control means for controlling said pair of actuators; and
    transmission operation means for outputting a range signal indicating a presently set travel range to said control means, and
    wherein said transmission operation means includes a stroke contact type operation switch on which travel ranges to be set are sequentially aligned along a predetermined path, and
    said control means includes a pair of control units, one control unit controlling a driving operation of said hydraulic valve via the corresponding actuator, each control unit monitoring a system failed state of the other control unit, and when one control unit determines that the other control unit system-fails, said one control unit inhibiting the driving operation of the actuator connected to the system-failed control unit, and executing a control operation.

* * * * *